(12) United States Patent
Kurokawa

(10) Patent No.: US 10,109,633 B2
(45) Date of Patent: Oct. 23, 2018

(54) SEMICONDUCTOR DEVICE, ELECTRONIC DEVICE, AND AUTHENTICATION SYSTEM

(71) Applicant: Semiconductor Energy Laboratory Co., Ltd., Atsugi-shi, Kanagawa-ken (JP)

(72) Inventor: Yoshiyuki Kurokawa, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 3 days.

(21) Appl. No.: 15/490,383

(22) Filed: Apr. 18, 2017

(65) Prior Publication Data

US 2017/0317085 A1    Nov. 2, 2017

(30) Foreign Application Priority Data

Apr. 27, 2016    (JP) .................................. 2016-089504

(51) Int. Cl.
*H01L 27/105* (2006.01)
*G11C 11/405* (2006.01)
(Continued)

(52) U.S. Cl.
CPC .............. *H01L 27/105* (2013.01); *G06F 3/01* (2013.01); *G11C 7/1006* (2013.01);
(Continued)

(58) Field of Classification Search
None
See application file for complete search history.

(56) References Cited

U.S. PATENT DOCUMENTS 6,314,017 B1 * 11/2001 Emori .................. G11C 11/405
257/296
9,570,141 B2 * 2/2017 Saito ..................... G11C 11/401
(Continued)

FOREIGN PATENT DOCUMENTS

JP    2004-110421 A    4/2004

OTHER PUBLICATIONS

Aslam-Siddiqi.A et al., "A 16×16 Nonvolatile Programmable Analog Vector-Matrix Multiplier", IEEE Journal of Solid-State Circuits, Oct. 1, 1998, vol. 33, No. 10, pp. 1502-1509.
(Continued)

*Primary Examiner* — Andres Munoz
(74) *Attorney, Agent, or Firm* — Fish & Richardson P.C.

(57) ABSTRACT

A novel semiconductor device is provided. A memory cell MC has a function of supplying a signal corresponding to the product of first data and second data to a wiring BX, and also has a function of supplying a signal corresponding to the product of the first data and third data to a wiring BY. The wiring BX is connected to a plurality of memory cells MC. Each of the plurality of memory cells MC outputs a signal corresponding to the result of the product operation to the wiring BX. The wiring BX has a function of transmitting a signal corresponding to the sum of these signals. The wiring BY is connected to a plurality of memory cells MC. Each of the plurality of memory cells MC outputs a signal corresponding to the result of the product operation to the wiring BY. The wiring BY has a function of transmitting a signal corresponding to the sum of these signals.

15 Claims, 27 Drawing Sheets

(51) Int. Cl.
*H01L 29/786* (2006.01)
*G06F 3/01* (2006.01)
*G11C 7/10* (2006.01)
*G11C 11/401* (2006.01)

(52) U.S. Cl.
CPC .......... *G11C 11/401* (2013.01); *G11C 11/405* (2013.01); *H01L 27/1052* (2013.01); *H01L 29/7869* (2013.01)

(56) References Cited

U.S. PATENT DOCUMENTS

| | | | |
|---|---|---|---|
| 2011/0090184 A1* | 4/2011 | Yamazaki | G09G 3/20 345/204 |
| 2011/0175087 A1* | 7/2011 | Yamazaki | H01L 21/8221 257/57 |
| 2011/0249484 A1* | 10/2011 | Takemura | G11C 11/404 365/72 |
| 2012/0063205 A1* | 3/2012 | Matsuzaki | G11C 8/08 365/149 |
| 2012/0182789 A1* | 7/2012 | Saito | G11C 11/401 365/149 |
| 2014/0231799 A1* | 8/2014 | Matsubayashi | H01L 27/0629 257/43 |
| 2014/0367673 A1* | 12/2014 | Takahashi | H01L 29/7869 257/43 |
| 2015/0023114 A1* | 1/2015 | Kurokawa | G11C 11/405 365/189.011 |
| 2016/0155480 A1* | 6/2016 | Inoue | G11C 5/10 365/72 |

OTHER PUBLICATIONS

Arima.Y et al., "A Self-Learning Neural Network Chip with 125 Neurons and 10K Self-Organization Synapses", IEEE Journal of Solid-State Circuits, Apr. 1, 1991, vol. 26, No. 4, pp. 607-611.

* cited by examiner

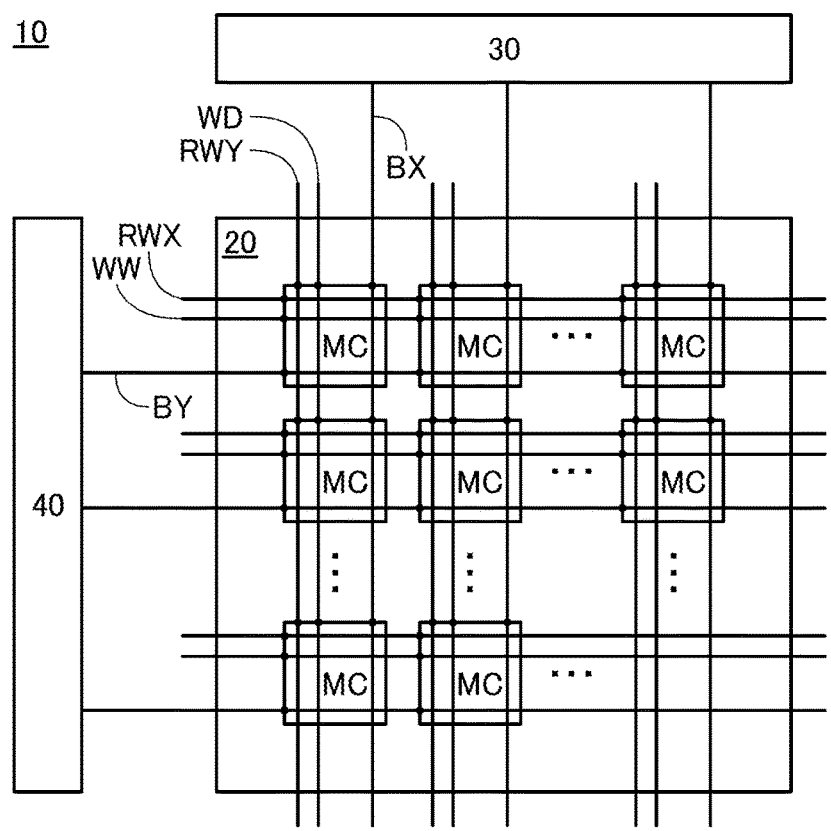

SEMICONDUCTOR DEVICE, ELECTRONIC DEVICE, AND AUTHENTICATION SYSTEM

BACKGROUND OF THE INVENTION

1. Field of the Invention

One embodiment of the present invention relates to a semiconductor device, an electronic device, and an authentication system.

Note that one embodiment of the present invention is not limited to the above technical field. The technical field of one embodiment of the invention disclosed in this specification and the like relates to an object, a method, or a manufacturing method. In addition, one embodiment of the present invention relates to a process, a machine, manufacture, or a composition of matter. Furthermore, one embodiment of the present invention relates to a semiconductor device, a display device, a light-emitting device, a power storage device, a memory device, an imaging device, a method for driving any of them, and a method for manufacturing any of them.

2. Description of the Related Art

Product-sum operation processing is arithmetic processing often used in a digital circuit. Arithmetic processing performed after conversion of analog data into digital data requires massive arithmetic processing. As a result, it is difficult to shorten the time for the arithmetic processing. Thus, a variety of methods for performing arithmetic processing without converting analog data into digital data, as in analog data processing performed by a brain where a neuron is a fundamental component, have been proposed.

Patent Document 1 discloses an arithmetic circuit that can simultaneously execute nonlinear transformation processing and weighting processing.

[Reference]
[Patent Document]
[Patent Document 1] Japanese Published Patent Application No. 2004-110421

SUMMARY OF THE INVENTION

An object of one embodiment of the present invention is to provide a novel semiconductor device or a novel memory device. Another object of one embodiment of the present invention is to provide a semiconductor device or memory device that is capable of performing product-sum operation. Another object of one embodiment of the present invention is to provide a semiconductor device or memory device that is capable of performing two types of operations. Another object of one embodiment of the present invention is to provide a semiconductor device or memory device that is capable of performing high-accuracy operation. Another object of one embodiment of the present invention is to provide a semiconductor device or memory device that is capable of high-speed operation. Another object of one embodiment of the present invention is to provide a semiconductor device or memory device with low power consumption. Another object of one embodiment of the present invention is to provide a small semiconductor device or memory device.

One embodiment of the present invention does not necessarily achieve all the objects listed above and only needs to achieve at least one of the objects. The description of the above objects does not preclude the existence of other objects. Other objects will be apparent from and can be derived from the description of the specification, the drawings, the claims, and the like.

A semiconductor device of one embodiment of the present invention includes a memory cell. The memory cell includes a first transistor, a second transistor, a third transistor, a first capacitor, and a second capacitor. A gate of the first transistor is electrically connected to a first wiring. One of a source and a drain of the first transistor is electrically connected to a gate of the second transistor, a gate of the third transistor, one electrode of the first capacitor, and one electrode of the second capacitor. The other of the source and the drain of the first transistor is electrically connected to a second wiring. One of a source and a drain of the second transistor is electrically connected to a third wiring. The other of the source and the drain of the second transistor is electrically connected to a fourth wiring. One of a source and a drain of the third transistor is electrically connected to a fifth wiring. The other of the source and the drain of the third transistor is electrically connected to the fourth wiring. The other electrode of the first capacitor is electrically connected to a sixth wiring. The other electrode of the second capacitor is electrically connected to a seventh wiring.

In the semiconductor device of one embodiment of the present invention, the memory cell may have a function of holding a first potential. The sixth wiring may have a function of supplying a second potential to the memory cell. The seventh wiring may have a function of supplying a third potential to the memory cell. A first current determined by a fourth potential may be supplied between the memory cell and the third wiring. The fourth potential is obtained by the product of the first potential and the second potential. A second current determined by a fifth potential may be supplied between the memory cell and the fifth wiring. The fifth potential is obtained by the product of the first potential and the third potential.

In the semiconductor device of one embodiment of the present invention, the first potential, the second potential, and the third potential may each be an analog potential.

The semiconductor device of one embodiment of the present invention may include a plurality of memory cells. A first memory cell, a second memory cell, and a third memory cell may be included in the plurality of memory cells. The first memory cell and the second memory cell may be electrically connected to the third wiring and the seventh wiring. The first memory cell and the third memory cell may be electrically connected to the fifth wiring and the sixth wiring. A third current corresponding to the sum of the fourth potential of the first memory cell and the fourth potential of the second memory cell may be supplied to the third wiring. A fourth current corresponding to the sum of the fifth potential of the first memory cell and the fifth potential of the third memory cell may be supplied to the fifth wiring.

In the semiconductor device of one embodiment of the present invention, the first transistor may contain an oxide semiconductor in a channel formation region.

An electronic device of one embodiment of the present invention includes any of the above semiconductor devices and at least one of a display portion, an operation key, a speaker, and a microphone.

An authentication system of one embodiment of the present invention includes an identification portion including any of the above semiconductor devices. The identification portion has a function of receiving a signal corresponding to a character, a figure, a symbol, or voice sensed by a sensor portion of an electronic device and identifying the signal. The identification result is transmitted from the identification portion to a control portion having a function of controlling an operation of the electronic device.

According to one embodiment of the present invention, a novel semiconductor device or a novel memory device is provided. According to one embodiment of the present invention, a semiconductor device or memory device that is capable of performing product-sum operation is provided. According to one embodiment of the present invention, a semiconductor device or memory device that is capable of performing two types of operations is provided. According to one embodiment of the present invention, a semiconductor device or memory device that is capable of performing high-accuracy operation is provided. According to one embodiment of the present invention, a semiconductor device or memory device that is capable of performing high-speed operation is provided. According to one embodiment of the present invention, a semiconductor device or memory device with low power consumption is provided. According to one embodiment of the present invention, a small semiconductor device or memory device is provided.

Note that the description of these effects does not preclude the existence of other effects. One embodiment of the present invention does not necessarily have all of these effects. Other effects will be apparent from and can be derived from the description of the specification, the drawings, the claims, and the like.

BRIEF DESCRIPTION OF THE DRAWINGS

In the accompanying drawings:

FIG. 1 illustrates a configuration example of a semiconductor device;

FIGS. 18A, 18B-1, 18B-2, and 18C illustrate a structure example of a touch panel;

DETAILED DESCRIPTION OF THE INVENTION

Figure 2:
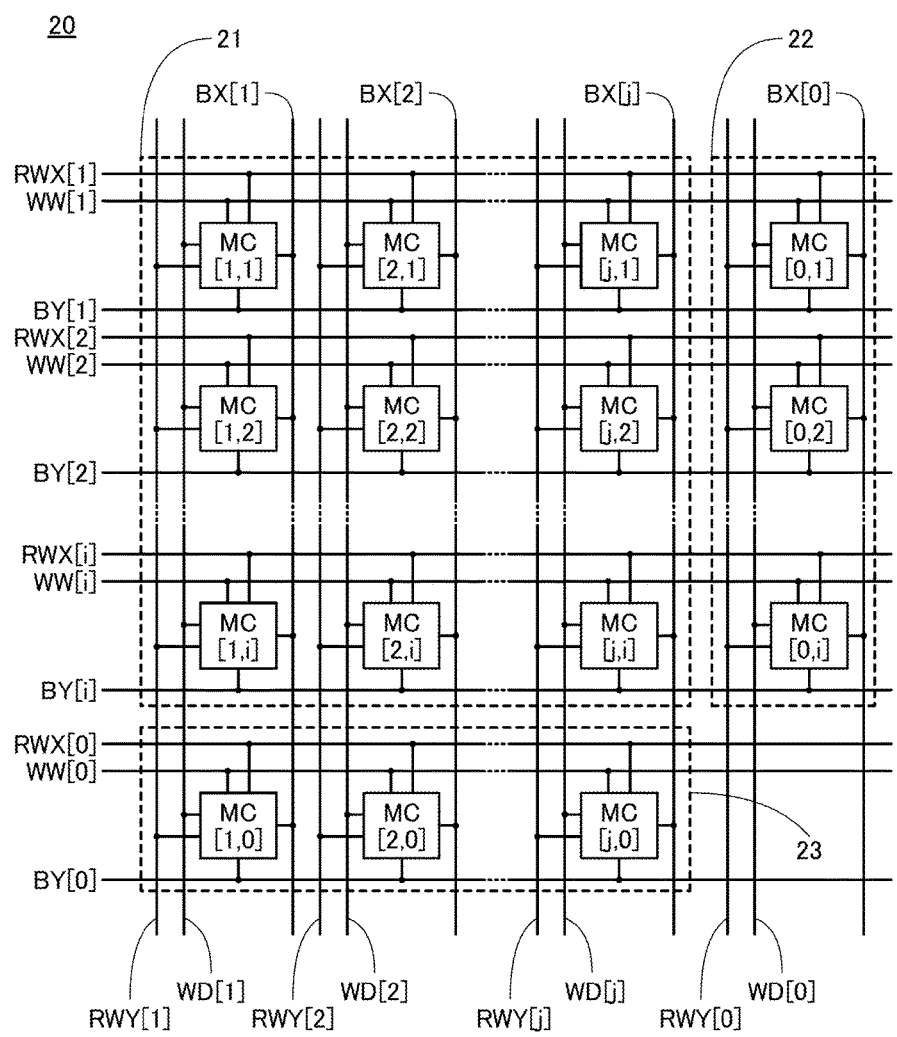
FIG. 2 illustrates a configuration example of a cell array.

Embodiments of the present invention will be described below in detail with reference to the drawings. Note that the present invention is not limited to the following description and it is easily understood by those skilled in the art that the mode and details can be variously changed without departing from the scope and spirit of the present invention. Therefore, the present invention should not be interpreted as being limited to the description of the embodiments below.

One embodiment of the present invention includes, in its category, devices such as a semiconductor device, a memory device, a display device, an imaging device, and a radio frequency (RF) tag. Furthermore, the display device includes, in its category, a liquid crystal display device, a light-emitting device having pixels each provided with a light-emitting element typified by an organic light-emitting element, electronic paper, a digital micromirror device (DMD), a plasma display panel (PDP), a field emission display (FED), and the like.

In this specification and the like, an explicit description "X and Y are connected" means that X and Y are electrically connected, X and Y are functionally connected, and X and Y are directly connected. Accordingly, without being limited to a predetermined connection relation, for example, a connection relation shown in drawings or text, another connection relation is included in the drawings or the text. Here, X and Y each denote an object (e.g., a device, an element, a circuit, a wiring, an electrode, a terminal, a conductive film, or a layer).

Examples of the case where X and Y are directly connected include the case where an element that allows an electrical connection between X and Y (e.g., a switch, a transistor, a capacitor, an inductor, a resistor, a diode, a display element, a light-emitting element, or a load) is not connected between X and Y, and the case where X and Y are connected without the element that allows the electrical connection between X and Y provided therebetween.

For example, in the case where X and Y are electrically connected, one or more elements that enable an electrical connection between X and Y (e.g., a switch, a transistor, a capacitor, an inductor, a resistor, a diode, a display element, a light-emitting element, or a load) can be connected between X and Y. Note that the switch is controlled to be turned on or off. That is, the switch is conducting or not conducting (is turned on or off) to determine whether current flows therethrough or not. Alternatively, the switch has a function of selecting and changing a current path. Note that the case where X and Y are electrically connected includes the case where X and Y are directly connected.

For example, in the case where X and Y are functionally connected, one or more circuits that enable a functional connection between X and Y (e.g., a logic circuit such as an inverter, a NAND circuit, or a NOR circuit; a signal converter circuit such as a D/A converter circuit, an A/D converter circuit, or a gamma correction circuit; a potential level converter circuit such as a power source circuit (e.g., a step-up circuit or a step-down circuit) or a level shifter circuit for changing the potential level of a signal; a voltage source; a current source; a switching circuit; an amplifier circuit such as a circuit that can increase signal amplitude, the amount of current, or the like, an operational amplifier, a differential amplifier circuit, a source follower circuit, or a buffer circuit; a signal generation circuit; a memory circuit; and/or a control circuit) can be connected between X and Y. For example, even when another circuit is interposed between X and Y, X and Y are functionally connected if a signal output from X is transmitted to Y. Note that the case where X and Y are functionally connected includes the case where X and Y are directly connected and the case where X and Y are electrically connected.

Note that in this specification and the like, an explicit description "X and Y are electrically connected" means that X and Y are electrically connected (i.e., the case where X and Y are connected with another element or another circuit provided therebetween), X and Y are functionally connected (i.e., the case where X and Y are functionally connected with another circuit provided therebetween), and X and Y are directly connected (i.e., the case where X and Y are connected without another element or another circuit provided therebetween). That is, in this specification and the like, the explicit description "X and Y are electrically connected" is the same as the description "X and Y are connected."

In describing structures of the invention with reference to the drawings, common reference numerals are used for the same portions in different drawings in some cases.

Even when independent components are electrically connected to each other in the drawing, one component has functions of a plurality of components in some cases. For example, when part of a wiring also functions as an electrode, one conductive film functions as the wiring and the electrode. Thus, "electrical connection" in this specification includes in its category such a case where one conductive film has functions of a plurality of components.

Embodiment 1

In this embodiment, a semiconductor device of one embodiment of the present invention is described.

<Configuration Example of Semiconductor Device>

Figure 18A:
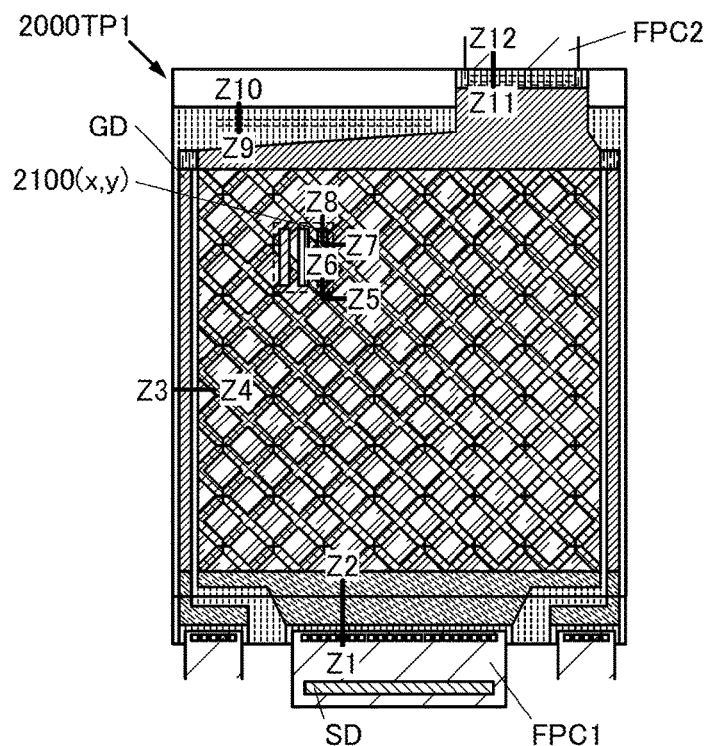
Figures 1, 18B:
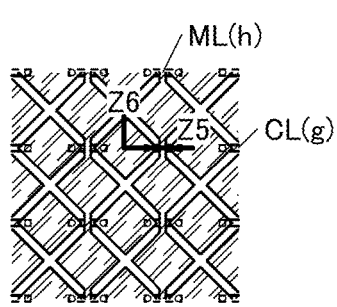
Figures 2, 18B:
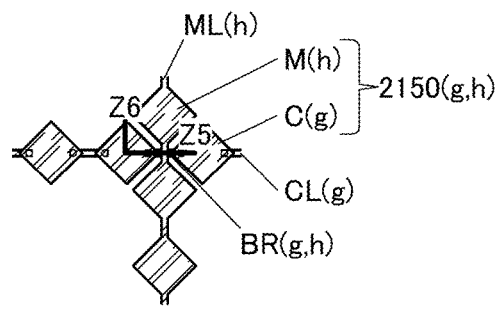

FIG. 1 illustrates a configuration example of a semiconductor device 10. The semiconductor device 10 includes a cell array 20, a current supply circuit 30, and a current supply circuit 40.

The cell array 20 has a function of storing data. Specifically, the cell array 20 includes a plurality of memory cells MC each having a function of storing data. The memory cells MC are each connected to a wiring WW, a wiring WD, a wiring RWX, a wiring RWY, a wiring BX, and a wiring BY. The semiconductor device 10 including the cell array 20 can be used as a memory device.

The wiring WW has a function of transmitting a signal for selecting the memory cells MC (this signal is hereinafter also referred to as a selection signal). The wiring WD has a function of transmitting a signal corresponding to data stored in the memory cell MC (this data is hereinafter also referred to as first data). The wiring RWX has a function of transmitting a signal corresponding to data supplied to the memory cells MC in the same row. The wiring RWY has a function of transmitting a signal corresponding to data supplied to the memory cells MC in the same column. Hereinafter, the data supplied to the wiring RWX is also referred to as second data, and the data supplied to the wiring RWY is also referred to as third data. Note that the first to third data can each be analog data. The wiring BX and the wiring BY each have a function of transmitting a signal corresponding to data output from the cell array 20.

The current supply circuit 30 and the current supply circuit 40 each have a function of supplying a current to the memory cells MC. Specifically, the current supply circuit 30 has a function of supplying a certain current to the wirings BX, and the current supply circuit 40 has a function of supplying a certain current to the wirings BY.

In one embodiment of the present invention, the memory cell MC has a function of supplying a signal corresponding to the product of the first data and the second data to the wiring BX, and also has a function of supplying a signal corresponding to the product of the first data and the third data to the wiring BY. That is, the memory cell MC has a function of performing two types of operations. Thus, the memory cell MC can also be referred to as an arithmetic circuit. The wiring BX is connected to a plurality of memory cells MC. Each of the plurality of memory cells MC outputs a signal corresponding to the result of the product operation to the wiring BX. The wiring BX has a function of transmitting a signal corresponding to the sum of these signals. The wiring BY is connected to a plurality of memory cells MC. Each of the plurality of memory cells MC outputs a signal corresponding to the result of the product operation to the wiring BY. The wiring BY has a function of transmitting a signal corresponding to the sum of these signals. Accordingly, the semiconductor device 10 is capable of performing product-sum operation. Thus, the semiconductor device 10 can also be referred to as an arithmetic device. Hereinafter, configuration examples and operation examples of the memory cells MC, the current supply circuit 30, and the current supply circuit 40 for performing operations in the semiconductor device 10 are described in detail.

<Configuration Example of Cell Array>

FIG. 2 illustrates a specific configuration example of the cell array 20. The cell array 20 includes the memory cells MC arranged in a matrix of j+1 columns and i+1 rows (each of j and i is an integer greater than or equal to 1). FIG. 2 illustrates the cell array 20 including the memory cells MC arranged in a matrix of j columns and i rows (memory cells MC[1,1] to MC[j,i]), the i memory cells MC (memory cells MC[0,1] to MC[0,i]), and the j memory cells MC (memory cells MC[1,0] to MC[j,0]). A memory cell MC[n,m] (n is an integer greater than or equal to 0 and less than or equal to j, and m is an integer greater than or equal to 0 and less than or equal to i) is connected to a wiring WW[m], a wiring WD[n], a wiring RWX[m], a wiring RWY[n], a wiring BX[n], and a wiring BY[m]. Wirings BX[0] to BX[j] are connected to the current supply circuit 30, and wirings BY[0] to BY[i] are connected to the current supply circuit 40 (see FIG. 1).

The memory cell MC has a function of supplying a current IX between the memory cell MC and the wiring BX connected to the memory cell MC. Note that the current IX corresponds to the product of the first data and the second data. Furthermore, the memory cell MC has a function of supplying a current IY between the memory cell MC and the wiring BY connected to the memory cell MC. Note that the current IY corresponds to the product of the first data and the third data. Hereinafter, a current flowing between the memory cell MC[n,m] and the wiring BX[n] is denoted by a current IX[n,m], and a current flowing between the memory cell MC[n,m] and the wiring BY[m] is denoted by a current IY[n,m].

The memory cells MC are each connected to the wiring BX and output the current IX to the wiring BX. A current corresponding to the sum of the currents IX is output from the wiring BX. Thus, the amount of the current output from the wiring BX corresponds to the result of product-sum operation performed on the basis of the first data and the second data. Furthermore, the memory cells MC are each connected to the wiring BY and output the current IY to the wiring BY. A current corresponding to the sum of the currents IY is output from the wiring BY. Thus, the amount of the current output from the wiring BY corresponds to the result of product-sum operation performed on the basis of the first data and the third data. For example, the wiring BX[j] has a function of supplying a current corresponding to the sum of currents IX[j,0] to IX[j,i], and the wiring BY[i] has a function of supplying a current corresponding to the sum of currents IY[0,i] to IY[j,i]. With the memory cell MC, the wiring BX, and the wiring BY, the two types of product-sum operations can be performed.

Note that the cell array 20 can be divided into a cell array 21 including the memory cells MC[1,1] to MC[j,i], a cell array 22 including the memory cells MC[0,1] to MC[0,i], and a cell array 23 including the memory cells MC[1,0] to MC[j,0]. The memory cells MC included in the cell array 21 each have a function of storing the first data. The memory cells MC included in the cell array 22 and the cell array 23 function as reference memory cells used in performing product-sum operation. Reference data is stored in the reference memory cells. Operations of these circuits are described in detail later.

<Configuration Example of Memory Cell>

Figure 3A:
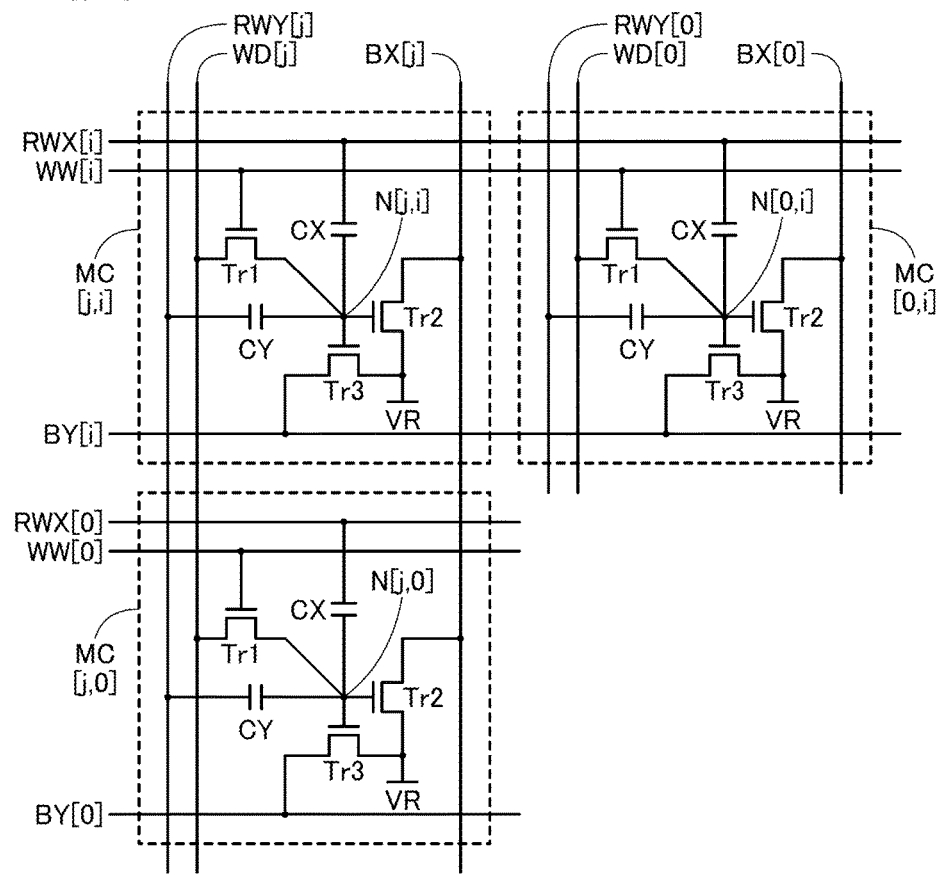
FIGS. 3A and 3B illustrate a configuration example of a memory cell.

FIG. 3A illustrates configuration examples of the memory cells MC. Although the memory cell MC[j,i], the memory cell MC[0,i], and the memory cell MC[j,0] are particularly selected and illustrated here, the same configuration can be used in other memory cells MC.

The memory cell MC includes a transistor Tr1, a transistor Tr2, a transistor Tr3, a capacitor CX, and a capacitor CY. A gate of the transistor Tr1 is connected to the wiring WW, one of a source and a drain of the transistor Tr1 is connected to a gate of the transistor Tr2, a gate of the transistor Tr3, one electrode of the capacitor CX, and one electrode of the capacitor CY, and the other of the source and the drain of the transistor Tr1 is connected to the wiring WD. One of a source and a drain of the transistor Tr2 is connected to the wiring BX, and the other of the source and the drain thereof is connected to a wiring VR. One of a source and a drain of the transistor Tr3 is connected to the wiring BY, and the other of the source and the drain thereof is connected to the wiring VR. The other electrode of the capacitor CX is connected to the wiring RWX. The other electrode of the capacitor CY is connected to the wiring RWY.

A node that is connected to the one of the source and the drain of the transistor Tr1, the gate of the transistor Tr2, the gate of the transistor Tr3, the one electrode of the capacitor CX, and the one electrode of the capacitor CY is referred to as a node N. The node N included in the memory cell MC[n,m] is denoted by the node N[n,m]. Note that a predetermined potential is supplied to the wiring VR. The predetermined potential may be a fixed potential (a high- or low-level potential) or a fluctuating potential. Hereinafter, an example in which a low-level fixed potential (e.g., a ground potential) is supplied to the wiring VR is described. Here, although an example in which the transistors Tr1 to Tr3 are n-channel transistors is described, the transistors Tr1 to Tr3 may be p-channel transistors.

The potential of the wiring WD is set to a potential corresponding to the first data and the potential of the wiring WW is set to a high-level potential to turn on the transistor Tr1. Thus, the potential corresponding to the first data is supplied from the wiring WD to the node N through the transistor Tr1. After that, the potential of the wiring WW is set to a low-level potential to turn off the transistor Tr1, so that the node N is brought into a floating state and thus the potential of the node N is held. Accordingly, the first data can be stored in the memory cell MC. Note that an analog potential can be held at the node N and thus the memory cell MC can be used as an analog memory.

A potential corresponding to the second data is supplied to the wiring RWX while the first data is stored in the memory cell MC, so that the potential of the node N changes owing to capacitive coupling of the capacitor CX. Then, a current corresponding to the potential of the node N flows through the transistor Tr2. Note that the amount of the current flowing through the transistor Tr2 depends on the product of the first data and the second data. Thus, when the second data is supplied to the memory cell MC in which the first data is stored, the current IX corresponding to the product of the first data and the second data can be obtained.

Furthermore, a potential corresponding to the third data is supplied to the wiring RWY while the first data is stored in the memory cell MC, so that the potential of the node N changes owing to capacitive coupling of the capacitor CY. Then, a current corresponding to the potential of the node N flows through the transistor Tr3. Note that the amount of the current flowing through the transistor Tr3 depends on the product of the first data and the third data. Thus, when the third data is supplied to the memory cell MC in which the first data is stored, the current IY corresponding to the product of the first data and the third data can be obtained.

Figure 3B:
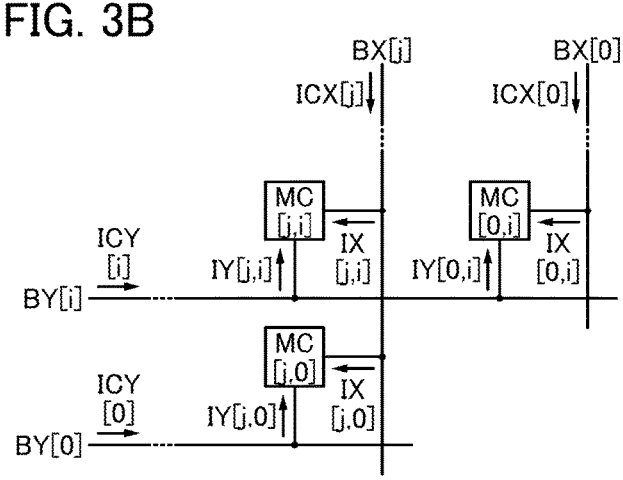

FIG. 3B illustrates the relationship among currents flowing through the memory cells MC, the wirings BX, and the wirings BY illustrated in FIG. 3A. A current ICX[j] is supplied from the current supply circuit 30 (see FIG. 1) to the wiring BX[j]. Then, the current flowing through the wiring BX[j] is supplied to the memory cell MC[j,i] and the memory cell MC[j,0] (the current IX[j,i] and the current IX[j,0]). Furthermore, a current ICX[0] is supplied from the current supply circuit 30 to the wiring BX[0]. Then, the current flowing through the wiring BX[0] is supplied to the memory cell MC[0,i] (a current IX[0,i]). Note that although not illustrated here, the current flowing through the wiring BX[j] is also supplied to the memory cells MC[j,1] to MC[j,i−1], and the current flowing through the wiring BX[0] is also supplied to the memory cells MC[0,1] to MC[0,i−1].

A current ICY[i] is supplied from the current supply circuit 40 (see FIG. 1) to the wiring BY[i]. Then, the current flowing through the wiring BY[i] is supplied to the memory cell MC[j,i] and the memory cell MC[0,i] (the current IY[j,i] and the current IY[0,i]). Furthermore, a current ICY[0] is supplied from the current supply circuit 40 to the wiring BY[0]. Then, the current flowing through the wiring BY[0] is supplied to the memory cell MC[j,0] (a current IY[j,0]). Note that although not illustrated here, the current flowing through the wiring BY[i] is also supplied to the memory cells MC[1,$i$] to MC[$j$−1,$i$], and the current flowing through the wiring BY[0] is also supplied to the memory cells MC[1,0] to MC[$j$−1,0].

Note that a transistor containing an oxide semiconductor in its channel formation region (this transistor is hereinafter also referred to as an OS transistor) is preferably used as the transistor Tr1. An oxide semiconductor has a larger energy gap than a semiconductor such as silicon and has low carrier density; thus, the off-state current of an OS transistor is extremely low. Accordingly, when an OS transistor is used as the transistor Tr1, the potential held at the node N can be held for a long time as compared to the case where a transistor containing silicon in its channel formation region (this transistor is hereinafter also referred to as a Si transistor) is used. Accordingly, the power consumption of the semiconductor device 10 can be reduced.

The leakage current of an OS transistor normalized by channel width can be lower than or equal to $10 \times 10^{-21}$ A/$\mu$m (10 zA/$\mu$m) with a source-drain voltage of 10 V at room temperature (approximately 25° C.). The leakage current of the OS transistor used as the transistor Tr1 is preferably lower than or equal to $1 \times 10^{-18}$ A, lower than or equal to $1 \times 10^{-21}$ A, or lower than or equal to $1 \times 10^{-24}$ A at room temperature (approximately 25° C.). Alternatively, the leakage current is preferably lower than or equal to $1 \times 10^{-15}$ A, lower than or equal to $1 \times 10^{-18}$ A, or lower than or equal to $1 \times 10^{-21}$ A at 85° C.

A channel formation region of the transistor is preferably formed using an oxide semiconductor containing at least one of indium (In) and zinc (Zn). Typical examples of such an oxide semiconductor include an In oxide, a Zn oxide, an In—Zn oxide, and an In-M-Zn oxide (the element M is Al, Ti, Ga, Y, Zr, La, Ce, Nd, or Hf). A reduction in impurities serving as electron donors, such as hydrogen, and a reduction in oxygen vacancies can make an oxide semiconductor i-type (intrinsic) or substantially i-type. Such an oxide semiconductor can be referred to as a highly purified oxide semiconductor. The carrier density of an oxide semiconductor can be, for example, lower than $8 \times 10^{15}$ cm$^{-3}$, preferably lower than $1 \times 10^{11}$ cm$^{-3}$, further preferably lower than $1 \times 10^{10}$ cm$^{-3}$ and higher than or equal to $1 \times 10^{-9}$ cm$^{-3}$.

An oxide semiconductor is a semiconductor which has a large energy gap and in which electrons are unlikely to be excited and the effective mass of a hole is large. Accordingly, an avalanche breakdown and the like are less likely to occur in some cases in an OS transistor than in a Si transistor. Since hot-carrier degradation or the like due to the avalanche breakdown is inhibited, the OS transistor has high drain breakdown voltage and can be driven at high drain voltage. Thus, when the OS transistor is used as the transistor Tr1, the range of potentials to be held at the node N can be widened. Accordingly, the amount of data that can be stored in the memory cell MC can be increased.

Note that the transistor Tr1 is not necessarily the OS transistor. For example, a transistor whose channel formation region is formed in part of a substrate containing a single-crystal semiconductor other than an oxide semiconductor can be used. Examples of such a substrate include a single-crystal silicon substrate and a single-crystal germanium substrate. In addition, a transistor whose channel formation region is formed in a film containing a semiconductor material other than an oxide semiconductor can also be used as the transistor Tr1. For example, a transistor in which an amorphous silicon film, a microcrystalline silicon film, a polycrystalline silicon film, a single-crystal silicon film, an amorphous germanium film, a microcrystalline germanium film, a polycrystalline germanium film, or a single-crystal germanium film is used for a semiconductor layer can be used.

Any of the transistors described above can be used as each of the transistor Tr2 and the transistor Tr3. Note that the transistor Tr2 and the transistor Tr3 each preferably operate in a saturation region. Furthermore, even when the transistor Tr2 and the transistor Tr3 each operate out of the saturation region, the transistor Tr2 and the transistor Tr3 each preferably operate so that a signal output from the memory cell MC is in a predetermined range.

<Configuration Example of Current Supply Circuit>

Figure 4:
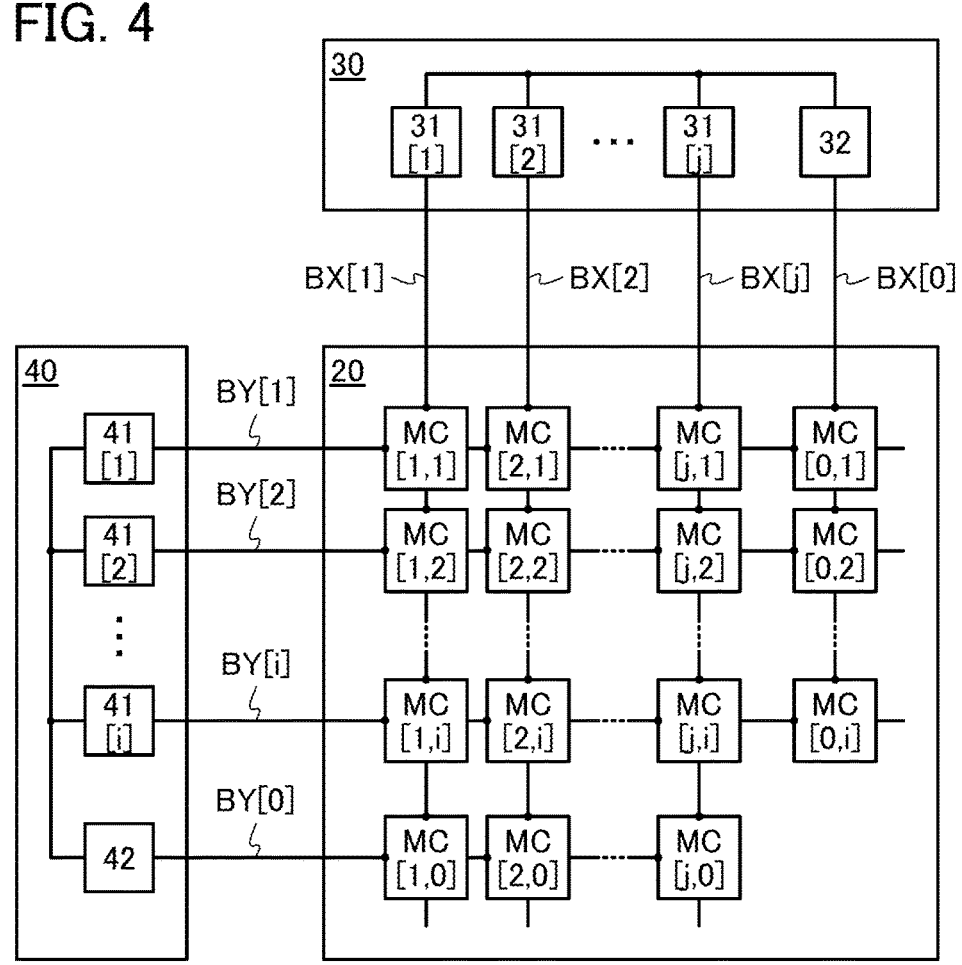
FIG. 4 illustrates a configuration example of a current supply circuit.

FIG. 4 illustrates configuration examples of the current supply circuit 30 and the current supply circuit 40. The current supply circuit 30 includes a plurality of circuits 31 (circuits 31[1] to 31[$j$]) and a circuit 32. The circuits 31[1] to 31[$j$] are connected to the wirings BX[1] to BX[$j$], respectively, and the circuit 32 is connected to the wiring BX[0]. The circuits 31[1] to 31[$j$] are each connected to the circuit 32.

The circuits 31[1] to 31[$j$] have a function of supplying a predetermined current to the wirings BX[1] to BX[$j$], respectively, and the circuit 32 has a function of supplying a predetermined current to the wiring BX[0]. Specifically, the circuit 32 has a function of supplying the current ICX[0] to the wiring BX[0]. The current ICX[0] corresponds to the sum of the currents IX supplied to the memory cells MC[0,1] to MC[0,$i$] functioning as the reference memory cells. At this time, the current ICX[0] also flows through the circuits 31[1] to 31[$j$]. The circuits 31[1] to 31[$j$] have a function of generating currents ICX[1] to ICX[$j$], respectively, using the current ICX[0] and supplying the currents ICX[1] to ICX[$j$] to the wirings BX[1] to BX[$j$], respectively.

The current supply circuit 40 includes a plurality of circuits 41 (circuits 41[1] to 41[$i$]) and a circuit 42. The circuits 41[1] to 41[$i$] are connected to the wirings BY[1] to BY[$i$], respectively, and the circuit 42 is connected to the wiring BY[0]. The circuits 41[1] to 41[$i$] are each connected to the circuit 42.

The circuits 41[1] to 41[$i$] have a function of supplying a predetermined current to the wirings BY[1] to BY[$i$], respectively, and the circuit 42 has a function of supplying a predetermined current to the wiring BY[0]. Specifically, the circuit 42 has a function of supplying the current ICY[0] to the wiring BY[0]. The current ICY[0] corresponds to the sum of the currents IY supplied to the memory cells MC[1,0] to MC[$j$,0] functioning as the reference memory cells. At this time, the current ICY[0] also flows through the circuits 41[1] to 41[$i$]. The circuits 41[1] to 41[$i$] have a function of generating currents ICY[1] to ICY[$i$], respectively, using the current ICY[0] and supplying the currents ICY[1] to ICY[$i$] to the wirings BY[1] to BY[$i$], respectively.

[Configuration Example of Circuits 31]

Figure 5A:
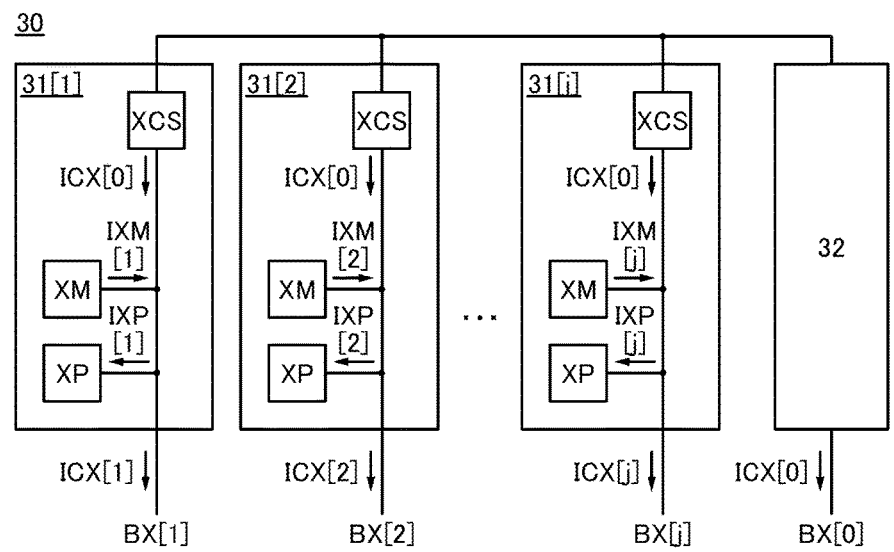
FIGS. 5A and 5B each illustrate a configuration example of a current supply circuit.

FIG. 5A illustrates a configuration example of the circuits 31. The circuits 31 each include a current source XCS, a current source XM, and a current source XP. The current source XCS has a function of generating a current that is the same as the current ICX[0] supplied from the circuit 32 to the wiring BX[0] and supplying the current to the wiring BX connected to the current source XCS. The current source XM functions as a current source circuit, and has a function of supplying a current IXM (a source current) to the wiring BX. The current source XP functions as a current sink circuit, and has a function of receiving a current IXP (a sink current) from the wiring BX. Thus, the current ICX[$j$] supplied from the circuit 31[$j$] to the wiring BX[$j$] is, for example, ICX[0]+IXM[$j$]−IXP[$j$].

Figure 6A:
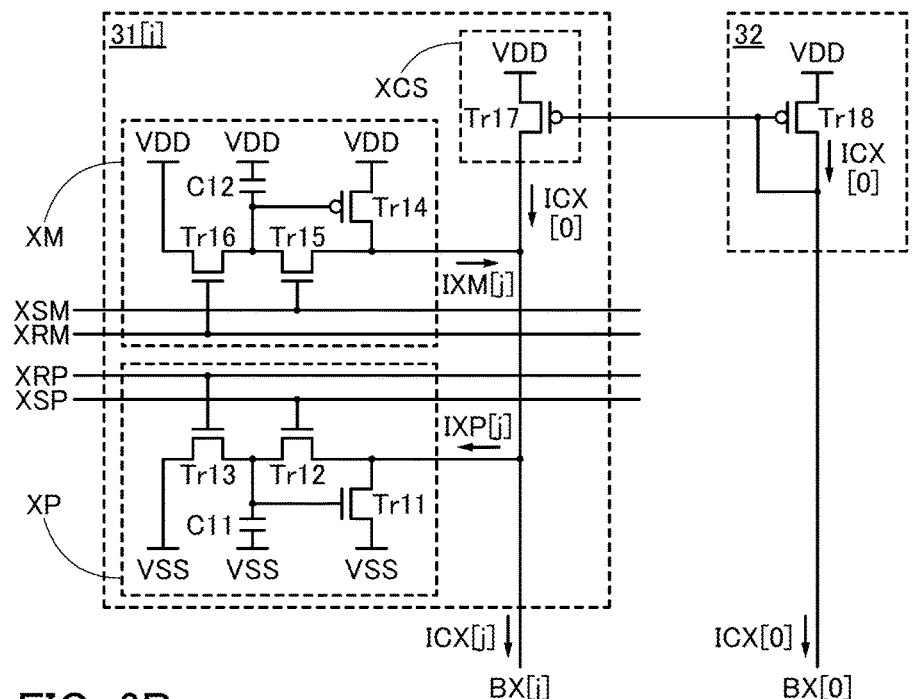
FIGS. 6A and 6B each illustrate a configuration example of a circuit.

FIG. 6A illustrates an example of specific circuit configurations of the circuit 31 and the circuit 32. Note that although the circuit 31[j] is illustrated as a typical example here, the other circuits 31 can also have the same configuration.

The current source XP includes transistors Tr11 to Tr13 and a capacitor C11. A gate of the transistor Tr11 is connected to one of a source and a drain of the transistor Tr12, one of a source and a drain of the transistor Tr13, and one electrode of the capacitor C11, one of a source and a drain of the transistor Tr11 is connected to the wiring BX[j], and the other is connected to a power supply line. A gate of the transistor Tr12 is connected to a wiring XSP, and the other of the source and the drain of the transistor Tr12 is connected to the wiring BX[j]. A gate of the transistor Tr13 is connected to a wiring XRP, and the other of the source and the drain of the transistor Tr13 is connected to a power supply line. The other electrode of the capacitor C11 is connected to a power supply line. Note that an example in which the transistors Tr11 to Tr13 are n-channel transistors and the power supply lines are each a low-potential power supply line VSS is described here.

When the potential of the wiring XRP is set to a high level to turn on the transistor Tr13, electric charge accumulated in the capacitor C11 is reset. After that, the transistor Tr13 is turned off and then the potential of the wiring XSP is set to a high level to turn on the transistor Tr12, so that a current corresponding to the potential of one electrode of the capacitor C11 flows through the transistor Tr11. Thus, the current IXP[j] (the sink current) is supplied from the wiring BX[j] to the current source XP. Specifically, when the current flowing through the wiring BX[j] is lower than the current ICX[0], the potential of the gate of the transistor Tr11 is set so that the current IXP[j] corresponding to the difference between the current flowing through the wiring BX[j] and the current ICX[0] flows through the transistor Tr11.

The current source XM includes transistors Tr14 to Tr16 and a capacitor C12. A gate of the transistor Tr14 is connected to one of a source and a drain of the transistor Tr15, one of a source and a drain of the transistor Tr16, and one electrode of the capacitor C12, one of a source and a drain of the transistor Tr14 is connected to the wiring BX[j], and the other is connected to a power supply line. A gate of the transistor Tr15 is connected to a wiring XSM, and the other of the source and the drain of the transistor Tr15 is connected to the wiring BX[j]. A gate of the transistor Tr16 is connected to a wiring XRM, and the other of the source and the drain of the transistor Tr16 is connected to a power supply line. The other electrode of the capacitor C12 is connected to a power supply line. Note that an example in which the transistor Tr14 is a p-channel transistor, the transistors Tr15 and Tr16 are n-channel transistors, and the power supply lines are each a high-potential power supply line VDD is described here.

When the potential of the wiring XRM is set to a high level to turn on the transistor Tr16, electric charge accumulated in the capacitor C12 is reset. After that, the transistor Tr16 is turned off and then the potential of the wiring XSM is set to a high level to turn on the transistor Tr15, so that a current corresponding to the potential of one electrode of the capacitor C12 flows through the transistor Tr14. Thus, the current IXM[j] (the source current) is supplied from the current source XM to the wiring BX[j]. Specifically, when the current flowing through the wiring BX[j] is higher than the current ICX[0], the potential of the gate of the transistor Tr14 is set so that the current IXM[j] corresponding to the difference between the current flowing through the wiring BX[j] and the current ICX[0] flows through the transistor Tr14.

The current source XCS includes a transistor Tr17. The circuit 32 includes a transistor Tr18. A gate of the transistor Tr17 is connected to a gate of the transistor Tr18, one of a source and a drain of the transistor Tr17 is connected to the wiring BX[j], and the other is connected to a power supply line. The gate of the transistor Tr18 is connected to one of a source and a drain of the transistor Tr18 and the wiring BX[0], and the other of the source and the drain of the transistor Tr18 is connected to a power supply line. Note that an example in which the power supply lines are each a high-potential power supply line VDD is described here.

The current ICX[0] flows through the transistor Tr18. The current ICX[0] corresponds to the sum of the currents IX supplied to the memory cells MC[0,1] to MC[0,i] that function as the reference memory cells. Thus, the circuit 32 functions as a current source supplying the current ICX[0] to the wiring BX[0].

Note that the transistor Tr17 and the transistor Tr18 form a current mirror. Accordingly, a current supplied to the wiring BX[j] through the transistor Tr17 is equal to the current ICX[0] supplied to the wiring BX[0] through the transistor Tr18. Thus, the current source XCS has a function of supplying the current ICX[0] to the wiring BX[j].

As described above, the current supply circuit 30 has a function of supplying the predetermined currents ICX[0] to ICX[j] to the wirings BX[0] to BX[j], respectively.

[Configuration Example of Circuits 41]

Figure 5B:
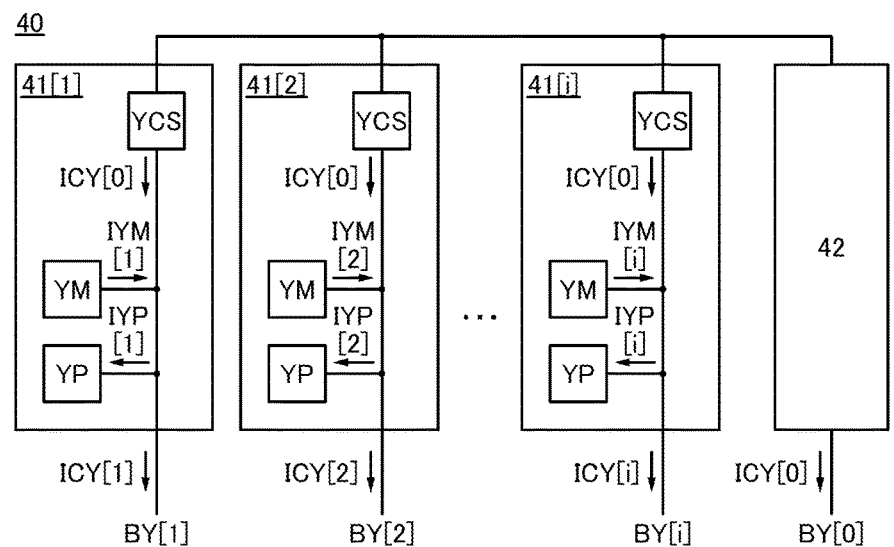

FIG. 5B illustrates a configuration example of the circuits 41. The circuits 41 each include a current source YCS, a current source YM, and a current source YP. The current source YCS has a function of generating a current that is the same as the current ICY[0] supplied from the circuit 42 to the wiring BY[0] and supplying the current to the wiring BY connected to the current source YCS. The current source YM functions as a current source circuit, and has a function of supplying a current IYM (a source current) to the wiring BY. The current source YP functions as a current sink circuit, and has a function of receiving a current IYP (a sink current) from the wiring BY. Thus, the current ICY[i] supplied from the circuit 41[i] to the wiring BY[i] is, for example, ICY[0]+IYM[i]−IYP[i].

Figure 6B:
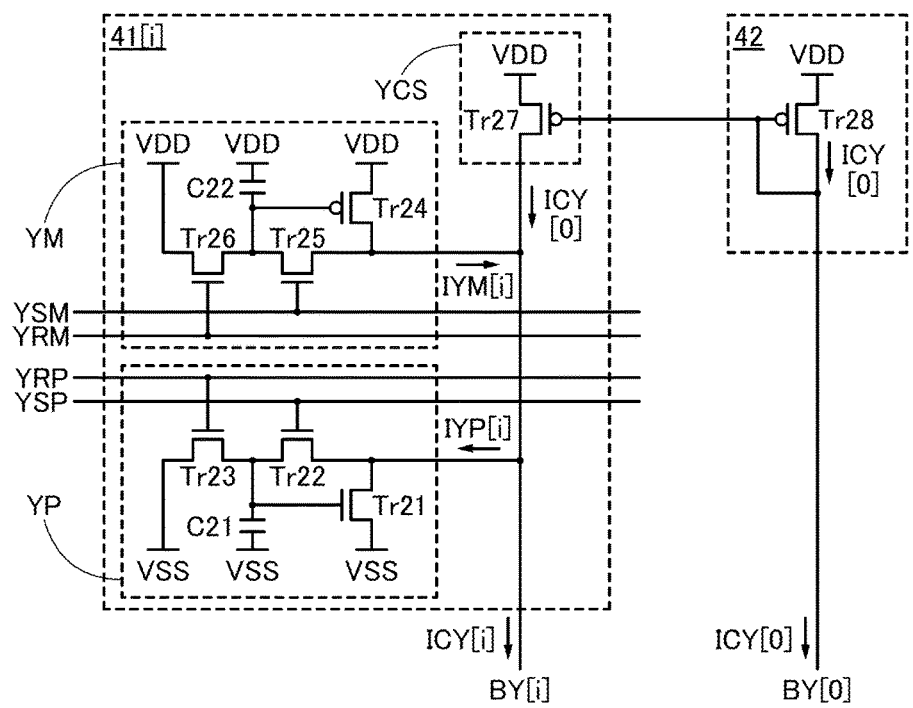

FIG. 6B illustrates an example of specific circuit configurations of the circuit 41 and the circuit 42. Note that although the circuit 41[i] is illustrated as a typical example here, the other circuits 41 can also have the same configuration.

The current source YP includes transistors Tr21 to Tr23 and a capacitor C21. A gate of the transistor Tr21 is connected to one of a source and a drain of the transistor Tr22, one of a source and a drain of the transistor Tr23, and one electrode of the capacitor C21, one of a source and a drain of the transistor Tr21 is connected to the wiring BY[i], and the other is connected to a power supply line. A gate of the transistor Tr22 is connected to a wiring YSP, and the other of the source and the drain of the transistor Tr22 is connected to the wiring BY[i]. A gate of the transistor Tr23 is connected to a wiring YRP, and the other of the source and the drain of the transistor Tr23 is connected to a power supply line. The other electrode of the capacitor C21 is connected to a power supply line. Note that an example in which the transistors Tr21 to Tr23 are n-channel transistors and the power supply lines are each a low-potential power supply line VSS is described here.

When the potential of the wiring YRP is set to a high level to turn on the transistor Tr23, electric charge accumulated in the capacitor C21 is reset. After that, the transistor Tr23 is turned off and then the potential of the wiring YSP is set to a high level to turn on the transistor Tr22, so that a current corresponding to the potential of one electrode of the capacitor C21 flows through the transistor Tr21. Thus, the current IYP[i] (the sink current) is supplied from the wiring BY[i] to the current source YP. Specifically, when the current flowing through the wiring BY[i] is lower than the current ICY[0], the potential of the gate of the transistor Tr21 is set so that the current IYP[i] corresponding to the difference between the current flowing through the wiring BY[i] and the current ICY[0] flows through the transistor Tr21.

The current source YM includes transistors Tr24 to Tr26 and a capacitor C22. A gate of the transistor Tr24 is connected to one of a source and a drain of the transistor Tr25, one of a source and a drain of the transistor Tr26, and one electrode of the capacitor C22, one of a source and a drain of the transistor Tr24 is connected to the wiring BY[i], and the other is connected to a power supply line. A gate of the transistor Tr25 is connected to a wiring YSM, and the other of the source and the drain of the transistor Tr25 is connected to the wiring BY[i]. A gate of the transistor Tr26 is connected to the wiring YRM, and the other of the source and the drain of the transistor Tr26 is connected to a power supply line. The other electrode of the capacitor C22 is connected to a power supply line. Note that an example in which the transistor Tr24 is a p-channel transistor, the transistors Tr25 and Tr26 are n-channel transistors, and the power supply lines are each a high-potential power supply line VDD is described here.

When the potential of the wiring YRM is set to a high level to turn on the transistor Tr26, electric charge accumulated in the capacitor C22 is reset. After that, the transistor Tr26 is turned off and then the potential of the wiring YSM is set to a high level to turn on the transistor Tr25, so that a current corresponding to the potential of one electrode of the capacitor C22 flows through the transistor Tr24. Thus, the current IYM[i] (the source current) is supplied from the current source YM to the wiring BY[i]. Specifically, when the current flowing through the wiring BY[i] is higher than the current ICY[0], the potential of the gate of the transistor Tr24 is set so that the current IYM[i] corresponding to the difference between the current flowing through the wiring BY[i] and the current ICY[0] flows through the transistor Tr24.

The current source YCS includes a transistor Tr27. The circuit 42 includes a transistor Tr28. A gate of the transistor Tr27 is connected to a gate of the transistor Tr28, one of a source and a drain of the transistor Tr27 is connected to the wiring BY[i], and the other is connected to a power supply line. The gate of the transistor Tr28 is connected to one of a source and a drain of the transistor Tr28 and the wiring BY[0], and the other of the source and the drain of the transistor Tr28 is connected to a power supply line. Note that an example in which the power supply lines are each a high-potential power supply line VDD is described here.

The current ICY[0] flows through the transistor Tr28. The current ICY[0] corresponds to the sum of the currents IY supplied to the memory cells MC[1,0] to MC[j,0] that function as the reference memory cells. Thus, the circuit 42 functions as a current source supplying the current ICY[0] to the wiring BY[0].

Note that the transistor Tr27 and the transistor Tr28 form a current mirror. Accordingly, a current supplied to the wiring BY[i] through the transistor Tr27 is equal to the current ICY[0] supplied to the wiring BY[0] through the transistor Tr28. Thus, the current source YCS has a function of supplying the current ICY[0] to the wiring BY[i].

As described above, the current supply circuit 40 has a function of supplying the predetermined currents ICY[0] to ICY[i] to the wirings BY[0] to BY[i], respectively.

A transistor similar to any of the transistors Tr1 to Tr3 described above can be used as each of the transistors illustrated in FIGS. 6A and 6B. Note that it is particularly preferable to use an OS transistor as each of the transistors Tr12, Tr13, Tr15, Tr16, Tr22, Tr23, Tr25 and Tr26. Accordingly, electric charge accumulated in the capacitors C11, C12, C21, and C22 can be certainly held and thus high-accuracy operation can be performed.

The transistors Tr11, Tr14, Tr17, Tr18, Tr21, Tr24, Tr27, and Tr28 each preferably operate in a saturation region. Furthermore, even when these transistors each operate out of the saturation region, these transistors each preferably operate so that a signal output from the current supply circuit 30 or the current supply circuit 40 is in a predetermined range.

<Operation Example of Semiconductor Device>

Figure 7:
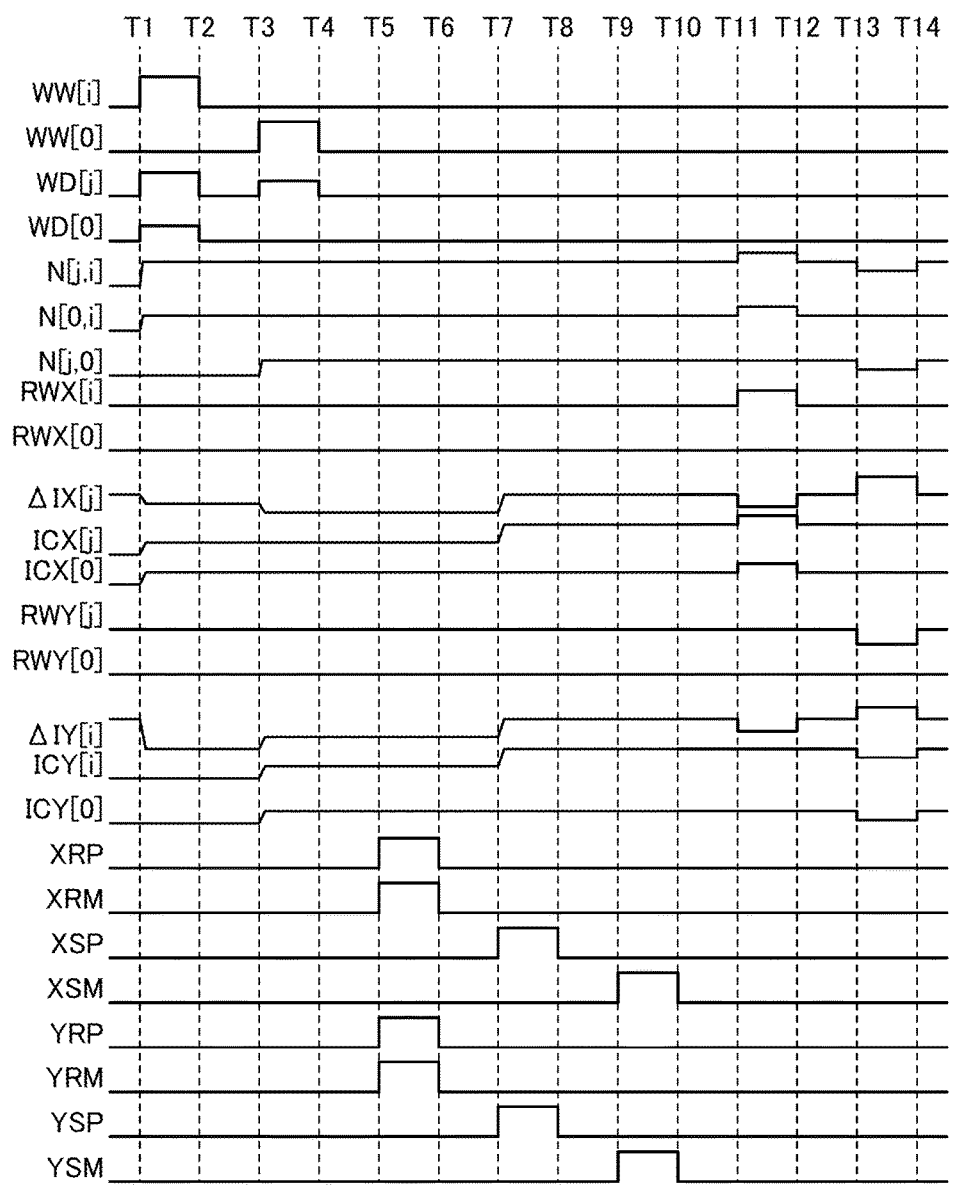
FIG. 7 is a timing chart.
Figure 8:
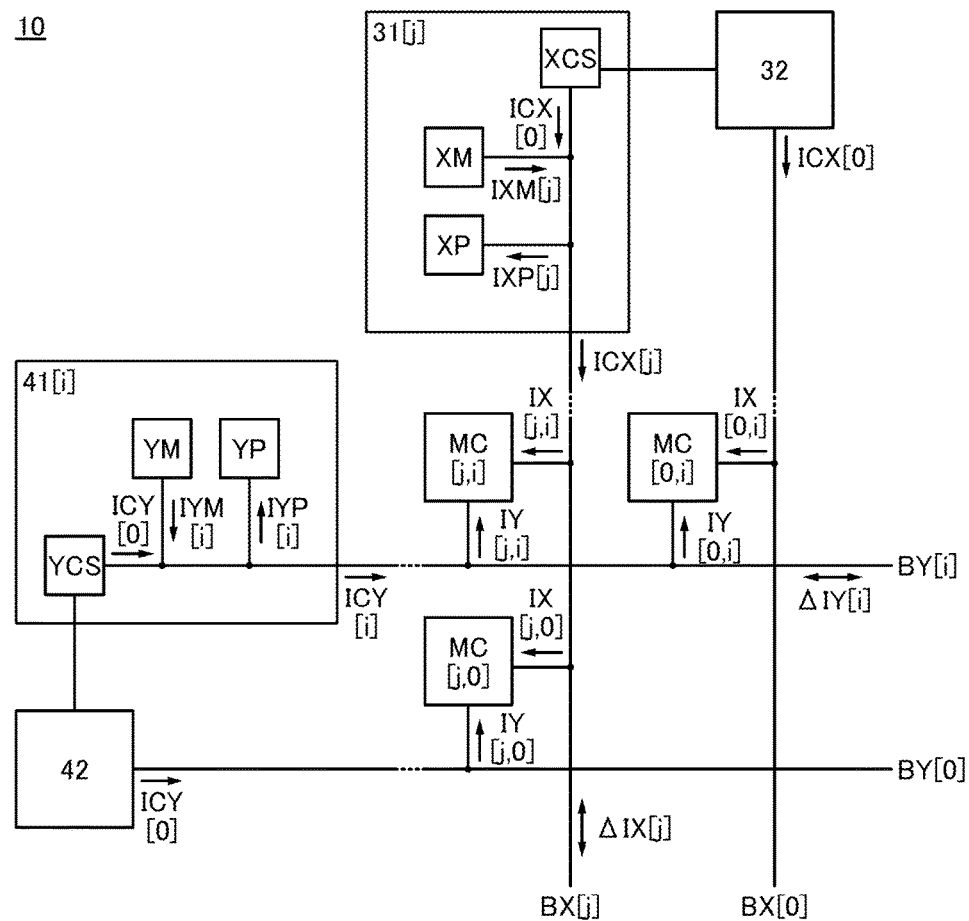
FIG. 8 illustrates the relationship among currents.

Next, a specific operation example of each of the above circuits is described with reference to FIG. 7 and FIG. 8. In a timing chart illustrated in FIG. 7, a period from Time T1 to Time T4 corresponds to a period for storing the first data in the memory cell MC, a period from Time T5 to Time T10 corresponds to a period for setting the current supply circuit 30 and the current supply circuit 40 to initial states, a period from Time T11 to Time T12 corresponds to a period for performing product-sum operation of the first data and the second data, and a period from Time T13 to Time T14 corresponds to a period for performing product-sum operation of the first data and the third data.

Although operations of the memory cell MC[j,i], the memory cell MC[0,i], and the memory cell MC[j,0] illustrated in FIG. 3A, the circuit 31[j] and the circuit 32 illustrated in FIG. 6A, and the circuit 41[i] and the circuit 42 illustrated in FIG. 6B are described as typical examples here, other circuits can be similarly operated. Note that FIG. 8 illustrates the relationship among currents flowing through the wirings connected to the above-described circuits.

[Storage of First Data]

First, in a period from Time T1 to Time T2, the potential of a wiring WW[i], the potential of a wiring WW[0], the potential of a wiring WD[j], and the potential of a wiring WD[0] are set to a high level, a low level, VPR−VW[j,i], and VPR, respectively, and the potentials of a wiring RWX[i], a wiring RWX[0], a wiring RWY[j], and a wiring RWY[0] are set to a reference potential. Thus, the potential of a node N[j,i] becomes VPR−VW[j,i], and the potential of a node N[0,i] becomes VPR. Note that a potential VW[j,i] is an analog potential corresponding to the first data.

Then, the potential of the wiring WW[i] is set to a low level. Accordingly, the potential of the node N[j,i] and the potential of the node N[0,i] are held.

A ground potential or the like can be used as the reference potential. Furthermore, a potential higher than the potential of the low-potential power supply line VSS and lower than the potential of the high-potential power supply line VDD may be used as the reference potential.

Next, in a period from Time T3 to Time T4, the potential of the wiring WW[i], the potential of the wiring WW[0], and the potential of the wiring WD[j] are set to a low level, a high level, and VPR, respectively, and the potentials of the wiring RWX[i], the wiring RWX[0], the wiring RWY[j], and the wiring RWY[0] are set to the reference potential. At this time, the potential of the wiring WD[0] is set to a given potential. Thus, the potential of the node N[j,0] becomes VPR.

Then, the potential of the wiring WW[0] is set to a low level. Accordingly, the potential of the node N[j,0] is held.

Through the above operation, the first data is stored in the memory cell MC.

[Initialization of Current Supply Circuit]

Next, in the period from Time T5 to Time T10, the current supply circuit 30 and the current supply circuit 40 are set to initial states. Note that in the following description, the current IX, the current IY, the current ICX, and the current ICY in the period from Time T5 to Time T10 are denoted by a current IX0, a current IY0, a current ICX0, and a current ICY0, respectively.

In the period from Time T5 to Time T10, the potential of the node N[j,i] is VPR−VW[j,i]. Thus, a current IX0[j,i] flowing from the wiring BX[j] to the memory cell MC[j,i] is expressed by the following Formula (1). Note that in Formula (1), k is a coefficient, and $V_{th}$ is the threshold voltage of the transistor Tr2 included in the memory cell MC[j,i].

$$IX0[j,i]=k(VPR-VW[j,i]-Vth)^2 \quad (1)$$

In the period from Time T5 to Time T10, the potential of the node N[0,i] is VPR. Thus, a current IX0[0,i] flowing from the wiring BX[0] to the memory cell MC[0,i] is expressed by the following Formula (2). Note that in Formula (2), k is a coefficient, and $V_{th}$ is the threshold voltage of the transistor Tr2 included in the memory cell MC[0,i].

$$IX0[0,i]=k(VPR-Vth)^2 \quad (2)$$

The potential of the gate of the transistor Tr18 is determined so that a current ICX0[0]=$\Sigma_i$IX0[0,i], which corresponds to the sum of the currents flowing to the memory cells MC[0,1] to MC[0,i] from the wiring BX[0], is supplied from the circuit 32 to the wiring BX[0]. Note that the transistor Tr17 and the transistor Tr18 form the current mirror and thus the current ICX0[0] also flows through the transistor Tr17.

In the period from Time T5 to Time T10, a current IY0[j,i] flowing from the wiring BY[i] to the memory cell MC[j,i] is expressed by the following Formula (3). Note that in Formula (3), k is a coefficient, and $V_{th}$ is the threshold voltage of the transistor Tr3 included in the memory cell MC[j,i].

$$IY0[j,i]=k(VPR-VW[j,i]-Vth)^2 \quad (3)$$

In the period from Time T5 to Time T10, a current IY0[j,0] flowing from the wiring BY[0] to the memory cell MC[j,0] is expressed by the following Formula (4). Note that in Formula (4), k is a coefficient, and $V_{th}$ is the threshold voltage of the transistor Tr3 included in the memory cell MC[j,0].

$$IY0[j,0]=k(VPR-Vth)^2 \quad (4)$$

The potential of the gate of the transistor Tr28 is determined so that a current ICY0[0]=$\Sigma_j$IY0[j,0], which corresponds to the sum of the currents flowing to the memory cells MC[1,0] to MC[j,0] from the wiring BY[0], is supplied from the circuit 42 to the wiring BY[0]. Note that the transistor Tr27 and the transistor Tr28 form the current mirror and thus the current ICY0[0] also flows through the transistor Tr27.

First, in a period from Time T5 to Time T6, the potentials of the wiring XRP, the wiring XRM, the wiring YRP, and the wiring YRM are set to a high level. Thus, the potentials of the electrodes of the capacitors C11, C12, C21, and C22 are initialized. After that, the potentials of the wiring XRP, the wiring XRM, the wiring YRP, and the wiring YRM are set to a low level.

Next, in a period from Time T7 to Time T8, the potentials of the wiring XSP and the wiring YSP are set to a high level. Thus, the transistor Tr12 and the transistor Tr22 are turned on. At this time, electrical continuity between the gate of the transistor Tr11 and the wiring BX[j] is established, and the current source XP supplies the current IXP[j] determined by the potential of the wiring BX[j]. Furthermore, electrical continuity between the gate of the transistor Tr21 and the wiring BY[i] is established, and the current source YP supplies the current IYP[i] determined by the potential of the wiring BY[i].

Specifically, when the current flowing through the wiring BX[j] is lower than the current ICX0[0], the potential of the gate of the transistor Tr11 is set so that the current IXP [j] corresponding to the difference between the current flowing through the wiring BX[j] and the current ICX0[0] flows through the transistor Tr11. Furthermore, when the current flowing through the wiring BY[i] is lower than the current ICY0[0], the potential of the gate of the transistor Tr21 is set so that the current IYP[i] corresponding to the difference between the current flowing through the wiring BY[i] and the current ICY0[0] flows through the transistor Tr21.

Then, the potentials of the wiring XSP and the wiring YSP are set to a low level. Thus, the transistor Tr12 and the transistor Tr22 are turned off, and the potentials of the gates of the transistor Tr11 and the transistor Tr21 are held.

Next, in a period from Time T9 to Time T10, the potentials of the wiring XSM and the wiring YSM are set to a high level. Thus, the transistor Tr15 and the transistor Tr25 are turned on. At this time, electrical continuity between the gate of the transistor Tr14 and the wiring BX[j] is established, and the current source XM supplies the current IXM[j] determined by the potential of the wiring BX[j]. Furthermore, electrical continuity between the gate of the transistor Tr24 and the wiring BY[i] is established, and the current source YM supplies the current IYM[i] determined by the potential of the wiring BY[i].

Specifically, when the current flowing through the wiring BX[j] is higher than the current ICX0[0], the potential of the gate of the transistor Tr14 is set so that the current IXM[j] corresponding to the difference between the current flowing through the wiring BX[j] and the current ICX0[0] flows through the transistor Tr14. Furthermore, when the current flowing through the wiring BY[i] is higher than the current ICY0[0], the potential of the gate of the transistor Tr24 is set so that the current IYM[i] corresponding to the difference between the current flowing through the wiring BY[i] and the current ICY0[0] flows through the transistor Tr24.

Then, the potentials of the wiring XSM and the wiring YSM are set to a low level to turn off the transistor Tr15 and the transistor Tr25. Thus, the potentials of the gates of the transistor Tr14 and the transistor Tr24 are held.

Through the above operation, the current source XM and the current source XP are set so that a current ICX0[j] is supplied from the circuit 31[j] to the wiring BX[j]. Furthermore, the current source YM and the current source YP are set so that a current ICY0[i] is supplied from the circuit 41[i] to the wiring BY[i].

Note that the potentials of the gates of the transistor Tr11 and the transistor Tr14 are set so that the current supplied from the circuit 31[j] to the wiring BX[j] is equal to the sum of the currents supplied from the wiring BX[j] to the memory cells MC[j,0] to MC[j,i]. In this case, the current ICX0[0] is supplied from the current source XCS, the current IXM[j] is supplied from the current source XM, the current IXP[j] is supplied to the current source XP, and the currents IX0[j,0] to IX0[j,i] are supplied to the memory cells MC[j,0] to MC[j,i], respectively. Thus, the following Formula (5) is satisfied.

$$ICX0[0] + IXM[j] - IXP[j] = \sum_i IX0[j,i] \qquad (5)$$

Similarly, the potentials of the gates of the transistor Tr21 and the transistor Tr24 are set so that the current supplied from the circuit 41[i] to the wiring BY[i] is equal to the sum of the currents supplied from the wiring BY[i] to the memory cells MC[0,i] to MC[j,i]. In this case, the current ICY0[0] is supplied from the current source YCS, the current IYM[i] is supplied from the current source YM, the current IYP[i] is supplied to the current source YP, and the currents IY0[0,i] to IY0[j,i] are supplied to the memory cells MC[0,i] to MC[j,i], respectively. Thus, the following Formula (6) is satisfied.

$$ICY0[0] + IYM[i] - IYP[i] = \sum_j IY0[j,i] \qquad (6)$$

Through the above operation, the current supply circuits are initialized.

[Product-Sum Operation]

Next, in a period from Time T11 to Time T14, the product-sum operation is performed. First, the case where after the current supply circuits are initialized, the potential of the wiring RWX[i] is set to a potential that is higher than the reference potential by VX[i] (hereinafter, this operation is expressed as "the potential of the wiring RWX[i] is set to a potential VX[i]," for example) is considered. Note that the potential VX[i] is an analog potential corresponding to the second data. When the potential of the wiring RWX[i] is changed to the potential VX[i], the potentials of the node N[j,i] and the node N[0,i] are also changed owing to the capacitive coupling of the capacitor CX. Note that a potential VX[0] of the wiring RWX[0] is set to the reference potential.

Because a change in the potential of the wiring RWX[i] is reflected in the node N[j,i] and the node N[0,i] through the capacitor CX, the change in the potential of the wiring RWX[i] is not exactly the same as changes in the potentials of the node N[j,i] and the node N[0,i] in some actual cases. Specifically, the changes in the potentials of the node N[j,i] and the node N[0,i] needs to be obtained by multiplying a capacitive coupling coefficient, which is calculated from the capacitance of the capacitor CX, the capacitance of the capacitor CY, the gate capacitance of the transistor Tr2, the gate capacitance of the transistor Tr3, and a parasitic capacitance by the change in the potential of the wiring RWX[i]. However, the changes in the potentials of the node N[j,i] and the node N[0,i] when the potential of the wiring RWX[i] is changed to the potential VX[i] (the potential obtained by multiplying the change in the potential of the wiring RWX[i] by the capacitive coupling coefficient) are also referred to as the potential VX[i] for simplicity. A potential actually supplied to the wiring RWX[i] is adjusted as appropriate in consideration of the capacitive coupling coefficient.

When the potential of the wiring RWX[i] is set to the potential VX[i], the current IX[j,i] flowing from the wiring BX[j] to the memory cell MC[j,i] is expressed by the following Formula (7). Note that in Formula (7), k is a coefficient, and $V_{th}$ is the threshold voltage of the transistor Tr2 included in the memory cell MC[j,i].

$$IX[j,i]=k(VPR-VW[j,i]+VX[i]-Vth)^2 \qquad (7)$$

Furthermore, the current IX[0,i] flowing from the wiring BX[0] to the memory cell MC[0,i] is expressed by the following Formula (8). Note that in Formula (8), k is a coefficient, and $V_{th}$ is the threshold voltage of the transistor Tr2 included in the memory cell MC[0,i].

$$IX[0,i]=k(VPR+VX[i]-Vth)^2 \qquad (8)$$

Note that the potential of the gate of the transistor Tr18 included in the circuit 32 is set so that the current ICX[0] =$\Sigma_i$IX[0,i], which corresponds to the sum of the currents flowing to the memory cells MC[0,1] to MC[0,i] from the wiring BX[0], is supplied from the circuit 32 to the wiring BX[0]. Furthermore, the transistor Tr17 and the transistor Tr18 form the current mirror and thus the current ICX[0] also flows through the transistor Tr17.

With regard to the current flowing through the wiring BX[j], the current ICX[0] is supplied from the current source XCS, the current IXM[j] is supplied from the current source XM, the current IXP [j] is supplied to the current source XP, and the currents IX[j,0] to IX[j,i] are supplied to the memory cells MC[j,0] to MC[j,i], respectively. Note that the current IXM[j] and the current IXP[j] are set in the period from Time T5 to Time T10. In this case, a differential current ΔIX[j] flows through the wiring BX[j] (see FIG. 8). The differential current ΔIX[j] corresponds to the difference between the current supplied from the circuit 31 [j] to the wiring BX[j] and the currents supplied from the wiring BX[j] to the memory cells MC[j,0] to MC[j,i]. The differential current ΔIX[j] is expressed by the following formula.

$$\Delta IX[j] = (ICX[0] + IXM[j] - IXP[j]) - \sum_i IX[j,i]$$

Note that according to Formula (5), ΔIX[j] is expressed by the following formula.

$$\Delta IX[j] = \left(\sum_i IX0[j,i] + ICX[0] - ICX0[0]\right) - \sum_i IX[j,i]$$
$$= \sum_i IX[0,i] - \sum_i IX[j,i] - \sum_i IX0[0,i] + \sum_i IX0[j,i]$$

When Formulae (1), (2), (7), and (8) are substituted into the above formula, the differential current ΔIX[j] is expressed by the following formula.

$$\Delta IX[j] =$$
$$\sum_i k(VPR+VX[i]-Vth)^2 - \sum_i k(VPR-VW[j,i]+VX[i]-Vth)^2 -$$
$$\sum_i k(VPR-Vth)^2 + \sum_i k(VPR-VW[j,i]-Vth)^2$$

Thus, the differential current ΔIX[j] is expressed by the following Formula (9).

$$\Delta IX[j] = 2k \sum_{i} (VW[j,i] \cdot VX[i]) \quad (9)$$

Note that in Formula (9), $\Sigma_i(VW[j,i] \cdot VX[i])$ corresponds to the sum of products of the potentials VW corresponding to the first data and the potentials VX corresponding to the second data. Thus, when the differential current ΔIX[j] is measured, the product-sum of the first data and the second data can be obtained. As described above, the product-sum operation of the first data and the second data can be performed using the semiconductor device 10.

Similarly, the case where the potential of the wiring RWY[j] is set to a potential that is higher than the reference potential by VY[j] (hereinafter, this operation is expressed as "the potential of the wiring RWY[j] is set to a potential VY[j]," for example) is considered. Note that the potential VY[j] is an analog potential corresponding to the third data. When the potential of the wiring RWY[j] is changed to the potential VY[j], the potentials of the node N[j,i] and the node N[j,0] are also changed owing to the capacitive coupling of the capacitor CY. Note that the potential VY[0] of the wiring RWY[0] is set to the reference potential. In this case, a differential current ΔIY[i] flows through the wiring BY[i] (see FIG. 8). The differential current ΔIY[i] corresponds to the difference between the current supplied from the circuit 41[i] to the wiring BY[i] and the currents supplied from the wiring BY[i] to the memory cells MC[0,i] to MC[j,i]. The differential current ΔIY[i] is expressed by the following Formula (10).

$$\Delta IY[i] = 2k \sum_{j} (VW[j,i] \cdot VY[j]) \quad (10)$$

Note that in Formula (10), $\Sigma_j(VW[j,i] \cdot VY[j])$ corresponds to the sum of products of the potentials VW corresponding to the first data and the potentials VY corresponding to the third data. Thus, when the differential current ΔIY[i] is measured, the product-sum of the first data and the third data can be obtained. As described above, the product-sum operation of the first data and the third data can be performed using the semiconductor device 10.

Next, a specific operation at the time when the product-sum operation is performed is described. First, in the period from Time T11 to Time T12, the potential of the wiring RWX[i] is set to the potential VX[i], and the potential of the wiring RWY[j] is set to the reference potential. Thus, the potential of the node N[j,i] becomes VPR−VW[j,i]+VX[i], and the potential of the node N[0,i] becomes VPR+VX[i]. Then, the current IX[j,i] flows from the wiring BX[j] to the memory cell MC[j,i], and the current IX[0,i] flows from the wiring BX[0] to the memory cell MC[0,i] (see Formulae (7) and (8)).

At this time, the differential current ΔIX[j]=2kΣ$_i$(VW[j,i]=VX[i]) flows through the wiring BX[j]. That is, a current corresponding to the result of the product-sum operation performed on the basis of the first data stored in the memory cells MC[j,0] to MC[j,i] and the second data supplied to the memory cells MC[j,0] to MC[j,i] through the wirings RWX[0] to RWX[i] is supplied to the wiring BX[j]. As described above, the product-sum operation of the first data and the second data is performed.

After that, the potential of the wiring RWX[i] is returned to the reference potential to complete the product-sum operation.

Next, in the period from Time T13 to Time T14, the potential of the wiring RWX[i] is set to the reference potential, and the potential of the wiring RWY[j] is set to the potential VY[j]. Thus, the potential of the node N[j,i] becomes VPR−VW[j,i]+VY[j], and the potential of the node N[j,0] becomes VPR+VY[j]. Then, the current IY[j,i] flows from the wiring BY[i] to the memory cell MC[j,i], and the current IY[j,0] flows from the wiring BY[0] to the memory cell MC[j,0].

At this time, the differential current ΔIY[i]=2kΣ$_j$(VW[j,i]·VY[j]) flows through the wiring BY[i]. That is, a current corresponding to the result of the product-sum operation performed on the basis of the first data stored in the memory cells MC[0,i] to MC[j,i] and the third data supplied to the memory cells MC[0,i] to MC[j,i] through the wirings RWY[0] to RWY[j] is supplied to the wiring BY[i]. As described above, the product-sum operation of the first data and the third data is performed.

Through the above operation, the two types of product-sum operations, i.e., the product-sum operation of the first data and the second data and the product-sum operation of the first data and the third data can be performed using the memory cells MC.

Figure 9:
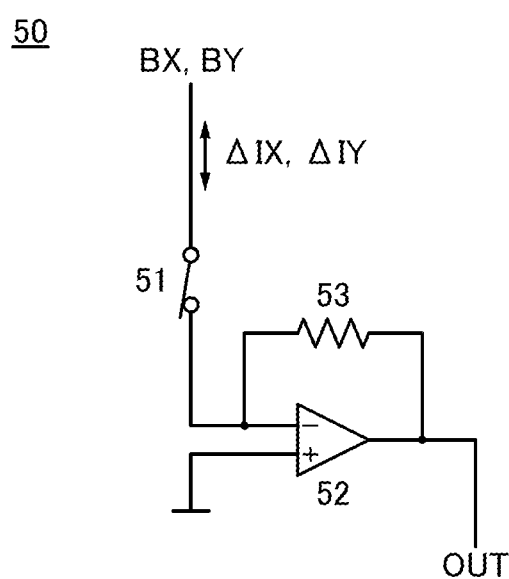
FIG. 9 illustrates a configuration example of a circuit.

Note that when the differential current ΔIX output to the wiring BX or the differential current ΔIY output to the wiring BY is converted into a voltage, a voltage corresponding to the result of the product-sum operation of the two pieces of analog data can be obtained. FIG. 9 illustrates a configuration example of a circuit 50 having a function of converting a differential current into a voltage.

The circuit 50 includes a switch 51, an operational amplifier 52, and a resistor 53. Wiring resistance may be used instead of the resistor 53. An inverting input terminal of the operational amplifier 52 is connected to the wiring BX or the wiring BY through the switch 51. A non-inverting input terminal of the operational amplifier 52 is connected to a wiring to which a predetermined potential is supplied. An output terminal of the operational amplifier 52 is connected to the inverting input terminal through the resistor 53. When the switch 51 is turned on, a potential corresponding to the differential current ΔIX or the differential current ΔIY is output to a wiring OUT.

<Configuration Example of Driver Circuit>

Figure 10A:
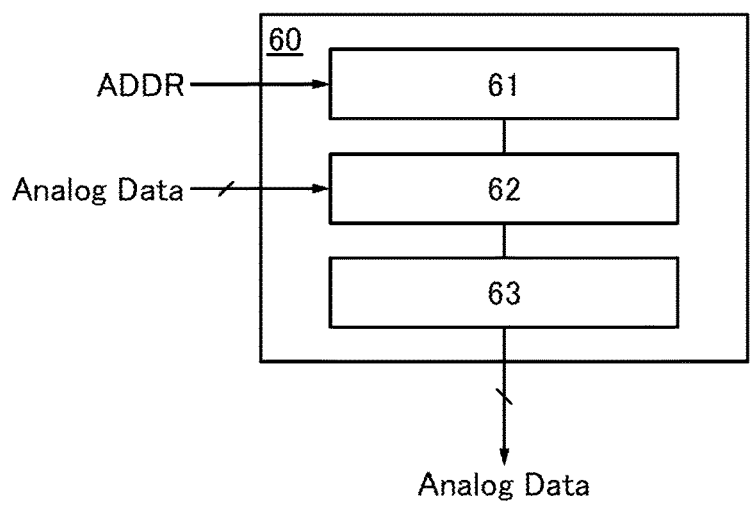
FIG. 10A illustrates a configuration example of a driver circuit.

Next, a configuration example of a driver circuit that can be used in the semiconductor device 10 is described. FIG. 10A illustrates a configuration example of a driver circuit 60 having a function of supplying an analog potential to the cell array 20. The driver circuit 60 has a function of supplying an analog potential corresponding to the first data to the wiring WD, a function of supplying an analog potential corresponding to the second data to the wiring RWX, or a function of supplying an analog potential corresponding to the third data to the wiring RWY. The driver circuit 60 includes a decoder 61, a sampling circuit 62, and an analog buffer 63.

The decoder 61 has a function of selecting the memory cells MC. Specifically, the decoder 61 has a function of selecting the wiring WD, the wiring RWX, or the wiring RWY connected to the memory cells MC in accordance with an address signal ADDR.

The sampling circuit 62 has a function of sampling analog data of the selected memory cells MC. Specifically, the sampling circuit 62 has a function of obtaining analog data from the outside in accordance with the selected memory cells MC and holding the analog data. The analog data sampled by the sampling circuit 62 is output to the wiring WD, the wiring RWX, or the wiring RWY through the analog buffer 63.

Figure 10B:
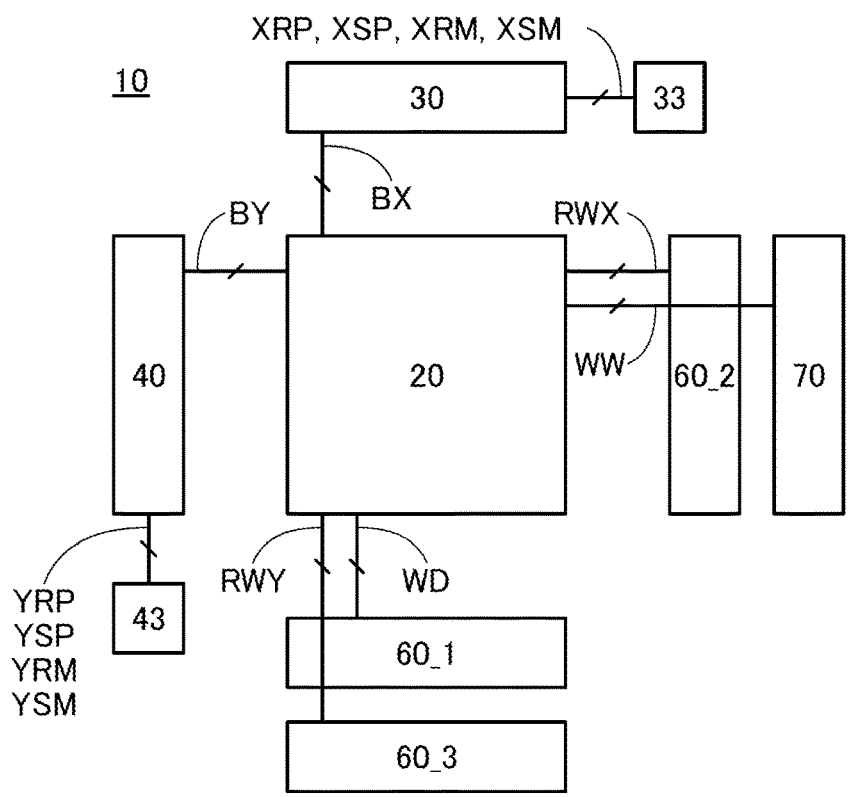
FIG. 10B illustrates a configuration example of a semiconductor device.

FIG. 10B illustrates a configuration example of the semiconductor device 10 including the driver circuit 60. In FIG. 10B, a driver circuit 60_1 refers to the driver circuit 60 having a function of supplying an analog potential corresponding to the first data to the wiring WD, a driver circuit 60_2 refers to the driver circuit 60 having a function of supplying an analog potential corresponding to the second data to the wiring RWX, and a driver circuit 60_3 refers to the driver circuit 60 having a function of supplying an analog potential corresponding to the third data to the wiring RWY. With the driver circuits 60_1 to 60_3, the first data, the second data, and the third data (each of the first to third data is analog data) can be supplied to the wiring WD, the wiring RWX, and the wiring RWY, respectively.

In addition, the semiconductor device 10 includes a driver circuit 33, a driver circuit 43, and a driver circuit 70. The driver circuit 33 has a function of supplying a predetermined potential to the wiring XRP, the wiring XSP, the wiring XRM, and the wiring XSM illustrated in FIG. 6A. The driver circuit 43 has a function of supplying a predetermined potential to the wiring YRP, the wiring YSP, the wiring YRM, and the wiring YSM illustrated in FIG. 6B. The driver circuit 70 has a function of supplying a selection signal to the wiring WW.

As described above, in one embodiment of the present invention, product-sum operation of analog data can be performed by using the novel memory cell MC. Thus, conversion of analog data into digital data in performing operation can be eliminated and the device can operate at high speed. Furthermore, in one embodiment of the present invention, two types of operations (product operation of the first data and the second data, and product operation of the first data and the third data) can be performed using the memory cell MC having a relatively simple configuration as illustrated in FIG. 3A. Thus, the semiconductor device 10 can operate at high speed, or the area of the semiconductor device 10 can be reduced.

Furthermore, in one embodiment of the present invention, an OS transistor is used in the memory cell MC, the current supply circuit 30, or the current supply circuit 40, whereby power consumption can be reduced or accuracy of operation can be improved.

This embodiment can be combined with any of the other embodiments as appropriate.

Embodiment 2

In this embodiment, modification examples of the semiconductor device described in Embodiment 1 is described.
<Modification Example of Memory Cell>

Figure 11A:
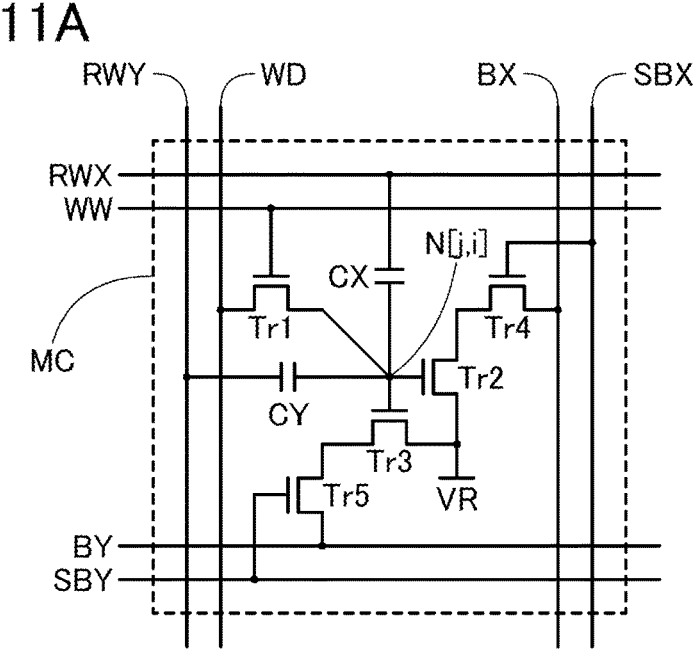
FIGS. 11A to 11C each illustrate a configuration example of a memory cell.

FIG. 11A illustrates a modification example of the memory cell MC. The memory cell MC illustrated in FIG. 11A is different from the memory cells MC illustrated in FIG. 3A in that a transistor Tr4 and a transistor Tr5 are included.

A gate of the transistor Tr4 is connected to a wiring SBX, one of a source and a drain of the transistor Tr4 is connected to one of the source and the drain of the transistor Tr2, and the other of the source and the drain of the transistor Tr4 is connected to the wiring BX. A gate of the transistor Tr5 is connected to a wiring SBY, one of a source and a drain of the transistor Tr5 is connected to one of the source and the drain of the transistor Tr3, and the other of the source and the drain of the transistor Tr5 is connected to the wiring BY. The wiring SBX and the wiring SBY each have a function of transmitting a selection signal.

When the wiring SBX is set to a low level to turn off the transistor Tr4, electrical continuity between the transistor Tr2 and the wiring BX can be stopped. Furthermore, when the wiring SBY is set to a low level to turn off the transistor Tr5, electrical continuity between the transistor Tr3 and the wiring BY can be stopped. Thus, when the current supply circuit is not initialized or product-sum operation is not performed, a current flowing between the memory cell MC and the wiring BX or the wiring BY can be stopped, whereby power consumption can be reduced.

Note that when an OS transistor is used as the transistor Tr4 or the transistor Tr5, the transistor can have an extremely low off-state current and thus power consumption can be effectively reduced. When an OS transistor is used as the transistor Tr1 and one of the transistor Tr4 and the transistor Tr5, the ratio of channel width to channel length (W/L) of the transistor Tr4 or the transistor Tr5 is preferably higher than W/L of the transistor Tr1. Thus, the current drive capability of the transistor Tr4 or the transistor Tr5 can be improved, and high-speed operation can be achieved.

Figure 11B:
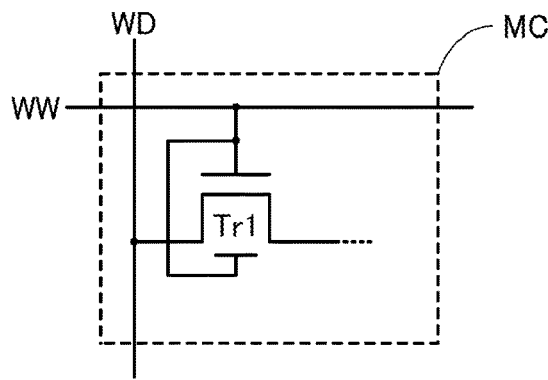
Figure 11C:
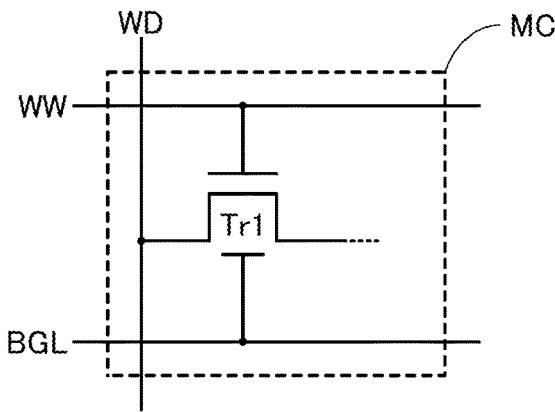

A transistor included in the memory cell MC may include a pair of gates. FIGS. 11B and 11C each illustrate an example in which the transistor Tr1 includes a pair of gates. Note that the transistor Tr1 is an OS transistor. When a transistor includes a pair of gates, one of the pair of gates in the transistor is referred to as a first gate, a front gate, or simply a gate in some cases, and the other thereof is referred to as a second gate or a back gate in some cases.

The transistor Tr1 illustrated in FIG. 11B includes a back gate, and the back gate is connected to a front gate. In this case, the potential of the front gate is equal to the potential of the back gate.

The back gate of the transistor Tr1 illustrated in FIG. 11C is connected to a wiring BGL. The wiring BGL has a function of supplying a predetermined potential to the back gate. The threshold voltage of the transistor Tr1 can be controlled by controlling the potential of the wiring BGL. For example, when the potential of the wiring BGL is changed between a period when the transistor Tr1 is in an on state and a period when the transistor Tr1 is in an off state, the threshold voltage of the transistor Tr1 can be changed. Note that the wiring BGL can be shared among all the memory cells MC, or the memory cells MC that are on the same row or the same column.

Although an example in which the transistor Tr1 includes the pair of gates is described here, each of the transistors Tr2 to Tr5 may include a pair of gates. In addition, each of the transistors illustrated in FIGS. 6A and 6B may include a pair of gates.
<Modification Example of Current Supply Circuit>

Figure 12A:
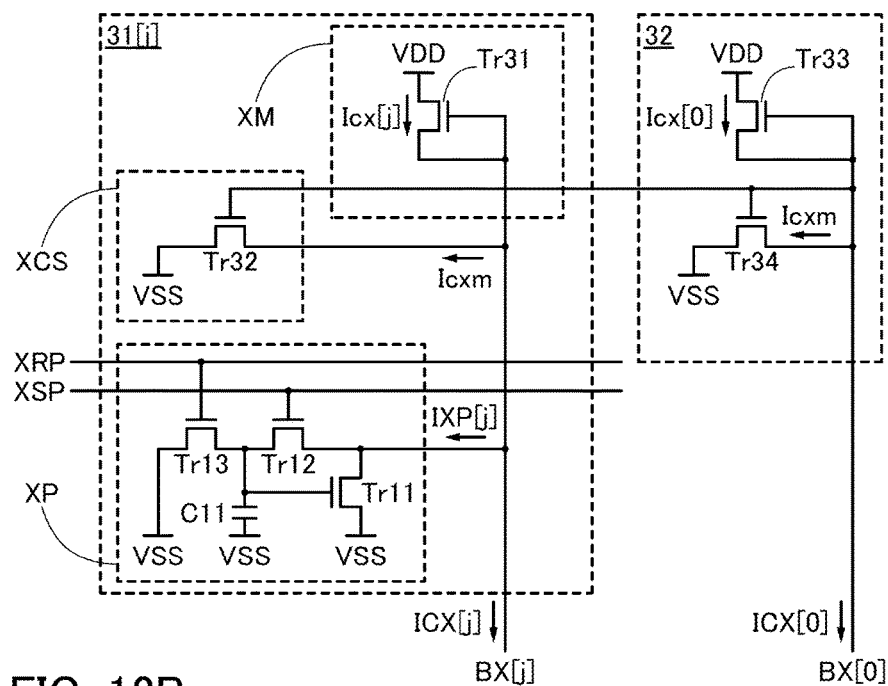
FIGS. 12A and 12B each illustrate a configuration example of a current supply circuit.

FIG. 12A illustrates modification examples of the circuit 31 and the circuit 32. The circuit 31 illustrated in FIG. 12A is different from that illustrated in FIG. 6A in the configurations of the current source XM and the current source XCS. The circuit 32 illustrated in FIG. 12A has a configuration different from that of the circuit 32 illustrated in FIG. 6A.

The current source XM and the current source XCS illustrated in FIG. 12A include a transistor Tr31 and a transistor Tr32, respectively. The circuit 32 includes a transistor Tr33 and a transistor Tr34. The transistor Tr33 functions as a constant current source.

A gate of the transistor Tr31 is connected to one of a source and a drain of the transistor Tr31 and the wiring BX[j], and the other of the source and the drain of the transistor Tr31 is connected to a power supply line (here, a high-potential power supply line VDD). A gate of the transistor Tr32 is connected to a gate of the transistor Tr34, one of a source and a drain of the transistor Tr32 is connected to the wiring BX[j], and the other is connected to a power supply line (here, a low-potential power supply line VSS). A gate of the transistor Tr33 is connected to one of a source and a drain of the transistor Tr33 and the wiring BX[0], and the other of the source and the drain of the transistor Tr33 is connected to a power supply line (here, a high-potential power supply line VDD). The gate of the transistor Tr34 is connected to one of a source and a drain of the transistor Tr34 and the wiring BX[0], and the other of the source and the drain of the transistor Tr34 is connected to a power supply line (here, a low-potential power supply line VSS).

With the above configuration, the circuit 31 and the circuit 32 can be formed using transistors having the same conductivity.

Next, operations of the circuit 31 and the circuit 32 illustrated in FIG. 12A are described.

[Initialization of Current Supply Circuit]

A current Icx[0] is supplied from the transistor Tr33 functioning as the constant current source to the wiring BX[0]. At this time, the potential of the gate of the transistor Tr34 is determined so that the current $ICX0[0]=\Sigma_i IX0[0,i]$ is supplied from the circuit 32 to the wiring BX[0], and a current Icxm0 flows through the transistor Tr34. Note that since the gate of the transistor Tr34 is connected to the gate of the transistor Tr32, the current Icxm0 also flows through the transistor Tr32.

In the circuit 31[j], a current Icx[j] is supplied from the transistor Tr31 functioning as a constant current source to the wiring BX[j]. At this time, the current source XP is set so that the current $ICX0[j]=\Sigma_i IX0[j,i]$ is supplied from the circuit 31[j] to the wiring BX[j], and the current IXP[j] flows through the transistor Tr11. After that, the transistor Tr12 is turned off, and the current source XP is set to supply the current IXP [$_j$] (the sink current).

[Product-Sum Operation]

The current Icx[0] is supplied from the transistor Tr33 functioning as the constant current source to the wiring BX[0]. At this time, the potential of the gate of the transistor Tr34 is determined so that the current $ICX[0]=\Sigma_i IX[0,i]$ is supplied from the circuit 32 to the wiring BX[0], and a current Icxm flows through the transistor Tr34. Note that since the gate of the transistor Tr34 is connected to the gate of the transistor Tr32, the current Icxm also flows through the transistor Tr32.

In the circuit 31[j], the current Icx[j] is supplied from the transistor Tr31 functioning as the constant current source to the wiring BX[j]. At this time, the current source XP is set to supply the current IXP[j] (the sink current), and the differential current ΔIX[j] expressed by Formula (9) is generated in the wiring BX[j]. The differential current ΔIX[j] corresponds to the result of the product-sum operation of the first data and the second data.

As described above, the product-sum operation of the first data and the second data can be performed using the circuit 31 and the circuit 32 illustrated in FIG. 12A.

Figure 12B:
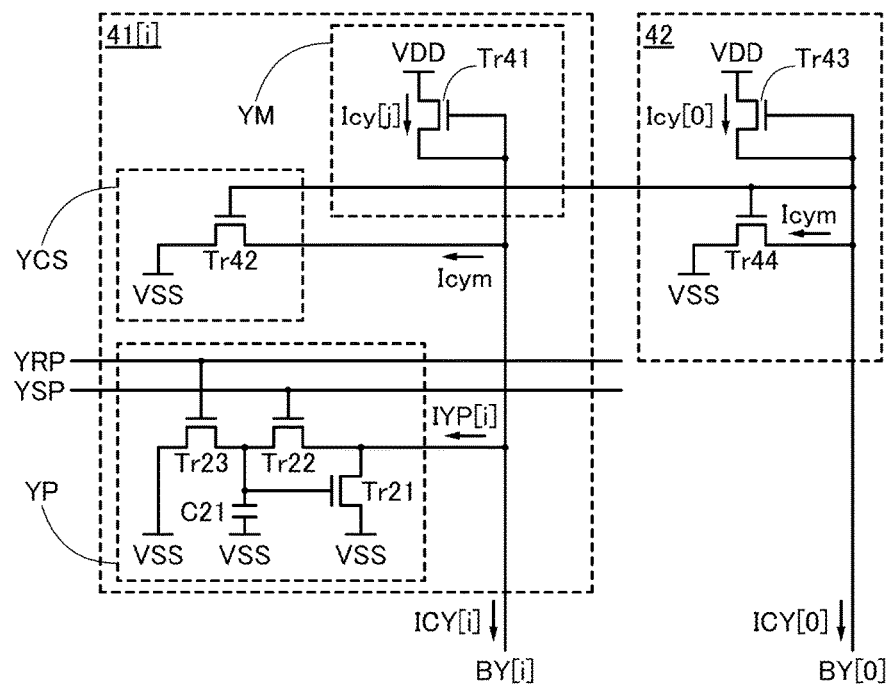

FIG. 12B illustrates modification examples of the circuit 41 and the circuit 42. The circuit 41[i] illustrated in FIG. 12B is different from that illustrated in FIG. 6B in the configurations of the current source YM and the current source YCS. The circuit 42 illustrated in FIG. 12B has a configuration different from that of the circuit 42 illustrated in FIG. 6B.

The current source YM and the current source YCS illustrated in FIG. 12B include a transistor Tr41 and a transistor Tr42, respectively. The circuit 42 includes a transistor Tr43 and a transistor Tr44. The transistor Tr43 functions as a constant current source. Detailed description of the configurations and functions of the circuit 41 and the circuit 42 illustrated in FIG. 12B is omitted because they are the same as the configurations and functions of the circuit 31 and the circuit 32 illustrated in FIG. 12A. Product-sum operation of the first data and the third data can be performed using the circuit 41 and the circuit 42 illustrated in FIG. 12B.

Any of the transistors described in Embodiment 1 can be used as each of the transistors Tr31 to Tr34 and the transistors Tr41 to Tr44. Note that it is particularly preferable that the transistors Tr31, Tr33, Tr41, and Tr43 each include a back gate as illustrated in FIG. 11C. In this case, the amount of current supplied from each of the transistors Tr31, Tr33, Tr41, and Tr43 functioning as the constant current source can be adjusted by controlling the potential of the wiring BGL.

As described above, the memory cell MC, the current supply circuit 30, and the current supply circuit 40 of one embodiment of the present invention can each have a variety of configurations.

This embodiment can be combined with any of the other embodiments as appropriate.

Embodiment 3

In this embodiment, application examples of the semiconductor device described in any of the above embodiments to a neural network are described.

The neural network is an information processing system modeled on a biological neural network. In the neural network, a plurality of units that resemble neurons (neuron circuits) are connected to each other through a plurality of units that resemble synapses. Learning is performed when the connection strength is changed in accordance with an input signal and thus pattern recognition, associative storage, or the like can be performed at high speed.

Figure 13A:
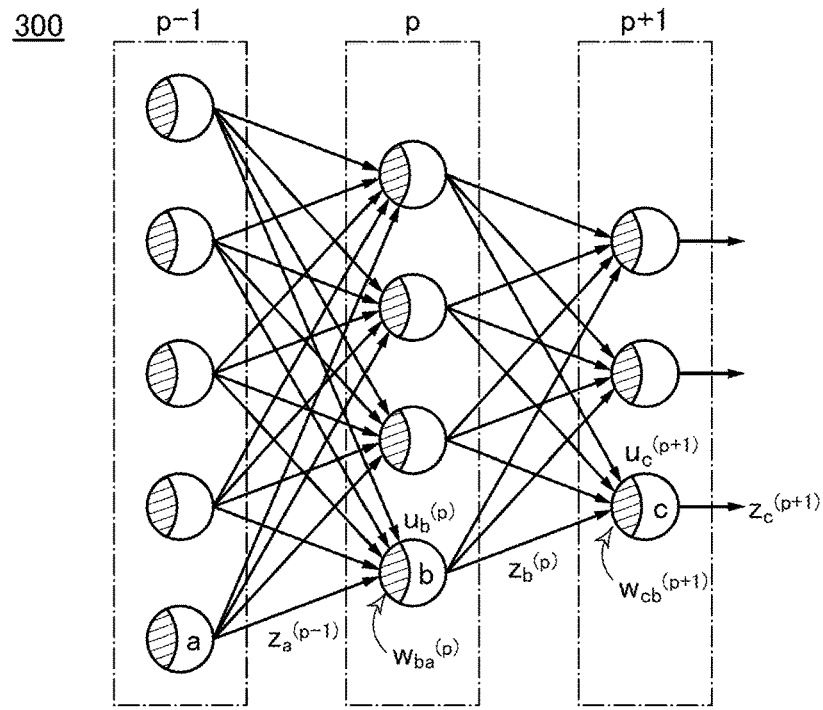
FIGS. 13A and 13B each illustrate a configuration example of a neural network.

Configuration examples of a neural network that uses the semiconductor device 10 are described with reference to FIGS. 13A and 13B and FIGS. 14A to 14E. FIG. 13A illustrates a configuration example of the neural network. A neural network 300 is a hierarchical neural network including a plurality of layers. Each of the layers includes a plurality of neuron circuits represented by circles in the drawings. Here, the case where the neural network 300 includes L layers (L is an integer greater than or equal to 2) is described. FIG. 13A illustrates a (p−1)th layer, a p-th layer, and a (p+1)th layer (p is an integer greater than or equal to 2 and less than or equal to L−1). The (p−1)th layer includes first to a-th neuron circuits, the p-th layer includes first to b-th neuron circuits, and the (p+1)th layer includes first to c-th neuron circuits (a, b, and c are each an integer greater than or equal to 1).

When the a-th neuron circuit and the b-th neuron circuit are focused on, the output $z_a^{(p+1)}$ of the a-th neuron circuit is input to the b-th neuron circuit in the p-th layer. Note that the weight coefficient is represented by $w_{ba}^{(p)}$. Furthermore, when the b-th neuron circuit and the c-th neuron circuit are focused on, the output $z_b^{(p)}$ of the b-th neuron circuit is input to the c-th neuron circuit in the (p+1)th layer. Note that the weight coefficient is represented by $w_{cb}^{(p+1)}$. The output of the c-th neuron circuit is represented by $z_c^{(p+1)}$.

Note that the summation $u_b^{(p)}$ (net value) input to the b-th neuron circuit included in the p-th layer is expressed by the following Formula (11).

$$u_b^{(p)} = \sum_a w_{ba}^{(p)} \cdot z_a^{(p-1)} \tag{11}$$

For example, in FIG. 2, the weight coefficients $w_{b1}^{(p)}$ to $w_{ba}^{(p)}$ of the p-th layer are stored as the first data in the memory cells MC[p,1] to MC[p,a], and the outputs $z_1^{(p+1)}$ to $z_a^{(p+1)}$ of the neuron circuits in the (p−1)th layer are supplied as the second data to the wirings RWX[1] to RWX[a], whereby the summation $u_b^{(p)}$ (net value) input to the b-th neuron circuit included in the p-th layer can be obtained from the differential current ΔIX flowing through the wiring BX[p]. Thus, Formula (11) can be calculated using the semiconductor device 10.

The output $z_b^{(p)}$ of the b-th neuron circuit included in the p-th layer is expressed by the following Formula (12).

$$z_b^{(p)} = f(u_b^{(p)}) \tag{12}$$

Note that $f(u_b^{(p)})$ is the output function of the neuron circuit. A step function, a linear ramp function, a sigmoid function, or the like can be used as the output function. Formula (12) can be calculated with a circuit 311 illustrated in FIG. 14A. Note that the output function corresponds to output characteristics of an operational amplifier. Furthermore, calculation of Formula (12) may be performed by connecting an arithmetic circuit, which can execute a desired output function, to an output terminal of the operational amplifier.

Similarly, the summation $u_c^{(p+1)}$ (net value) input to the c-th neuron circuit included in the (p+1)th layer is expressed by the following Formula (13).

$$u_c^{(p+1)} = \sum_b w_{cb}^{(p+1)} \cdot z_b^{(p)} \tag{13}$$

For example, in FIG. 2, the weight coefficients $w_{c1}^{(p+1)}$ to $w_{cb}^{(p+1)}$ of the (p+1)th layer are stored as the first data in the memory cells MC[p+1,1] to MC[p+1,b], and the outputs $z_1^{(p)}$ to $z_b^{(p)}$ of the neuron circuits in the p-th layer are supplied as the second data to the wirings RWX[1] to RWX[b], whereby the summation $u_c^{(p+1)}$ (net value) input to the c-th neuron circuit included in the (p+1)th layer can be obtained from the differential current ΔIX flowing through the wiring BX[p+1]. Thus, Formula (13) can be calculated using the semiconductor device 10.

The output $z_c^{(p+1)}$ of the c-th neuron circuit included in the (p+1)th layer is expressed by the following Formula (14).

$$z_c^{(p+1)} = f(u_c^{(p+1)}) \tag{14}$$

Note that $f(u_c^{(p+1)})$ is the output function of the neuron circuit. A step function, a linear ramp function, a sigmoid function, or the like can be used as the output function. Formula (14) can be calculated with a circuit 312 illustrated in FIG. 14B. Note that the output function corresponds to output characteristics of an operational amplifier. Furthermore, calculation of Formula (14) may be performed by connecting an arithmetic circuit, which can execute a desired output function, to an output terminal of the operational amplifier.

Note that the output functions may be the same among all neuron circuits or may be different from each other. Furthermore, the output function in one layer may be the same as that in another layer. Alternatively, the output functions may be different between layers.

When a neural network includes L layers, a first layer is an input layer, an L-th layer is an output layer, and second to (L−1)th layers are hidden layers.

As described above, product-sum operation for obtaining an output of a neuron circuit can be performed in a neural network using the semiconductor device 10.

Figure 13B:
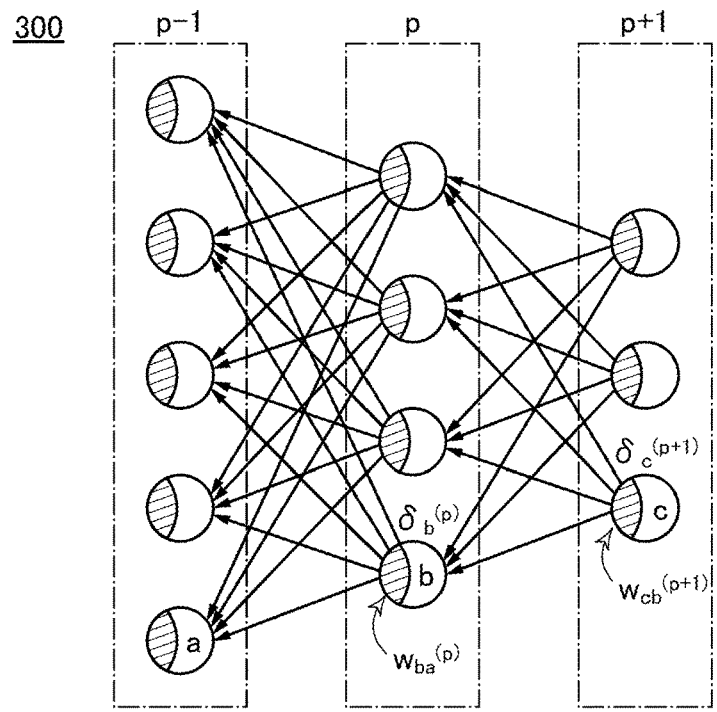

Furthermore, with the use of the semiconductor device 10, a neural network that can perform learning with backpropagation can be constructed. FIG. 13B illustrates learning performed with backpropagation.

Backpropagation is a method for changing a weight coefficient so that an error between an output of a neural network and a teacher signal is reduced. Specifically, the weight coefficient is changed by updating the weight coefficient $w_{ba}^{(p)}$ depending on error energy E that is determined by the output $z_c^{(L)}$ of the output layer and a teacher signal $t_c$. The update amount of the weight coefficient $w_{ba}^{(p)}$ of the p-th layer is set to $\partial E/\partial w_{ba}^{(p)}$. Note that when an error $\delta_b^{(p)}$ in the p-th layer is defined as $\partial E/\partial u_b^{(p)}$, $\delta_b^{(p)}$ and $\partial E/\partial w_{ba}^{(p)}$ are expressed by the following Formula (15) and Formula (16), respectively.

$$\delta_b^{(p)} = \sum_c \delta_c^{(p+1)} \cdot w_{cb}^{(p+1)} \cdot f'(u_b^{(p)}) \tag{15}$$

$$\frac{\partial E}{\partial w_{ba}^{(p)}} = \delta_b^{(p)} \cdot z_a^{(p-1)} \tag{16}$$

Note that $f'(u_b^{(p)})$ is the derived function of the output function of the neuron circuit. Formula (15) can be calculated with a circuit 313 illustrated in FIG. 14C. Furthermore, Formula (16) can be calculated with a circuit 314 illustrated in FIG. 14D. The derived function of the output function can be obtained by connecting an arithmetic circuit, which can execute a desired derived function, to an output terminal of an operational amplifier.

For example, in FIG. 2, the weight coefficients $w_{1b}^{(p+1)}$ to $w_{cb}^{(p+1)}$ of the (p+1)th layer are stored as the first data in the memory cells MC[1,p+1] to MC[c,p+1], and the errors $\delta_1^{(p+1)}$ to $\delta_c^{(p+1)}$ of the neuron circuits in the (p+1)th layer are supplied as the third data to the wirings RWY[1] to RWY[c], whereby a value of $\Sigma_c \delta_c^{(p+1)} \cdot w_{cb}^{(p+1)}$ in Formula (15) can be obtained from the differential current ΔIY flowing through the wiring BY[p+1]. Thus, part of Formula (15) can be calculated using the semiconductor device 10.

When the (p+1)th layer is the output layer (the L-th layer), $\delta_c^{(L)}$ and $\partial E/\partial w_{cb}^{(L)}$ are expressed by the following Formula (17) and Formula (18), respectively.

$$\delta_c^{(L)} = (z_c^{(L)} - t_c) f'(u_c^{(L)}) \tag{17}$$

$$\frac{\partial E}{\partial w_{cb}^{(L)}} = \delta_c^{(L)} \cdot z_b^{(L-1)} \tag{18}$$

Figure 14A:
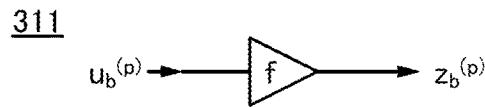
FIGS. 14A to 14E each illustrate a configuration example of a circuit.
Figure 14B:
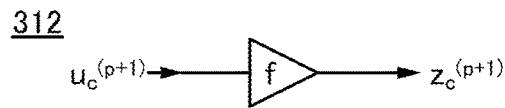
Figure 14C:
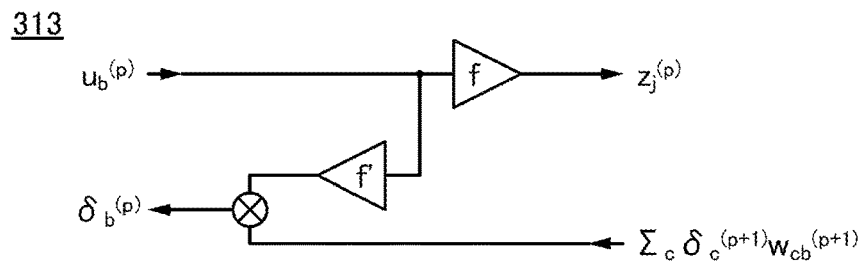
Figure 14D:
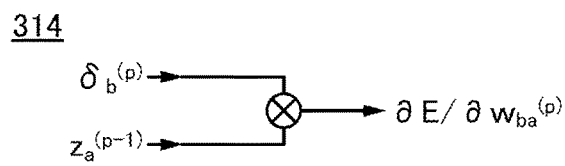
Figure 14E:
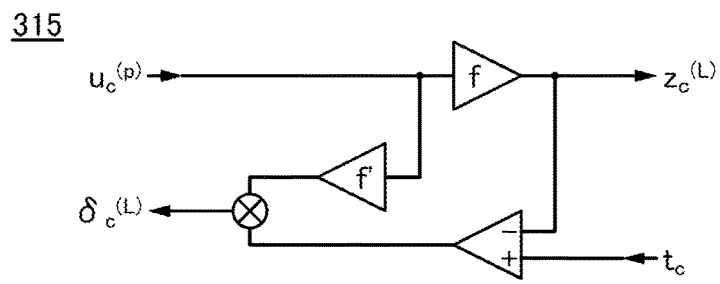

Formula (17) can be calculated with a circuit 315 illustrated in FIG. 14E. Furthermore, Formula (18) can be calculated with the circuit 314 illustrated in FIG. 14D.

As described above, the semiconductor device of one embodiment of the present invention can be used for weighting calculation, calculation of an update amount of a weight coefficient, or the like, in a neural network.

This embodiment can be combined with any of the other embodiments as appropriate.

Embodiment 4

In this embodiment, examples in which the semiconductor device described in any of the above embodiments is used in an electronic component are described with reference to FIGS. 15A to 15E.

Examples in which the semiconductor device described in any of the above embodiments is used as a memory device in an electronic component are described. Note that the electronic component is also referred to as a semiconductor package or an IC package. This electronic component has a plurality of standards and names depending on a terminal extraction direction and a terminal shape. Thus, examples of the electronic component are described in this embodiment.

The semiconductor device in any of the above embodiments is completed by integrating detachable components on a printed circuit board through an assembly process (post-process).

Figures 15A, 15B, 15C, 15D, 15E:
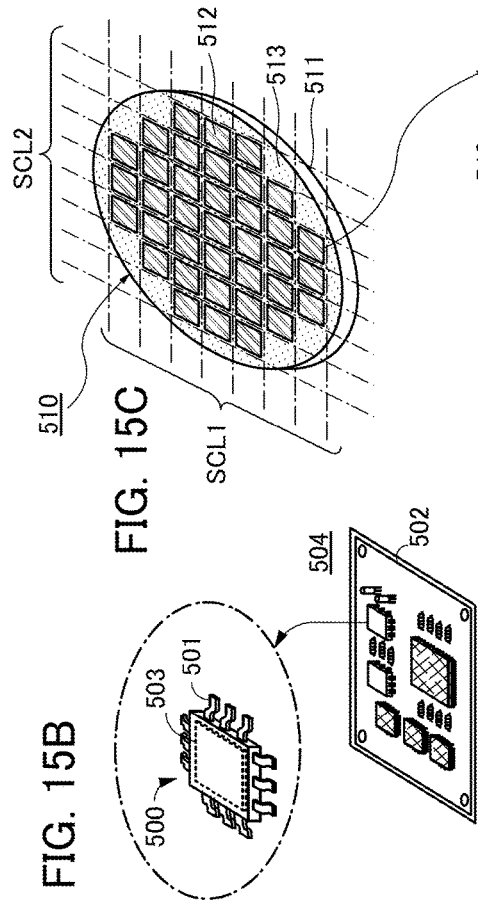
FIG. 15A is a flow chart showing an example of a method for manufacturing an electronic component.
FIG. 15B is a perspective view of the electronic component.
FIGS. 15C to 15E are perspective views of semiconductor wafers.

The post-process can be completed through steps in FIG. 15A. Specifically, after an element substrate obtained in the pre-process is completed (Step STP1), a rear surface of the substrate is ground (Step STP2). The substrate is thinned in this step to reduce warpage or the like of the substrate in the pre-process and to reduce the size of the component itself.

After the rear surface of the substrate is ground, a dicing step is performed to divide the substrate into a plurality of chips (Step STP3). Then, the divided chips are separately picked up, placed on a lead frame, and bonded thereto in a die bonding step (Step STP4). In this die bonding step, the chip is bonded to the lead frame by an appropriate method depending on a product, for example, bonding with a resin or a tape. Note that in the die bonding step, the chip may be mounted on an interposer to be bonded.

Note that in this embodiment, when an element is formed on a surface of a substrate, the other surface is referred to as a rear surface (a surface on which the element is not formed).

Next, wire bonding for connecting a lead of the lead frame and an electrode on a chip through a metal wire is performed (Step STP5). A silver line or a gold line can be used as the metal fine line. Ball bonding or wedge bonding can be used as the wire bonding.

A wire-bonded chip is subjected to a molding step of sealing the chip with an epoxy resin or the like (Step STP6). With the molding step, the inside of the electronic component is filled with a resin, thereby reducing damage to the circuit portion and the wire embedded in the component caused by external mechanical force as well as reducing deterioration of characteristics due to moisture or dust.

Next, plate processing is performed on the lead of the lead frame. Then, the lead is cut and processed into a predetermined shape (Step STP7). This plate processing prevents rust of the lead and facilitates soldering at the time of mounting the chip on a printed circuit board in a later step.

Next, printing (marking) is performed on a surface of the package (Step STP8). After a final testing step (Step STP9), the electronic component is completed (Step STP10).

The above electronic component can include the semiconductor device described in any of the above embodiments. Thus, a highly reliable electronic component can be obtained.

FIG. 15B is a schematic perspective view of the completed electronic component. FIG. 15B is a schematic perspective view illustrating a quad flat package (QFP) as an example of the electronic component. An electronic component 500 illustrated in FIG. 15B includes a lead 501 and a circuit portion 503. The electronic component 500 illustrated in FIG. 15B is, for example, mounted on a printed circuit board 502. A plurality of electronic components 500 that are combined and connected to each other over the printed circuit board 502 can be mounted on an electronic device. A completed circuit board 504 is provided in an electronic device or the like.

One embodiment of the present invention is not limited to the shape of the electronic component 500, and the element substrate fabricated in Step STP1 is included. In addition, the element substrate of one embodiment of the present invention includes an element substrate that has been subjected to Step STP2 where the rear surface of the substrate is ground. In addition, the element substrate of one embodiment of the present invention includes an element substrate that has been subjected to Step STP3 where the dicing step is performed. For example, a semiconductor wafer 510 or the like illustrated in FIG. 15C corresponds to the element substrate. In the semiconductor wafer 510, a plurality of circuit portions 512 are formed on a top surface of a wafer 511. A part without the circuit portions 512 on the top surface of the wafer 511 is a spacing 513 that is a region for dicing.

The dicing is carried out along scribe lines SCL1 and scribe lines SCL2 (referred to as dicing line or cutting line in some cases) indicated by dashed-dotted lines. For performing the dicing step easily, the spacing 513 is preferably provided such that a plurality of scribe lines SCL1 are parallel to each other, a plurality of scribe lines SCL2 are parallel to each other, and the scribe lines SCL1 and the scribe lines SCL2 are intersected perpendicularly with each other.

With the dicing step, a chip 510a as illustrated in FIG. 15D can be cut out from the semiconductor wafer 510. The chip 510a includes a wafer 511a, the circuit portion 512, and a spacing 513a. Note that it is preferable to provide the spacing 513a to be made as small as possible. In this case, it is preferable that the width of the spacing 513 between adjacent circuit portions 512 be substantially the same as a length of margin for cutting of the scribe line SCL1 or the scribe line SCL2.

The shape of the element substrate of one embodiment of the present invention is not limited to the shape of the semiconductor wafer 510 illustrated in FIG. 15C. For example, a rectangular semiconductor wafer 520 illustrated in FIG. 15E can be employed. The shape of the element substrate can be changed as appropriate, depending on a process for fabricating an element and an apparatus for fabricating an element.

This embodiment can be combined with any of the other embodiments as appropriate.

Embodiment 5

In this embodiment, application examples of the semiconductor device or electronic component described in any of the above embodiments are described.

As described above, the semiconductor device 10 can perform product-sum operation and can be used for operation in a neural network. The neural network can perform pattern recognition, associative storage, data mining, and the like at high speed; thus, the neural network is effective in fabricating an electronic device that can recognize sound, voice, images, videos, or the like. Here, a system and an electronic device each including a neural network that utilizes the semiconductor device or electronic component described in any of the above embodiments are described.

Figure 16A:
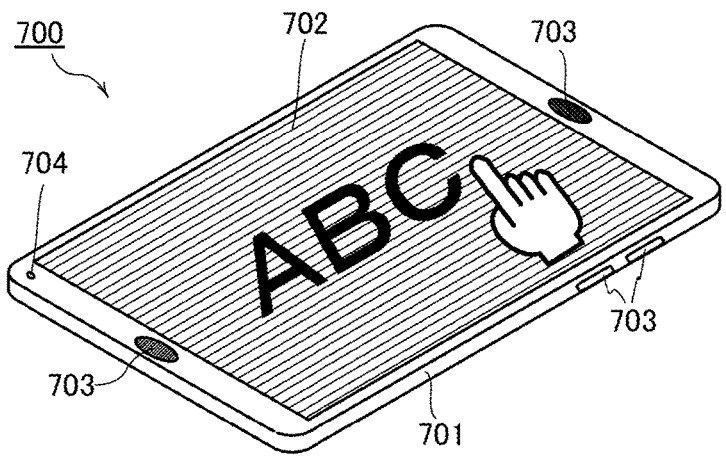
FIG. 16A illustrates a structure example of an information terminal.

FIG. 16A illustrates a structure example of a tablet information terminal. An information terminal 700 includes a housing 701, a display portion 702, operation keys 703, and a speaker 704. Note that a display device having a position-input function can be used as the display portion 702. The position-input function can be added by providing a touch panel in a display device or by providing a pixel portion including a photoelectric conversion element in a display device, for example. The operation keys 703 can be used as any one of a power switch for starting the information terminal 700, a button for operating an application of the information terminal 700, a volume control button, and a switch for turning on or off the display portion 702.

Although the number of operation keys 703 illustrated in FIG. 16A is four, the number and position of operation keys included in the information terminal 700 is not limited to this example. The information terminal 700 may also include a microphone. Thus, the information terminal 700 can have a telephone function like a cellular phone, for example. The information terminal 700 may also include a camera. The information terminal 700 may also include a light-emitting device for use as a flashlight or lighting device.

The information terminal 700 may also include a sensor (which measures force, displacement, position, speed, acceleration, angular velocity, rotational frequency, distance, light, liquid, magnetism, temperature, a chemical substance, a sound, time, hardness, electric field, current, voltage, electric power, radiation, flow rate, humidity, gradient, oscillation, smell, infrared rays, or the like) inside the housing 701. In particular, when a measuring device including a sensor such as a gyroscope sensor or an acceleration sensor for measuring inclination is provided, display on the screen of the display portion 702 can be automatically changed in accordance with the orientation of the information terminal 700 by determining the orientation of the information terminal 700 (the orientation of the information terminal with respect to the vertical direction).

The information terminal 700 including a neural network can be formed using the semiconductor device or electronic component described in any of the above embodiments. Thus, a variety of authentications such as character recognition, figure recognition, speech interpretation, and a biometric authentication can be performed using the neural network.

Figure 16B:
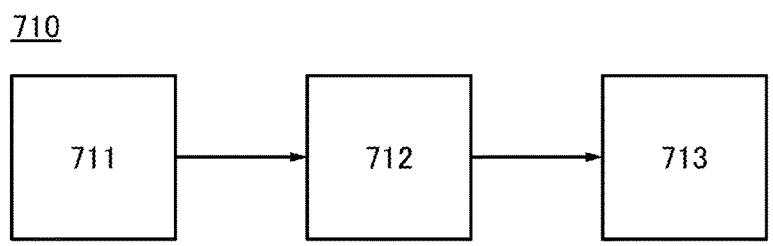
FIG. 16B shows a configuration example of an authentication system.

FIG. 16B illustrates a configuration example of an authentication system 710 that performs a variety of authentications using the neural network. When the authentication system 710 is used in the information terminal 700, a character, a figure, a symbol, or the like can be recognized. The authentication system 710 includes a sensor portion 711, an identification portion 712, and a control portion 713.

The sensor portion 711 has a function of sensing data input from the outside and generating a signal corresponding to the data. As the sensor portion 711, the display portion 702 provided with a touch panel, or the like can be used. A character, a figure, a symbol, or the like that is written or drawn on the display portion 702 with a finger, a stylus pen, or the like is sensed by the sensor portion 711. Then, a signal generated in the sensor portion 711 is transmitted to the identification portion 712.

The identification portion 712 has a function of identifying the signal received from the sensor portion 711 and determining which character, figure, or symbol corresponds to the signal. For example, the identification portion 712 can compare the signal received from the sensor portion 711 and a signal corresponding to a certain pattern stored in the identification portion 712 in advance; thus, the identification portion 712 can determine whether these signals match or not.

Note that identification in the identification portion 712 can be performed using a neural network. In this case, the neutral network is preferably formed using the semiconductor device or electronic component described in any of the above embodiments. With the use of the neural network, pattern recognition can be performed accurately even when a pattern having an irregular shape, such as a handwritten character, figure, or symbol, is input as illustrated in FIG. 16A. The identification result obtained in the identification portion 712 is transmitted to the control portion 713.

The control portion 713 has a function of controlling the operation of the information terminal 700 in response to the identification result obtained in the identification portion 712. For example, the control portion 713 can store the identification result in the information terminal 700 or can display the identification result on the display portion 702.

Figure 16C:
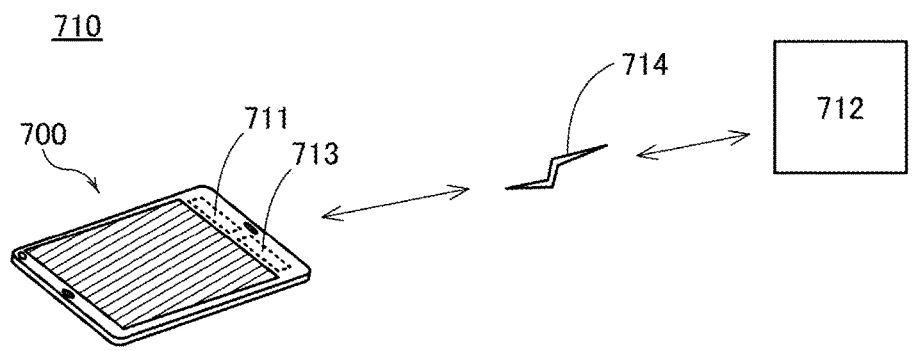
FIG. 16C illustrates an example of a communication mode.

The sensor portion 711, the identification portion 712, and the control portion 713 may be provided in the information terminal 700. Alternatively, the identification portion 712 may be provided outside the information terminal 700. In this case, the authentication system 710 has such a configuration that a signal sensed by the information terminal 700 is identified outside the information terminal 700 and the information terminal 700 receives a signal corresponding to the identification result. FIG. 16C illustrates an example of the authentication system 710 having such a communication configuration.

The information terminal 700 includes the sensor portion 711 and the control portion 713. A signal sensed by the information terminal 700 is transmitted from the sensor portion 711 to the identification portion 712 provided outside the information terminal 700 through a wireless signal 714 or the like. After the signal is identified in the identification portion 712, the identification result is transmitted to the control portion 713 through the wireless signal 714 or the like. Such a configuration is effective when it is difficult to perform the identification operation at high speed in the information terminal 700 because of a large amount of data of a signal to be identified.

Note that the authentication system 710 can be used not only for the identification of a character, a figure, and a symbol, but also for other applications. For example, speech interpretation can be performed using the authentication system 710. When the authentication system 710 performing speech interpretation is used in the information terminal 700, the information terminal 700 that can be operated with voice, and the information terminal 700 that can recognize speech or conversation to create a transcript thereof and thus is effective in creating meeting minutes or the like, can be manufactured, for example.

As described above, when the authentication system 710 utilizing the neural network of one embodiment of the present invention is used in the information terminal 700, a high-accuracy authentication can be performed. Thus, learning in the following mode becomes possible: an answer is written with a finger, a stylus pen, or the like on an information terminal that displays a workbook or the like for studying mathematics or for learning language, and then the information terminal determines whether the answer is correct or not. Furthermore, the information terminal 700 having a function of interpreting speech or conversation can be used for learning of a foreign language. Thus, an authentication system utilizing a neural network is particularly suitable for an information terminal used for a teaching material such as a textbook, or a notebook.

Note that an authentication of biological information such as fingerprints, veins, iris, or voiceprints can be performed by the above-described authentication system 710. Thus, the information terminal 700 can have a biometric authentication function.

Figure 17A:
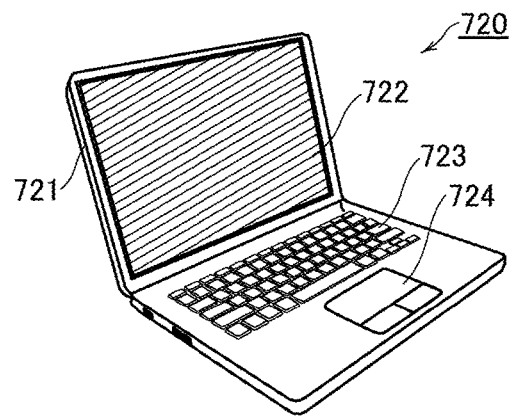
FIGS. 17A to 17C each illustrate a structure example of an electronic device.
Figure 17B:
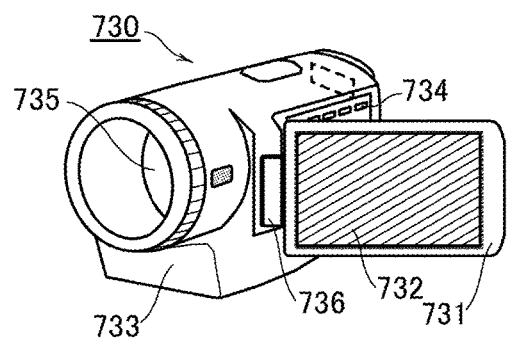
Figure 17C:
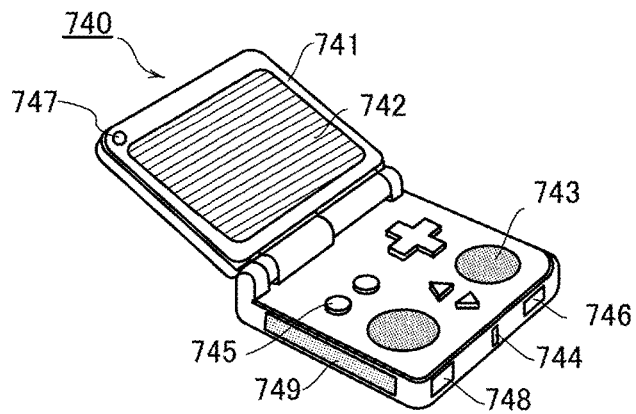

Note that an electronic device using the above-described authentication system 710 is not limited to a tablet information terminal. FIGS. 17A to 17C illustrate other examples of electronic devices.

A laptop personal computer (PC) 720 illustrated in FIG. 17A includes a housing 721, a display portion 722, a keyboard 723, and a pointing device 724. The laptop PC 720 can be operated by touch operation on the display portion 722.

A video camera 730 illustrated in FIG. 17B includes a housing 731, a display portion 732, a housing 733, operation keys 734, a lens 735, and a joint 736. The display portion 732 is provided in the housing 731, and the operation keys 734 and the lens 735 are provided in the housing 733. The housing 731 and the housing 733 are connected to each other with the joint 736, and the angle between the housing 731 and the housing 733 can be changed with the joint 736. Images on the display portion 732 may be switched in accordance with the angle between the housing 731 and the housing 733 at the joint 736. A variety of operations such as start and stop of recording, zoom adjustment, and change of shooting range can be executed by touch operation on the display portion 732.

A portable game console 740 illustrated in FIG. 17C includes a housing 741, a display portion 742, speakers 743, an LED lamp 744, operation keys 745, a connection terminal 746, a camera 747, a microphone 748, and a recording medium read portion 749.

The above-described authentication system can also be used in the electronic devices in FIGS. 17A to 17C. Furthermore, a display device having a position-input function can be used in each of the display portions in FIGS. 17A to 17C.

As described above, with the use of the semiconductor device or electronic component of one embodiment of the present invention, an electronic device that can perform a high-accuracy authentication can be provided.

This embodiment can be combined with any of the other embodiments as appropriate.

Embodiment 6

In this embodiment, an input/output device that can be used in the display portion or the like of the electronic device described in Embodiment 5 is described.

Figure 18C:
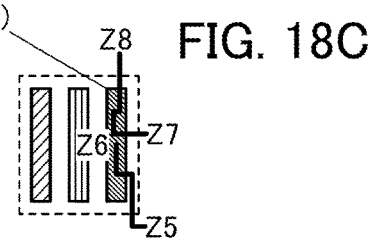

FIGS. 18A, 18B-1, 18B-2, and 18C illustrate a structure of a touch panel 2000TP1 that can be used for an input/output device. FIG. 18A is a top view of the touch panel. FIG. 18B-1 is a schematic view illustrating part of an input portion of the touch panel. FIG. 18B-2 is a schematic view illustrating part of the structure in FIG. 18B-1. FIG. 18C is a schematic view illustrating part of a display portion included in the touch panel.

Figure 19A:
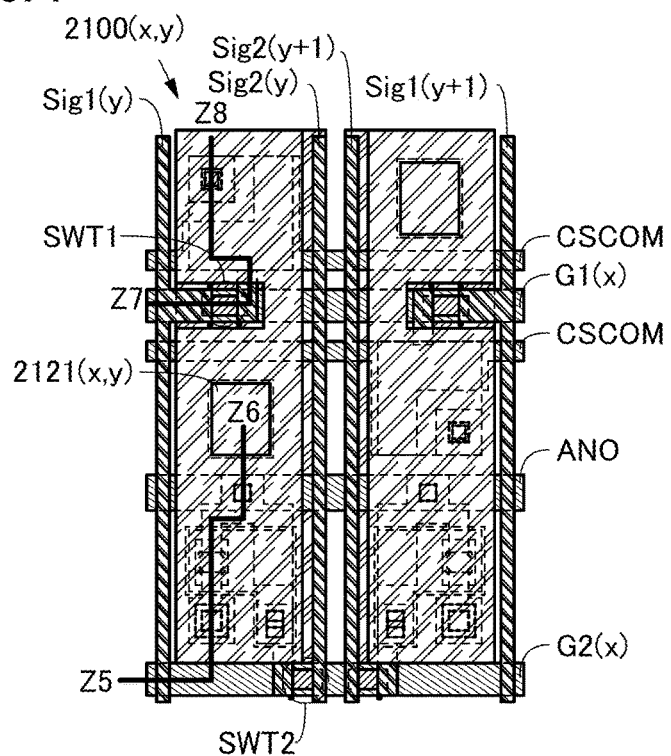
FIGS. 19A and 19B illustrate a configuration example of a pixel.
Figure 19B:
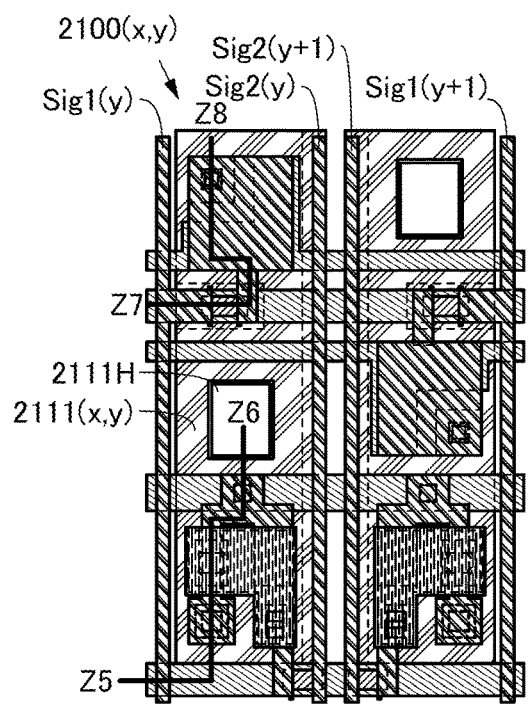

FIG. 19A is a bottom view illustrating part of a structure of a pixel in the touch panel in FIG. 18C. FIG. 19B is a bottom view illustrating part of the structure in FIG. 19A in which some components are omitted.

FIGS. 20A and 20B and FIGS. 21A and 21B are cross-sectional views illustrating the structure of the touch panel.

Figure 20A:
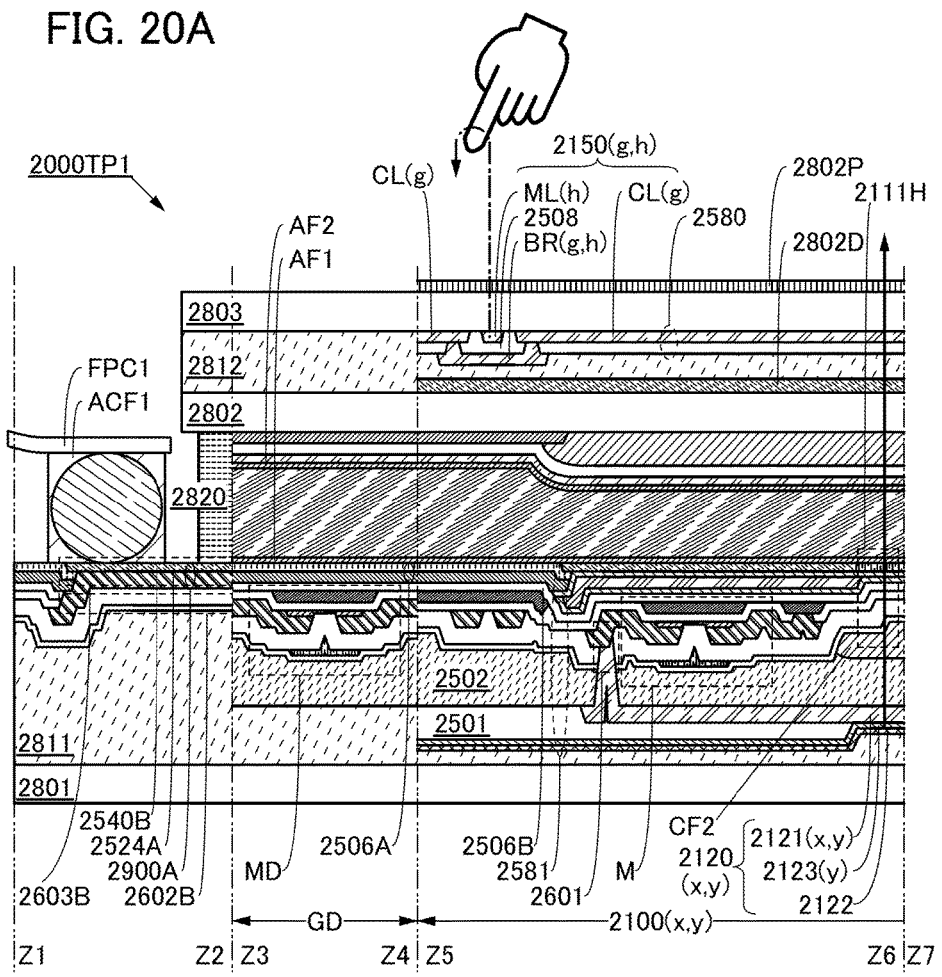
FIGS. 20A and 20B are cross-sectional views illustrating a structure example of a touch panel.
Figure 20B:
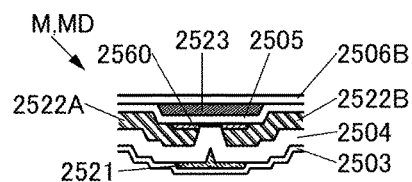

FIG. 20A is a cross-sectional view taken along bold lines Z1-Z2, Z3-Z4, and Z5-Z6 in FIG. 18A. FIG. 20B illustrates part of FIG. 20A.

Figure 21A:
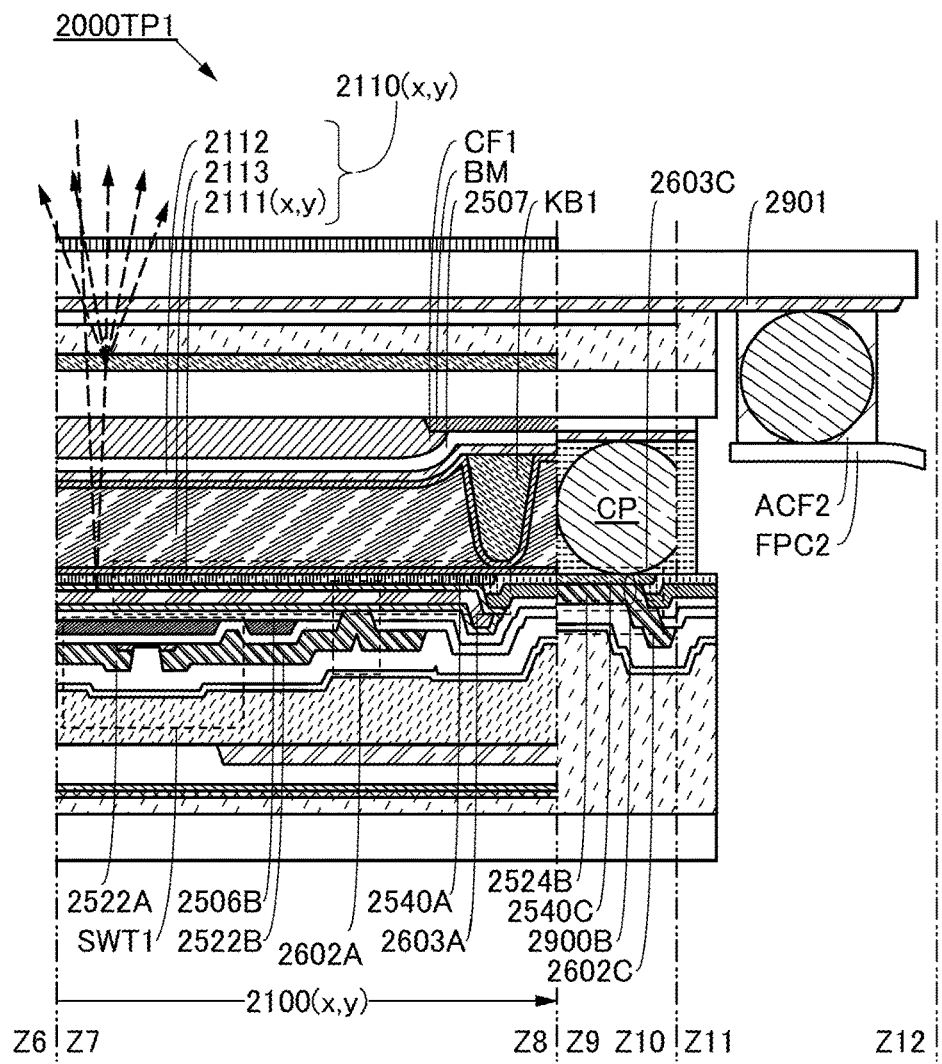
FIGS. 21A and 21B are cross-sectional views illustrating a structure example of a touch panel.
Figure 21B:
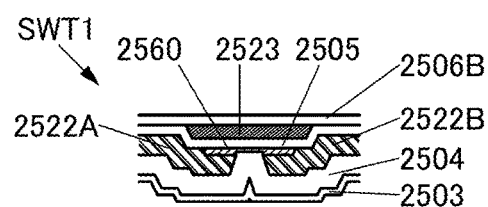

FIG. 21A is a cross-sectional view taken along bold lines Z7-Z8, Z9-Z10, and Z11-Z12 in FIG. 18A. FIG. 21B illustrates part of FIG. 21A.

Figure 22A:
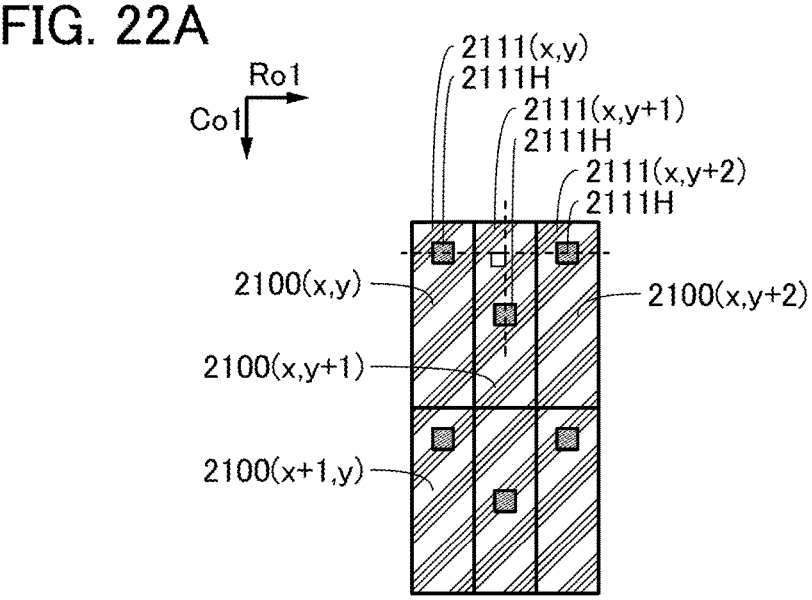
FIGS. 22A to 22C are schematic views illustrating an example of a shape of a reflective film.
Figure 22B:
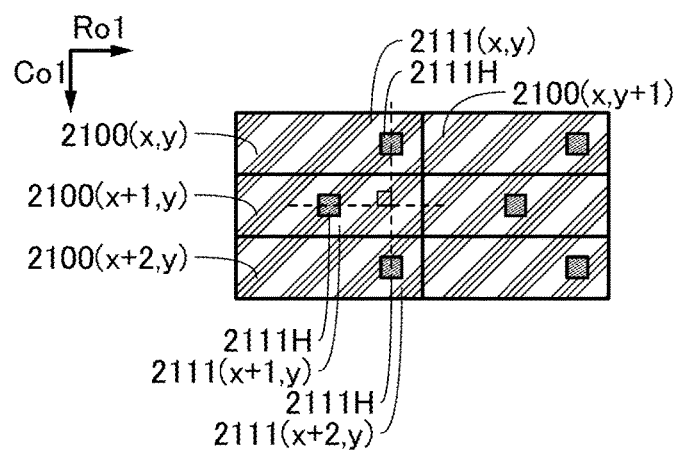
Figure 22C:
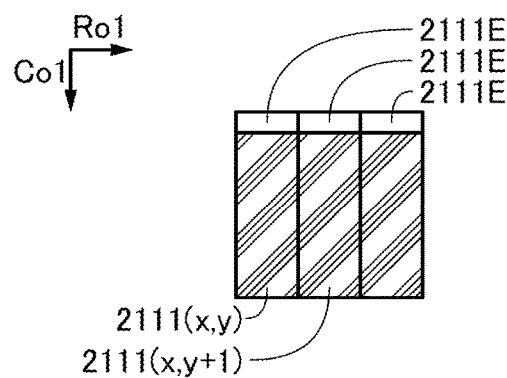

FIGS. 22A to 22C are schematic views each illustrating the shape of a reflective film that can be used in the pixel of the touch panel.

Figure 23:
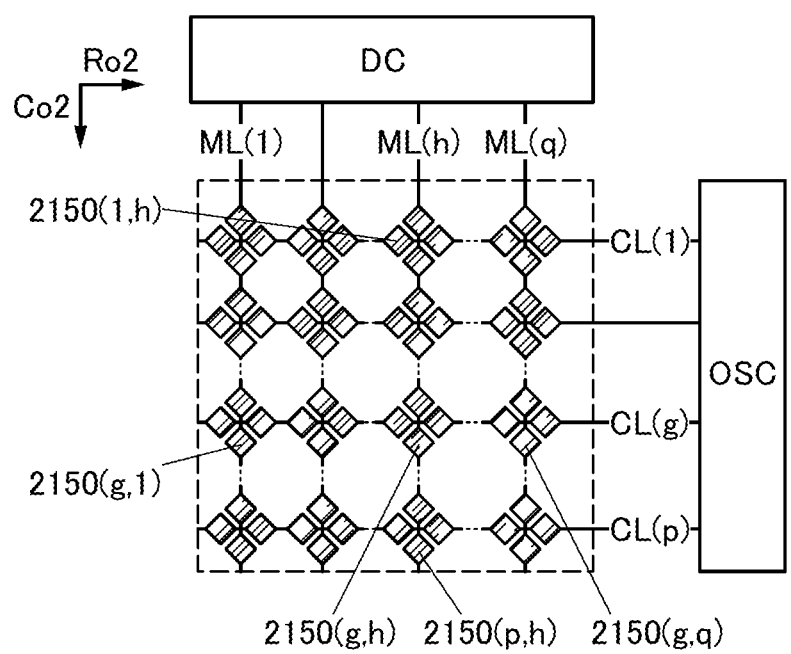
FIG. 23 shows a configuration example of an input portion.

FIG. 23 is a block diagram illustrating the structure of the input portion of the touch panel.

Figure 24:
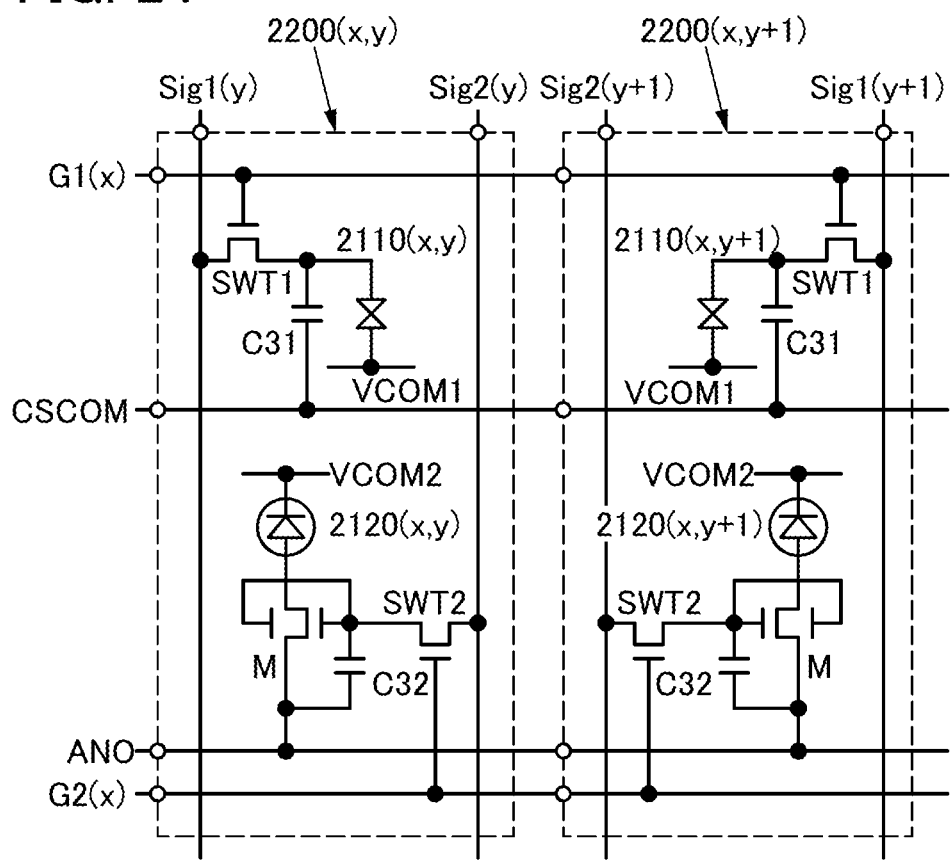
FIG. 24 illustrates a configuration example of a pixel.

FIG. 24 is a circuit diagram illustrating a configuration of a pixel circuit included in the input/output device.

<Configuration Example of Input/Output Device>

The input/output device described in this embodiment includes the touch panel 2000TP1 (see FIG. 18A). Note that the touch panel includes the display portion and the input portion.

<Structure Example of Display Portion>

The display portion includes a display panel, and the display panel includes a pixel 2100($x,y$) (each of x and y is an integer greater than or equal to 1).

The pixel 2100($x,y$) includes a second conductive film, a first conductive film, a second insulating film 2506B, and a first display element 2110($x,y$) (see FIG. 21A).

The second conductive film is connected to a pixel circuit 2200($x,y$). For example, a conductive film 2522B which functions as a source electrode or a drain electrode of a transistor used as a switch SWT1 of the pixel circuit 2200($x,y$) can be used as the second conductive film (see FIG. 21A and FIG. 24).

The first conductive film includes a region overlapping with the second conductive film. For example, the first conductive film can be used for a first electrode 2111($x,y$) of the first display element 2110($x,y$).

The second insulating film 2506B includes a region positioned between the second conductive film and the first conductive film. The second insulating film 2506B includes an opening 2602A in the region positioned between the first conductive film and the second conductive film. Furthermore, the second insulating film 2506B includes a region positioned between a first insulating film 2506A and a conductive film 2524A. Moreover, the second insulating film 2506B includes an opening 2602B in the region positioned between the first insulating film 2506A and the conductive film 2524A. The second insulating film 2506B includes an opening 2602C in a region positioned between the first insulating film 2506A and a conductive film 2524B (see FIG. 20A and FIG. 21A).

The first conductive film is connected to the second conductive film in the opening 2602A. For example, the first electrode 2111($x,y$) is connected to the conductive film 2522B. The first conductive film connected to the second conductive film in the opening 2602A provided in the second insulating film 2506B can be referred to as a through electrode.

The first display element 2110($x,y$) is connected to the first conductive film.

The first display element 2110($x,y$) includes a reflective film and has a function of controlling the intensity of light reflected by the reflective film. For example, the first electrode 2111($x,y$) or the like can be used as the reflective film of the first display element 2110($x,y$). Similarly, a first electrode 2111($x,y$+1) or the like can be used as a reflective film of a first display element 2110($x,y$+1), and a first electrode 2111($x,y$+2) or the like can be used as a reflective film of a first display element 2110($x,y$+2) (see FIG. 22A).

Note that also in FIG. 22B described later, the first electrode $2111(x,y)$, a first electrode $2111(x+1,y)$, and a first electrode $2111(x+2,y)$ are illustrated as the reflective film.

A second display element $2120(x,y)$ has a function of emitting light toward the second insulating film 2506B (see FIG. 20A).

The reflective film has a shape including a region that does not block light emitted from the second display element $2120(x,y)$.

The reflective film included in the pixel $2100(x,y)$ of the display panel described in this embodiment includes one or a plurality of openings 2111H (see FIGS. 22A to 22C).

The second display element $2120(x,y)$ has a function of emitting light toward the opening 2111H. Note that the opening 2111H transmits light emitted from the second display element $2120(x,y)$.

The opening 2111H of the pixel $2100(x,y+1)$, which is adjacent to the pixel $2100(x,y)$, is not provided on a line that extends in the row direction (the direction indicated by an arrow Ro1 in the drawing) through the opening 2111H of the pixel $2100(x,y)$ (see FIG. 22A). Alternatively, for example, the opening 2111H of the pixel $2100(x+1,y)$, which is adjacent to the pixel $2100(x,y)$, is not provided on a line that extends in the column direction (the direction indicated by an arrow Co1 in the drawing) through the opening 2111H of the pixel $2100(x,y)$ (see FIG. 22B).

For example, the opening 2111H of the pixel $2100(x,y+2)$ is provided on a line that extends in the row direction through the opening 2111H of the pixel $2100(x,y)$ (see FIG. 22A). Alternatively, the opening 2111H of the pixel $2100(x,y+1)$ is provided on a line that is perpendicular to the above-mentioned line between the opening 2111H of the pixel $2100(x,y)$ and the opening 2111H of the pixel $2100(x,y+2)$.

Alternatively, for example, the opening 2111H of the pixel $2100(x+2,y)$ is provided on a line that extends in the column direction through the opening 2111H of the pixel $2100(x,y)$ (see FIG. 22B). Alternatively, for example, the opening 2111H of the pixel $2100(x+1,y)$ is provided on a line that is perpendicular to the above-mentioned line between the opening 2111H of the pixel $2100(x,y)$ and the opening 2111H of the pixel $2100(x+2,y)$.

Thus, a third display element that displays a color different from that displayed by the second display element can be provided easily near the second display element. As a result, a display panel with high convenience or high reliability can be provided.

For example, the reflective film can be formed using a material having a shape in which an end portion is cut off so as to form a region 2111E that does not block light emitted from the second display element $2120(x,y)$ (see FIG. 22C). Specifically, the first electrode $2111(x,y)$ whose end portion is cut off so as to be shorter in the column direction (the direction indicated by the arrow Co1 in the drawing) can be used as the reflective film. Note that the first electrode $2111(x,y+1)$ is illustrated in FIG. 22C in addition to the first electrode $2111(x,y)$.

Thus, the first display element and the second display element that displays an image using a method different from that of the first display element can be driven using pixel circuits that can be formed in the same process. Specifically, a reflective display element is used as the first display element, whereby the power consumption can be reduced. In addition, an image with high contrast can be favorably displayed in an environment with bright external light. In addition, the second display element that emits light is used, whereby an image can be favorably displayed in a dark environment. Furthermore, using the second insulating film, impurity diffusion between the first display element and the second display element or between the first display element and the pixel circuit can be suppressed. Moreover, part of light emitted from the second display element to which a voltage controlled on the basis of the control data is supplied is not blocked by the reflective film included in the first display element. As a result, a display device with high convenience or high reliability can be provided.

The second display element $2120(x,y)$ included in the pixel of the input/output device described in this embodiment is provided so that display using the second display element $2120(x,y)$ can be seen from part of a region from which display using the first display element $2110(x,y)$ can be seen. For example, dashed arrows shown in FIG. 21A denote the directions in which external light is incident on and reflected by the first display element $2110(x,y)$ that performs display by controlling the intensity of external light reflection. In addition, a solid arrow shown in FIG. 20A denotes the direction in which the second display element $2120(x,y)$ emits light to the part of the region from which the display using the first display element $2110(x,y)$ can be seen.

Accordingly, the display using the second display element can be seen from the part of the region from which the display using the first display element can be seen. Alternatively, a user can see the display without changing the attitude or the like of the display panel. As a result, a display panel with high convenience or high reliability can be provided.

The pixel circuit $2200(x,y)$ is connected to a signal line Sig1($y$). Note that a conductive film 2522A is connected to the signal line Sig1($y$) (see FIG. 21A and FIG. 24). Furthermore, for example, the transistor in which the second conductive film is used as the conductive film 2522B serving as a source electrode or a drain electrode can be used as the switch SWT1 of the pixel circuit $2200(x,y)$.

The display panel described in this embodiment includes the first insulating film 2506A (see FIG. 20A).

The first insulating film 2506A includes a first opening 2603A, a second opening 2603B, and an opening 2603C (see FIG. 20A or FIG. 21A).

The first opening 2603A includes a region overlapping with a first intermediate film 2540A and the first electrode $2111(x,y)$ or a region overlapping with the first intermediate film 2540A and the second insulating film 2506B.

The second opening 2603B includes a region overlapping with a second intermediate film 2540B and the conductive film 2524A. Furthermore, the opening 2603C includes a region overlapping with an intermediate film 2540C and the conductive film 2524B.

The first insulating film 2506A includes a region that is along an outer edge of the first opening 2603A and is between the first intermediate film 2540A and the second insulating film 2506B. The first insulating film 2506A also includes a region that is along an outer edge of the second opening 2603B and is between the second intermediate film 2540B and the conductive film 2524A.

The display panel described in this embodiment includes a scan line G2($x$), a wiring CSCOM, a third conductive film ANO, and a signal line Sig2($y$) (see FIG. 24).

The second display element $2120(x,y)$ of the display panel described in this embodiment includes a third electrode $2121(x,y)$, a fourth electrode 2122, and a layer $2123(y)$ containing a light-emitting material (see FIG. 20A). Note that the third electrode $2121(x,y)$ and the fourth electrode 2122 are connected to the third conductive film ANO and a fourth conductive film VCOM2, respectively (see FIG. 24).

The fourth electrode 2122 includes a region overlapping with the third electrode 2121(x,y).

The layer 2123(y) containing a light-emitting material includes a region positioned between the third electrode 2121(x,y) and the fourth electrode 2122.

The third electrode 2121(x,y) is connected to the pixel circuit 2200(x,y) at a connection portion 2601.

The first display element 2110(x,y) of the display panel described in this embodiment includes a layer 2113 containing a liquid crystal material, the first electrode 2111(x,y), and a second electrode 2112. The second electrode 2112 is provided such that an electric field that controls the alignment of the liquid crystal material is generated between the second electrode 2112 and the first electrode 2111(x,y) (see FIG. 21A).

The display panel described in this embodiment includes an alignment film AF1 and an alignment film AF2. The alignment film AF2 is provided such that the layer 2113 containing a liquid crystal material is positioned between the alignment films AF1 and AF2.

The display panel described in this embodiment includes the first intermediate film 2540A and the second intermediate film 2540B.

The first intermediate film 2540A includes a region which overlaps with the second insulating film 2506B with the first conductive film positioned therebetween, and the first intermediate film 2540A includes a region in contact with the first electrode 2111(x,y). The second intermediate film 2540B includes a region in contact with the conductive film 2524A.

The display panel described in this embodiment includes a light-blocking film BM, an insulating film 2507, a functional film 2802P, and a functional film 2802D. In addition, a coloring film CF1 and a coloring film CF2 are included.

The light-blocking film BM includes an opening in a region overlapping with the first display element 2110(x,y). The coloring film CF2 is provided between the second insulating film 2506B and the second display element 2120(x,y) and includes a region overlapping with the opening 2111H (see FIG. 20A).

The insulating film 2507 includes a region positioned between the coloring film CF1 and the layer 2113 containing a liquid crystal material or between the light-blocking film BM and the layer 2113 containing a liquid crystal material. The insulating film 2507 can reduce unevenness due to the thickness of the coloring film CF1. Alternatively, impurities can be prevented from being diffused from the light-blocking film BM, the coloring film CF1, or the like to the layer 2113 containing a liquid crystal material.

The functional film 2802P includes a region overlapping with the first display element 2110(x,y).

The functional film 2802D includes a region overlapping with the first display element 2110(x,y). The functional film 2802D is provided such that a substrate 2802 is positioned between the functional film 2802D and the first display element 2110(x,y). This can diffuse light reflected by the first display element 2110(x,y), for example.

In addition, the display panel described in this embodiment includes a substrate 2801, the substrate 2802, and a functional layer 2581.

The substrate 2802 includes a region overlapping with the substrate 2801.

The functional layer 2581 includes a region positioned between the substrate 2801 and the substrate 2802. The functional layer 2581 includes the pixel circuit 2200(x,y), the second display element 2120(x,y), an insulating film 2502, and an insulating film 2501. Furthermore, the functional layer 2581 includes an insulating film 2503 and an insulating film 2504 (see FIGS. 20A and 20B).

The insulating film 2502 includes a region positioned between the pixel circuit 2200(x,y) and the second display element 2120(x,y).

The insulating film 2501 is provided between the insulating film 2502 and the substrate 2801 and includes an opening in a region overlapping with the second display element 2120(x,y).

The insulating film 2501 formed along an edge of the third electrode 2121(x,y) can prevent a short circuit between the third electrode 2121(x,y) and the fourth electrode.

The insulating film 2503 includes a region positioned between the insulating film 2502 and the pixel circuit 2200(x,y). The insulating film 2504 includes a region positioned between the insulating film 2503 and the pixel circuit 2200(x,y).

The display panel described in this embodiment also includes a bonding layer 2811, a sealing material 2820, and a structure body KB1.

The bonding layer 2811 includes a region positioned between the functional layer 2581 and the substrate 2801, and has a function of bonding the functional layer 2581 and the substrate 2801 together.

The sealing material 2820 includes a region positioned between the functional layer 2581 and the substrate 2802, and has a function of bonding the functional layer 2581 and the substrate 2802 together.

The structure body KB1 has a function of providing a certain space between the functional layer 2581 and the substrate 2802.

The display panel described in this embodiment includes a terminal 2900A and a terminal 2900B.

The terminal 2900A includes the conductive film 2524A and the second intermediate film 2540B, and the second intermediate film 2540B includes a region in contact with the conductive film 2524A. The terminal 2900A is connected to the signal line Sig1(y), for example.

The terminal 2900A can be connected to a flexible printed circuit FPC1 using a conductive material ACF1.

The terminal 2900B includes the conductive film 2524B and the intermediate film 2540C, and the intermediate film 2540C includes a region in contact with the conductive film 2524B. The conductive film 2524B is connected to a wiring VCOM1, for example.

A conductive material CP is positioned between the terminal 2900B and the second electrode 2112, and has a function of connecting the terminal 2900B and the second electrode 2112. For example, a conductive particle can be used as the conductive material CP.

The display panel described in this embodiment includes a driver circuit GD and a driver circuit SD (see FIG. 18A).

The driver circuit GD is connected to a scan line G1(x). The driver circuit GD includes a transistor MD, for example (see FIG. 20A). Specifically, a transistor which includes a semiconductor film and can be formed in the same step as the transistor included in the pixel circuit 2200(x,y) can be used as the transistor MD.

The driver circuit SD is connected to the signal line Sig1(y). The driver circuit SD is connected to the terminal 2900A, for example.

<Structure Example of Input Portion>

The input portion includes a region overlapping with the display panel (see FIGS. 18A, 18B-1, 18B-2, and 18C, FIG. 20A, or FIG. 21A).

The input portion includes a substrate 2803, a functional layer 2580, a bonding layer 2812, and a terminal 2901 (see FIG. 20A and FIG. 21A).

The input portion includes a control line CL(g), a sensor signal line ML(h), and a sensing element 2150(g,h) (see FIG. 18B-2).

The functional layer 2580 includes a region positioned between the substrate 2802 and the substrate 2803. The functional layer 2580 includes the sensing element 2150(g, h) and an insulating film 2508.

The bonding layer 2812 is provided between the functional layer 2580 and the substrate 2802 and has a function of bonding the functional layer 2580 and the substrate 2802 together.

The sensing element 2150(g,h) is connected to the control line CL(g) and the sensor signal line ML(h).

The control line CL(g) has a function of supplying a control signal.

The sensing element 2150(g,h) receives the control signal and has a function of supplying the control signal and a sensor signal which changes in accordance with a distance between the sensing element 2150(g,h) and an object approaching a region overlapping with the display panel.

The sensor signal line ML(h) has a function of receiving the sensor signal.

The sensing element 2150(g,h) has a light-transmitting property.

The sensing element 2150(g,h) includes an electrode C(g) and an electrode M(h).

The electrode C(g) is connected to the control line CL(g).

The electrode M(h) is connected to the sensor signal line ML(h) and is provided such that an electric field part of which is blocked by an object approaching a region overlapping with the display panel is generated between the electrode M(h) and the electrode C(g).

Thus, the object approaching the region overlapping with the display panel can be sensed while image data is displayed on the display panel.

The input portion described in this embodiment includes the substrate 2803 and the bonding layer 2812 (see FIG. 20A and FIG. 21A).

The substrate 2803 is provided such that the sensing element 2150(g,h) is positioned between the substrate 2803 and the substrate 2802.

The bonding layer 2812 is provided between the substrate 2802 and the sensing element 2150(g,h) and has a function of bonding the substrate 2802 and the sensing element 2150(g,h) together.

The functional film 2802P is provided such that the sensing element 2150(g,h) is positioned between the functional film 2802P and the first display element 2110(x,y). Thus, the intensity of light reflected by the sensing element 2150(g,h) can be reduced, for example.

The input portion described in this embodiment includes a group of sensing elements 2150(g,1) to 2150(g,q) and another group of sensing elements 2150(1,h) to 2150(p,h) (see FIG. 23). Note that g is an integer greater than or equal to 1 and less than or equal to p, h is an integer greater than or equal to 1 and less than or equal to q, and each of p and q is an integer greater than or equal to 1.

The group of sensing elements 2150(g,1) to 2150(g,q) include the sensing element 2150(g,h) and are provided in the row direction (the direction indicated by an arrow Ro2 in the drawing).

The other group of sensing elements 2150(1,h) to 2150(p,h) include the sensing element 2150(g,h) and are provided in the column direction (the direction indicated by an arrow Co2 in the drawing) that intersects the row direction.

The group of sensing elements 2150(g,1) to 2150(g,q) provided in the row direction include the electrode C(g) that is connected to the control line CL(g).

The other group of sensing elements 2150(1,h) to 2150(p,h) provided in the column direction include the electrode M(h) that is connected to the sensor signal line ML(h).

The control line CL(g) of the touch panel described in this embodiment includes a conductive film BR(g,h) (see FIG. 20A). The conductive film BR(g,h) includes a region overlapping with the sensor signal line ML(h).

The insulating film 2508 includes a region positioned between the sensor signal line ML(h) and the conductive film BR(g,h). Thus, a short circuit between the sensor signal line ML(h) and the conductive film BR(g,h) can be prevented.

The touch panel described in this embodiment includes an oscillator circuit OSC and a detection circuit DC (see FIG. 23).

The oscillator circuit OSC is connected to the control line CL(g) and has a function of supplying a control signal. For example, a rectangular wave, a sawtooth wave, a triangular wave, or the like can be used as the control signal.

The detection circuit DC is connected to the sensor signal line ML(h) and has a function of supplying a sensor signal on the basis of a change in the potential of the sensor signal line ML(h).

Individual components included in the touch panel are described below. Note that these components cannot be clearly distinguished and one component may also serve as another component or include part of another component.

For example, the first conductive film can be used for the first electrode 2111(x,y). Furthermore, the first conductive film can be used as a reflective film.

The second conductive film can be used as the conductive film 2522B serving as a source electrode or a drain electrode of a transistor.

The terminal 2901 can be connected to a flexible printed circuit FPC2 using a conductive material ACF2. Furthermore, the terminal 2901 is connected to the sensing element 2150(g,h).

<Configuration Example of Pixel Circuit>

A configuration example of a pixel circuit is described with reference to FIG. 24. The pixel circuit 2200(x,y) is connected to the signal line Sig1(y), the signal line Sig2(y), the scan line G1(x), the scan line G2(x), the wiring CSCOM, and the third conductive film ANO. Similarly, a pixel circuit 2200(x,y+1) is connected to a signal line Sig1(y+1), a signal line Sig2(y+1), the scan line G1 (x), the scan line G2(x), the wiring CSCOM, and the third conductive film ANO.

The pixel circuit 2200(x,y) and the pixel circuit 2200(x, y+1) each include the switch SWT1 and a capacitor C31.

The pixel circuit 2200(x,y) and the pixel circuit 2200(x, y+1) each include a switch SWT2, a transistor M, and a capacitor C32.

For example, a transistor including a gate electrode connected to the scan line G1(x) and a first electrode connected to the signal line Sig1(y) can be used as the switch SWT1.

The capacitor C31 includes a first electrode connected to a second electrode of the transistor used as the switch SWT1 and a second electrode connected to the wiring CSCOM.

For example, a transistor including a gate electrode connected to the scan line G2(x) and a first electrode connected to the signal line Sig2(y) can be used as the switch SWT2.

The transistor M includes a gate electrode connected to a second electrode of the transistor used as the switch SWT2 and a first electrode connected to the third conductive film ANO.

Note that a transistor including a conductive film provided such that a semiconductor film is interposed between a gate electrode and the conductive film can be used as the transistor M. For example, as the conductive film, a conductive film connected to a wiring that can supply the same potential as that of the gate electrode of the transistor M can be used.

The capacitor C32 includes a first electrode connected to the second electrode of the transistor used as the switch SWT2 and a second electrode connected to the first electrode of the transistor M.

Note that in the pixel circuit 2200($x,y$), the first electrode and the second electrode of the first display element 2110 ($x,y$) are connected to the second electrode of the transistor used as the switch SWT1 and the wiring VCOM1, respectively. This enables the first display element 2110($x,y$) to be driven. Similarly, in the pixel circuit 2200($x,y$+1), a first electrode and a second electrode of the first display element 2110($x,y$+1) are connected to the second electrode of the transistor used as the switch SWT1 and the wiring VCOM1, respectively. This enables the first display element 2110($x, y$+1) to be driven.

Furthermore, in the pixel circuit 2200($x,y$), the first electrode and the second electrode of the second display element 2120($x,y$) are connected to the second electrode of the transistor M and the fourth conductive film VCOM2, respectively. This enables the second display element 2120($x,y$) to be driven. Similarly, in the pixel circuit 2200($x,y$+1), the first electrode and the second electrode of the second display element 2120($x,y$+1) are connected to the second electrode of the transistor M and the fourth conductive film VCOM2, respectively. This enables the second display element 2120 ($x,y$+1) to be driven.

<Structure Example of Transistor>

A bottom-gate transistor, a top-gate transistor, or the like can be used as the switch SWT1, the transistor M, and the transistor MD.

For example, a transistor whose semiconductor film contains a semiconductor containing an element belonging to Group 14 can be used. Specifically, a semiconductor containing silicon can be used for the semiconductor film. For example, single crystal silicon, polysilicon, microcrystalline silicon, amorphous silicon, or the like can be used for the semiconductor film of the transistor.

For example, a transistor whose semiconductor film contains an oxide semiconductor can be used. Specifically, an oxide semiconductor containing indium or an oxide semiconductor containing indium, zinc, and an element M (the element M is aluminum, gallium, yttrium, or tin) can be used for the semiconductor film.

For example, a transistor having a lower off-state leakage current than a transistor that uses amorphous silicon for a semiconductor film can be used as the switch SWT1, the transistor M, the transistor MD, or the like. Specifically, a transistor in which an oxide semiconductor is used for a semiconductor film 2560 can be used as the switch SWT1, the transistor M, the transistor MD, or the like.

Thus, a pixel circuit can hold an image signal for a longer time than a pixel circuit including a transistor that uses amorphous silicon for a semiconductor film. Specifically, a selection signal can be supplied at a frequency of lower than 30 Hz, preferably lower than 1 Hz, further preferably less than once per minute while flickering is suppressed. Consequently, eyestrain on a user of a data processor can be reduced, and power consumption for driving can be reduced.

The transistor that can be used as the switch SWT1 includes the semiconductor film 2560 and a conductive film 2523 including a region overlapping with the semiconductor film 2560 (see FIG. 21B). The transistor that can be used as the switch SWT1 includes the conductive film 2522A and the conductive film 2522B, which are connected to the semiconductor film 2560.

Note that the conductive film 2523 and an insulating film 2505 serve as a gate electrode and a gate insulating film, respectively. The conductive film 2522A has one of a function as a source electrode and a function as a drain electrode, and the conductive film 2522B has the other.

A transistor in which the semiconductor film 2560 is provided between the conductive film 2523 and a conductive film 2521 can be used as the transistor M (see FIG. 20B).

The above-described input/output device is used for the electronic device described in Embodiment 5, whereby an electronic device that is highly visible, convenient, or reliable can be obtained.

This embodiment can be combined with any of the other embodiments as appropriate.

Embodiment 7

In this embodiment, a structure example of an OS transistor that can be used for the semiconductor device described in any of the above embodiments is described.

<Structure Example of Transistor>

Figure 25A:
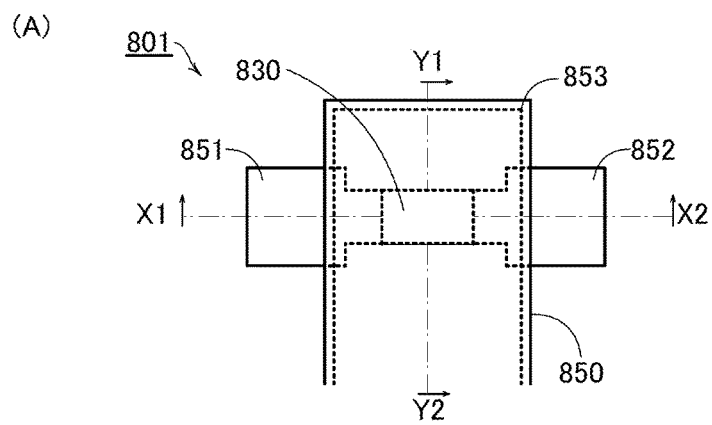
FIGS. 25A to 25C illustrate a structure example of a transistor.
Figure 25B:
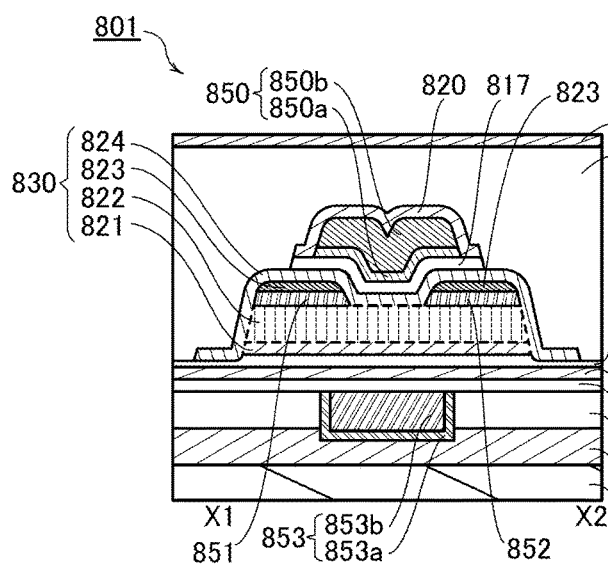
Figure 25C:
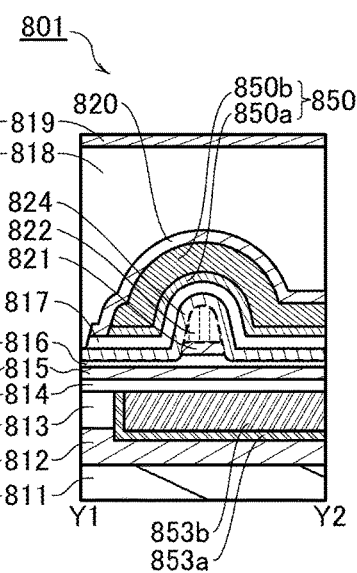

FIG. 25A is a top view illustrating a structure example of a transistor. FIG. 25B is a cross-sectional view taken along the line X1-X2 in FIG. 25A. FIG. 25C is a cross-sectional view taken along the line Y1-Y2 in FIG. 25A. In some cases, the direction of the line X1-X2 is referred to as a channel length direction, and the direction of the line Y1-Y2 is referred to as a channel width direction. FIG. 25B illustrates a cross-sectional structure of the transistor in the channel length direction, and FIG. 25C illustrates a cross-sectional structure of the transistor in the channel width direction. Note that to clarify the device structure, FIG. 25A does not illustrate some components.

The semiconductor device of one embodiment of the present invention includes insulating layers 812 to 820, metal oxide films 821 to 824, and conductive layers 850 to 853. A transistor 801 is formed over an insulating surface. FIGS. 25A to 25C illustrate a case where the transistor 801 is formed over an insulating layer 811. The transistor 801 is covered with the insulating layer 818 and the insulating layer 819.

Note that the insulating layers, the metal oxide films, the conductive layers, and the like that constitute the transistor 801 may each be a single film, or a stack including a plurality of films. These films and layers can be formed by any of a variety of deposition methods such as a sputtering method, a molecular beam epitaxy (MBE) method, a pulsed laser ablation (PLA) method, a CVD method, and an atomic layer deposition (ALD) method. Examples of a CVD method include a plasma-enhanced CVD method, a thermal CVD method, and a metal organic CVD method.

The conductive layer 850 includes a region that functions as a gate electrode of the transistor 801. The conductive layer 851 and the conductive layer 852 include regions that function as a source electrode and a drain electrode. The conductive layer 853 includes a region that functions as a back gate electrode. The insulating layer 817 includes a region that functions as a gate insulating layer on the gate electrode (front gate electrode) side, and an insulating layer that is composed of the insulating layers 814 to 816 includes a region that functions as a gate insulating layer on the back gate electrode side. The insulating layer 818 functions as an interlayer insulating layer. The insulating layer 819 functions as a barrier layer.

The metal oxide films 821 to 824 are collectively referred to as an oxide layer 830. As illustrated in FIGS. 25B and 25C, the oxide layer 830 includes a region where the metal oxide film 821, the metal oxide film 822, and the metal oxide film 824 are stacked in this order. In addition, a pair of the metal oxide films 823 is positioned over the conductive layer 851 and the conductive layer 852. When the transistor 801 is on, a channel formation region is mainly formed in the metal oxide film 822 of the oxide layer 830.

The metal oxide film 824 covers the metal oxide films 821 to 823, the conductive layer 851, and the conductive layer 852. The insulating layer 817 is positioned between the metal oxide film 823 and the conductive layer 850. The conductive layers 851 and 852 each include a region that overlaps with the conductive layer 850 with the metal oxide film 823, the metal oxide film 824, and the insulating layer 817 positioned therebetween.

The conductive layers 851 and 852 are fabricated from a hard mask that is used in the formation of the metal oxide films 821 and 822. Thus, the conductive layers 851 and 852 do not include a region that is in contact with the side surfaces of the metal oxide films 821 and 822. For example, the metal oxide films 821 and 822 and the conductive layers 851 and 852 can be formed through the following steps. First, a conductive film is formed over a two-layered metal oxide film. The conductive film is processed (etched) into a desired shape, forming a hard mask. The hard mask is used to process the shape of the two-layered metal oxide film, forming the metal oxide films 821 and 822 that are stacked. Next, the hard mask is processed into a desired shape, forming the conductive layers 851 and 852.

Examples of insulating materials used for the insulating layers 811 to 818 include aluminum nitride, aluminum oxide, aluminum nitride oxide, aluminum oxynitride, magnesium oxide, silicon nitride, silicon oxide, silicon nitride oxide, silicon oxynitride, gallium oxide, germanium oxide, yttrium oxide, zirconium oxide, lanthanum oxide, neodymium oxide, hafnium oxide, tantalum oxide, and aluminum silicate. The insulating layers 811 to 818 are formed using a single-layer structure or a stacked-layer structure containing any of these insulating materials. The layers used for the insulating layers 811 to 818 may include a plurality of insulating materials.

Note that in this specification and the like, an oxynitride refers to a compound that contains more oxygen than nitrogen, and a nitride oxide refers to a compound that contains more nitrogen than oxygen.

In order to suppress the increase in oxygen vacancies in the oxide layer 830, the insulating layers 816 to 818 preferably contain oxygen. Further preferably, at least one of the insulating layers 816 to 818 is formed using an insulating film from which oxygen is released by heating (hereinafter such an insulating film is also referred to as an insulating film containing excess oxygen). When oxygen is supplied from the insulating film containing excess oxygen to the oxide layer 830, the oxygen vacancies in the oxide layer 830 can be compensated. Thus, reliability and electrical characteristics of the transistor 801 can be improved.

The insulating film containing excess oxygen is a film from which oxygen molecules at more than or equal to $1.0 \times 10^{18}$ molecules/cm$^3$ are released in thermal desorption spectroscopy (TDS) at a surface temperature of the film of higher than or equal to 100° C. and lower than or equal to 700° C., or higher than or equal to 100° C. and lower than or equal to 500° C. The amount of released oxygen molecules is preferably more than or equal to $3.0 \times 10^{20}$ atoms/cm$^3$.

The insulating film containing excess oxygen can be formed by performing treatment for adding oxygen to an insulating film. The treatment for adding oxygen can be performed by heat treatment under an oxygen atmosphere, an ion implantation method, an ion doping method, a plasma immersion ion implantation method, plasma treatment, or the like. As a gas for adding oxygen, an oxygen gas of $^{16}O_2$, $^{18}O_2$, or the like, a nitrous oxide gas, an ozone gas, or the like can be used.

The concentration of hydrogen in the insulating layers 812 to 819 is preferably low in order to prevent an increase in the concentration of hydrogen in the oxide layer 830. In particular, the concentration of hydrogen in the insulating layers 813 to 818 is preferably low. Specifically, the concentration of hydrogen is lower than or equal to $2 \times 10^{20}$ atoms/cm$^3$, preferably lower than or equal to $5 \times 10^{19}$ atoms/cm$^3$, further preferably lower than or equal to $1 \times 10^{19}$ atoms/cm$^3$, and still further preferably lower than or equal to $5 \times 10^{18}$ atoms/cm$^3$.

The concentration of nitrogen in the insulating layers 813 to 818 is preferably low in order to prevent an increase in the concentration of nitrogen in the oxide layer 830. Specifically, the concentration of nitrogen is lower than $5 \times 10^{19}$ atoms/cm$^3$, preferably lower than or equal to $5 \times 10^{18}$ atoms/cm$^3$, further preferably lower than or equal to $1 \times 10^{18}$ atoms/cm$^3$, and still further preferably lower than or equal to $5 \times 10^{17}$ atoms/cm$^3$.

The hydrogen concentration and the nitrogen concentration are measured by secondary ion mass spectrometry (SIMS).

In the transistor 801, the oxide layer 830 is preferably surrounded by an insulating layer with oxygen and hydrogen barrier properties (hereinafter such an insulating layer is also referred to as a barrier layer). A use of such a structure prevents release of oxygen from the oxide layer 830, and intrusion of hydrogen into the oxide layer 830. Thus, the reliability and electrical characteristics of the transistor 801 can be improved.

For example, the insulating layer 819 functions as a barrier layer and at least one of the insulating layers 811, 812, and 814 functions as a barrier layer. The barrier layer can be formed using a material such as aluminum oxide, aluminum oxynitride, gallium oxide, gallium oxynitride, yttrium oxide, yttrium oxynitride, hafnium oxide, hafnium oxynitride, or silicon nitride.

A structure example of the insulating layers 811 to 818 is described. In this example, each of the insulating layers 811, 812, 815, and 819 functions as a barrier layer. The insulating layers 816 to 818 are oxide layers containing excess oxygen. The insulating layer 811 is formed using silicon nitride. The insulating layer 812 is formed using aluminum oxide. The insulating layer 813 is formed using silicon oxynitride. The insulating layers 814 to 816 functioning as the gate insulating layers on the back gate electrode side are formed using a stack including silicon oxide, aluminum oxide, and silicon oxide. The insulating layer 817 functioning as the gate insulating layer on the front gate side is formed using silicon oxynitride. The insulating layer 818 functioning as the interlayer insulating layer is formed using silicon oxide. The insulating layer 819 is formed using aluminum oxide.

Examples of a conductive material used for the conductive layers 850 to 853 include a metal such as molybdenum, titanium, tantalum, tungsten, aluminum, copper, chromium, neodymium, or scandium; and a metal nitride containing any of the above metals as its component (e.g., tantalum nitride, titanium nitride, molybdenum nitride, or tungsten nitride). A conductive material such as indium tin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon oxide is added can be used.

A structure example of the conductive layers 850 to 853 is described. The conductive layer 850 is a single layer of tantalum nitride or tungsten. Alternatively, the conductive layer 850 is a stack including tantalum nitride, tantalum, and tantalum nitride. The conductive layer 851 is formed with a single layer of tantalum nitride, or a stack including tantalum nitride and tungsten. The structure of the conductive layer 852 is the same as that of the conductive layer 851. The conductive layer 853 is formed with a single layer of tantalum nitride, or a stack including tantalum nitride and tungsten.

In order to reduce the off-state current of the transistor 801, for example, the energy gap of the metal oxide film 822 is preferably large. The energy gap of the metal oxide film 822 is greater than or equal to 2.5 eV and less than or equal to 4.2 eV, preferably greater than or equal to 2.8 eV and less than or equal to 3.8 eV, and further preferably greater than or equal to 3 eV and less than or equal to 3.5 eV.

The oxide layer 830 preferably exhibits crystallinity. At least the metal oxide film 822 preferably exhibits crystallinity. With the structure described above, the transistor 801 can have high reliability and favorable electrical characteristics.

As the oxide of the metal oxide film 822, typically, an In—Ga oxide, an In—Zn oxide, or an In-M-Zn oxide (M is Al, Ga, Y, or Sn) can be used. The metal oxide film 822 is not limited to the oxide layer containing indium. The metal oxide film 822 can be formed using a Zn—Sn oxide, a Ga—Sn oxide, or a Zn—Mg oxide, for example. The metal oxide films 821, 823, and 824 can be formed using an oxide that is similar to the oxide of the metal oxide film 822. In particular, each of the metal oxide films 821, 823 and 824 can be formed with Ga oxide.

When an interface level is formed at the interface between the metal oxide film 822 and the metal oxide film 821, a channel formation region is formed also in the vicinity of the interface, which causes a change in the threshold voltage of the transistor 801. It is preferable that the metal oxide film 821 contain at least one of the metal elements contained in the metal oxide film 822 as its component. Accordingly, an interface level is unlikely to be formed at the interface between the metal oxide film 822 and the metal oxide film 821, and variations in the electrical characteristics of the transistor 801, such as the threshold voltage can be reduced.

The metal oxide film 824 preferably contains at least one of the metal elements contained in the metal oxide film 822 as its component because interface scattering is unlikely to occur at the interface between the metal oxide film 822 and the metal oxide film 824, and carrier transfer is not inhibited. Thus, the field-effect mobility of the transistor 801 can be increased.

It is preferable that the metal oxide film 822 have the highest carrier mobility among the metal oxide films 821 to 824. Accordingly, a channel can be formed in the metal oxide film 822 that is apart from the insulating layers 816 and 817.

For example, in a metal oxide containing indium such as an In—M—Zn oxide, carrier mobility can be increased by an increase in the indium content. In the In—M—Zn oxide, the s orbital of heavy metal mainly contributes to carrier transfer, and when the indium content in the oxide semiconductor is increased, overlaps of the s orbitals of indium atoms are increased; therefore, an oxide having a high content of indium has higher mobility than an oxide having a low content of indium. Therefore, an oxide having a high content of indium is used as the metal oxide film, so that carrier mobility can be increased.

Thus, for example, the metal oxide film 822 is formed using an In—Ga—Zn oxide, and the metal oxide films 821 and 823 are formed using a Ga oxide. For example, when the metal oxide films 821 to 823 are formed using an In—M—Zn oxide, the indium content of the metal oxide film 822 is made higher than the indium content of the metal oxide films 821 and 823. In the case where the In—M—Zn oxide is formed by sputtering, the indium content can be changed by a change in the atomic ratio of metal elements of a target.

For example, it is preferable that the atomic ratio of metal elements of a target used for depositing the metal oxide film 822 be In:M:Zn=1:1:1, 3:1:2, or 4:2:4.1. For example, it is preferable that the atomic ratio of metal elements of a target used for depositing the metal oxide films 821 and 823 be In:M:Zn=1:3:2, or 1:3:4. The atomic ratio of an In-M-Zn oxide deposited using a target of In:M:Zn=4:2:4.1 is approximately In:M:Zn=4:2:3.

In order that the transistor 801 have stable electrical characteristics, it is preferable to reduce the concentration of impurities in the oxide layer 830. In the metal oxide, hydrogen, nitrogen, carbon, silicon, and a metal element other than a main component are impurities. For example, hydrogen and nitrogen form donor levels to increase the carrier density. In addition, silicon and carbon form impurity levels in the metal oxide. The impurity levels serve as traps and might cause deterioration of electrical characteristics of the transistor.

For example, the oxide layer 830 includes a region where the concentration of silicon is lower than or equal to $2 \times 10^{18}$ atoms/cm$^3$, preferably lower than or equal to $2 \times 10^{17}$ atoms/cm$^3$. The same applies to the concentration of carbon in the oxide layer 830.

The oxide layer 830 includes a region where the concentration of alkali metal is lower than or equal to $1 \times 10^{18}$ atoms/cm$^3$, preferably lower than or equal to $2 \times 10^{16}$ atoms/cm$^3$. The same applies to the concentration of alkaline earth metal in the oxide layer 830.

The oxide layer 830 includes a region where the concentration of nitrogen is lower than $5 \times 10^{19}$ atoms/cm$^3$, preferably lower than or equal to $5 \times 10^{18}$ atoms/cm$^3$, further preferably lower than or equal to $1 \times 10^{18}$ atoms/cm$^3$, and still further preferably lower than or equal to $5 \times 10^{17}$ atoms/cm$^3$.

The oxide layer 830 includes a region where the concentration of hydrogen is lower than $1 \times 10^{20}$ atoms/cm$^3$, preferably lower than $1 \times 10^{19}$ atoms/cm$^3$, further preferably lower than $5 \times 10^{18}$ atoms/cm$^3$, and still further preferably lower than $1 \times 10^{18}$ atoms/cm$^3$.

The above concentrations of the impurities in the oxide layer 830 are measured by SIMS.

In the case where the metal oxide film 822 contains oxygen vacancies, donor levels are formed by entry of hydrogen into sites of oxygen vacancies in some cases, to cause reduction in the on-state current of the transistor 801.

Note that sites of oxygen vacancies become more stable by entry of oxygen than by entry of hydrogen. Thus, by reducing oxygen vacancies in metal oxide film 822, the on-state current of the transistor 801 can be increased in some cases. Consequently, preventing entry of hydrogen into sites of oxygen vacancies by a reduction in hydrogen in the metal oxide film 822 is effective in improving on-state current characteristics.

Hydrogen contained in a metal oxide reacts with oxygen bonded to a metal atom to be water, and thus causes an oxygen vacancy, in some cases. Due to entry of hydrogen into the oxygen vacancy, an electron serving as a carrier is generated in some cases. Furthermore, in some cases, bonding of part of hydrogen to oxygen bonded to a metal atom causes generation of an electron serving as a carrier. Thus, the transistor 801 is likely to be normally-on when the metal oxide film 822 contains hydrogen because the metal oxide film 822 includes a channel formation region. Accordingly, it is preferable that hydrogen in the metal oxide film 822 be reduced as much as possible.

FIGS. 25A to 25C illustrate an example in which the oxide layer 830 has a four-layer structure; however, one embodiment of the present invention is not limited thereto. For example, the oxide layer 830 can have a three-layer structure without the metal oxide film 821 or without the metal oxide film 823. Alternatively, the oxide layer 830 may include one or more metal oxide layers that are similar to the metal oxide films 821 to 824 at two or more of the following positions: between given layers in the oxide layer 830, over the oxide layer 830, and below the oxide layer 830.

Figure 26:
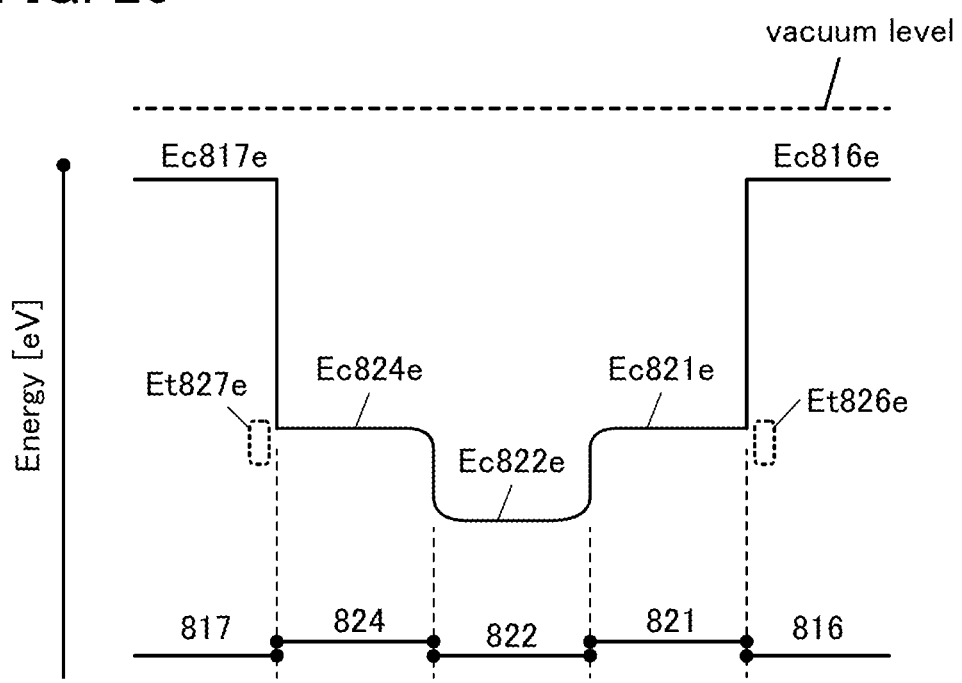
FIG. 26 shows an energy band structure.

Effects of the stack including the metal oxide films 821, 822, and 824 are described with reference to FIG. 26. FIG. 26 is a schematic diagram showing the energy band structure of a channel formation region of the transistor 801.

In FIG. 26, Ec816$e$, Ec821$e$, Ec822$e$, Ec824$e$, and Ec817$e$ indicate the energy of the bottom of the conduction band of the insulating layer 816, the metal oxide film 821, the metal oxide film 822, the metal oxide film 824, and the insulating layer 817, respectively.

Here, a difference in energy between the vacuum level and the bottom of the conduction band (the difference is also referred to as electron affinity) corresponds to a value obtained by subtracting an energy gap from a difference in energy between the vacuum level and the top of the valence band (the difference is also referred to as an ionization potential). The energy gap can be measured using a spectroscopic ellipsometer (UT-300 manufactured by HORIBA JOBIN YVON S.A.S.). The energy difference between the vacuum level and the top of the valence band can be measured using an ultraviolet photoelectron spectroscopy (UPS) device (VersaProbe manufactured by ULVAC-PHI, Inc.).

Since the insulating layers 816 and 817 are insulators, Ec816$e$ and Ec817$e$ are closer to the vacuum level than Ec821$e$, Ec822$e$, and Ec824$e$ (i.e., the insulating layers 816 and 817 have lower electron affinities than the metal oxide films 821, 822, and 824).

The metal oxide film 822 has a higher electron affinity than the metal oxide films 821 and 824. For example, the difference in electron affinity between the metal oxide films 822 and 821 and the difference in electron affinity between the metal oxide films 822 and 824 are each greater than or equal to 0.07 eV and less than or equal to 1.3 eV, preferably greater than or equal to 0.1 eV and less than or equal to 0.7 eV, further preferably greater than or equal to 0.15 eV and less than or equal to 0.4 eV. Note that the electron affinity refers to a difference in energy between the vacuum level and the bottom of the conduction band.

When voltage is applied to the gate electrode (the conductive layer 850) of the transistor 801, a channel is mainly formed in the metal oxide film 822 having the highest electron affinity among the metal oxide films 821, 822, and 824.

An indium gallium oxide has low electron affinity and a high oxygen-blocking property. Therefore, the metal oxide film 824 preferably includes an indium gallium oxide. The gallium atomic ratio [Ga/(In+Ga)] is, for example, higher than or equal to 70%, preferably higher than or equal to 80%, further preferably higher than or equal to 90%.

In some cases, there is a mixed region of the metal oxide films 821 and 822 between the metal oxide films 821 and 822. Furthermore, in some cases, there is a mixed region of the metal oxide films 824 and 822 between the metal oxide films 824 and 822. Because the mixed region has low interface state density, a region with a stack formed with the metal oxide films 821, 822, and 824 has a band structure where energy at each interface and in the vicinity of the interface is changed continuously (continuous junction).

Electrons transfer mainly through the metal oxide film 822 in the oxide layer 830 having such an energy band structure. Therefore, even when an interface state exists at an interface between the metal oxide film 821 and the insulating layer 816 or an interface between the metal oxide film 824 and the insulating layer 817, electron movement in the oxide layer 830 is less likely to be inhibited and the on-state current of the transistor 801 can be increased.

Although trap states Et826$e$ and Et827$e$ due to impurities or defects might be formed in the vicinity of the interface between the metal oxide film 821 and the insulating layer 816 and the vicinity of the interface between the metal oxide film 824 and the insulating layer 817 as illustrated in FIG. 26, the metal oxide film 822 can be separated from the trap states Et826$e$ and Et827$e$ owing to the existence of the metal oxide films 821 and 824.

Note that when a difference between Ec821$e$ and Ec822$e$ is small, an electron in the metal oxide film 822 might reach the trap state Et826$e$ by passing over the difference in energy. Since the electron is trapped at the trap state Et826$e$, negative fixed electric charge is generated at the interface with the insulating film, causing the threshold voltage of the transistor to be shifted in a positive direction. The same applies to the case where a difference in energy between Ec822$e$ and Ec824$e$ is small.

Each of the difference in energy between Ec821$e$ and Ec822$e$ and the difference in energy between Ec824$e$ and Ec822$e$ is preferably greater than or equal to 0.1 eV, further preferably greater than or equal to 0.15 eV so that a change in the threshold voltage of the transistor 801 can be reduced and the transistor 801 can have favorable electrical characteristics.

Note that the transistor 801 does not necessarily include a back gate electrode.

<Example of Stacked-Layer Structure>

Next, a stacked-layer structure of an OS transistor and another transistor is described. Although an example in which the stacked-layer structure is used for the memory cell MC is described here, the stacked-layer structure can be used for other circuits described in any of the above embodiments.

Figure 27:
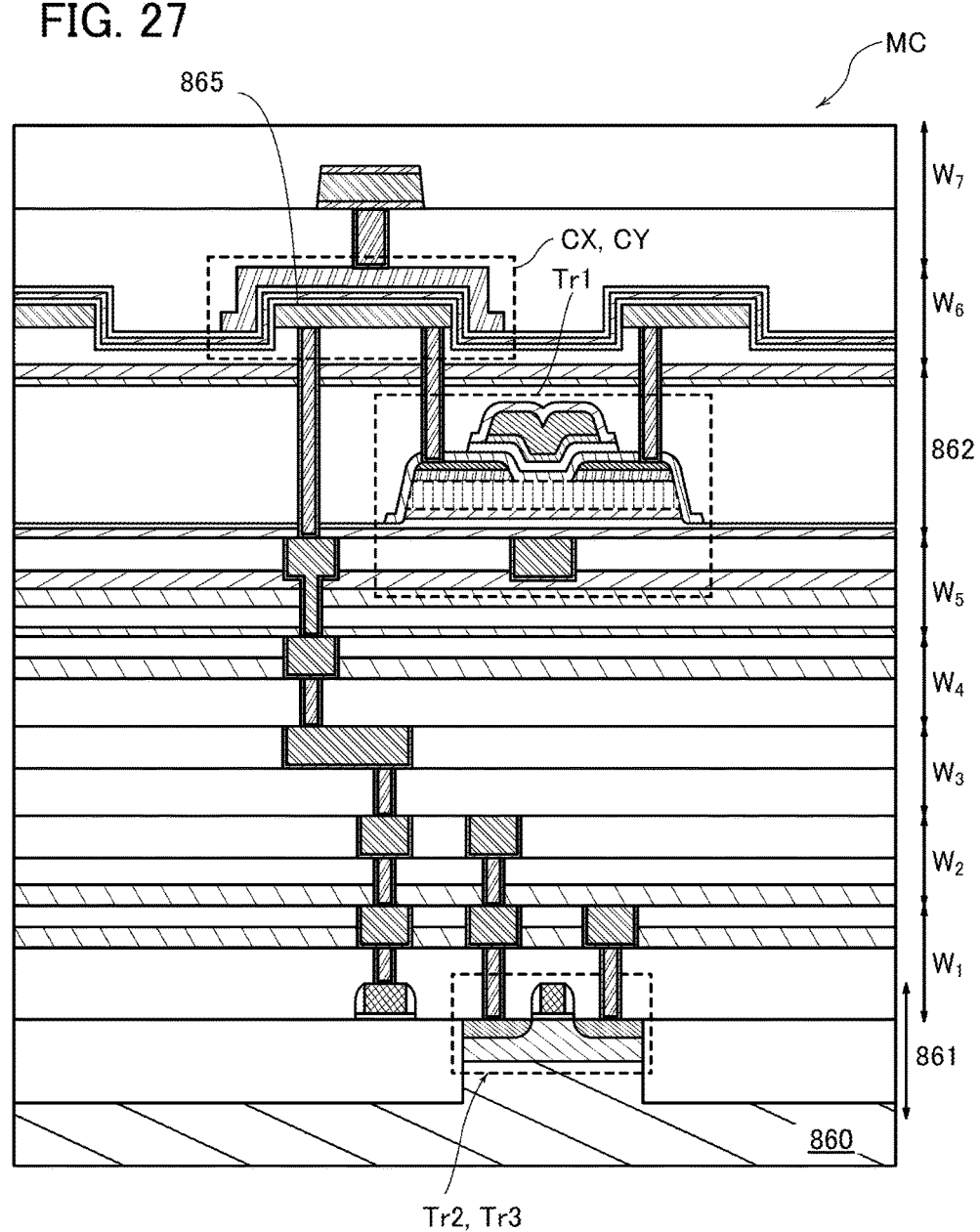
FIG. 27 illustrates an example of a cross-sectional structure of a semiconductor device.

FIG. 27 illustrates an example of a stacked-layer structure of the transistor Tr1, the transistor Tr2 or Tr3, and the capacitor CX or CY that are illustrated in FIG. 3A.

The memory cell MC includes a stack including a CMOS layer 861, wiring layers $W_1$ to $W_5$, a transistor layer 862, and wiring layers $W_6$ and $W_7$.

A Si transistor is provided in the CMOS layer 861. The Si transistor corresponds to the transistor Tr2 or Tr3. An active layer of the transistor Tr2 or Tr3 is formed in a single crystalline silicon wafer 860. A gate of the transistor Tr2 or Tr3 is connected to one of the source and the drain of the transistor Tr1 and one electrode 865 of the capacitor CX or CY through the wiring layers $W_1$ to $W_5$.

The transistor Tr1 is provided in the transistor layer 862. In FIG. 27, the transistor Tr1 has a structure similar to that of the transistor 801 (FIGS. 25A to 25C). Note that in this embodiment, the transistor Tr1 includes its back gate electrode in the wiring layer $W_5$. The capacitor CX or CY is provided in the wiring layer $W_6$.

The OS transistor and other components are stacked in this manner, whereby the area of the memory cell MC or the other circuits can be reduced.

This embodiment can be combined with any of the other embodiments as appropriate.

This application is based on Japanese Patent Application serial no. 2016-089504 filed with Japan Patent Office on Apr. 27, 2016, the entire contents of which are hereby incorporated by reference.

What is claimed is:

1. A semiconductor device comprising:
a memory cell,
wherein the memory cell comprises a first transistor, a second transistor, a third transistor, a first capacitor, and a second capacitor,
wherein a gate of the first transistor is electrically connected to a first wiring,
wherein one of a source and a drain of the first transistor is electrically connected to a gate of the second transistor, a gate of the third transistor, one electrode of the first capacitor, and one electrode of the second capacitor,
wherein the other of the source and the drain of the first transistor is electrically connected to a second wiring,
wherein one of a source and a drain of the second transistor is electrically connected to a third wiring,
wherein the other of the source and the drain of the second transistor is electrically connected to a fourth wiring,
wherein one of a source and a drain of the third transistor is electrically connected to a fifth wiring,
wherein the other of the source and the drain of the third transistor is electrically connected to the fourth wiring,
wherein the other electrode of the first capacitor is electrically connected to a sixth wiring, and
wherein the other electrode of the second capacitor is electrically connected to a seventh wiring.

2. The semiconductor device according to claim 1,
wherein the memory cell is configured to hold a first potential,
wherein the sixth wiring is configured to supply a second potential to the memory cell,
wherein the seventh wiring is configured to supply a third potential to the memory cell,
wherein a first current corresponding to a fourth potential is supplied between the memory cell and the third wiring,
wherein the fourth potential corresponds to the product of the first potential and the second potential,
wherein a second current corresponding to a fifth potential is supplied between the memory cell and the fifth wiring, and
wherein the fifth potential corresponds to the product of the first potential and the third potential.

3. The semiconductor device according to claim 2, wherein the first potential, the second potential, and the third potential are each an analog potential.

4. The semiconductor device according to claim 1, wherein the first transistor comprises an oxide semiconductor in a channel formation region.

5. An electronic device comprising:
the semiconductor device according to claim 1; and
at least one of a display portion, an operation key, a speaker, and a microphone.

6. An authentication system comprising:
an identification portion comprising the semiconductor device according to claim 1,
wherein the identification portion is configured to receive a signal corresponding to a character, a figure, a symbol, or voice sensed by a sensor portion of an electronic device and is configured to identify the signal, and
wherein an identification result is transmitted from the identification portion to a control portion configured to control an operation of the electronic device.

7. A semiconductor device comprising:
a plurality of memory cells comprising at least a first memory cell, a second memory cell, and a third memory cell,
wherein the first memory cell comprises a first transistor, a second transistor, a third transistor, a first capacitor, and a second capacitor,
wherein a gate of the first transistor is electrically connected to a first wiring,
wherein one of a source and a drain of the first transistor is electrically connected to a gate of the second transistor, a gate of the third transistor, one electrode of the first capacitor, and one electrode of the second capacitor,
wherein the other of the source and the drain of the first transistor is electrically connected to a second wiring,
wherein one of a source and a drain of the second transistor is electrically connected to a third wiring,
wherein the other of the source and the drain of the second transistor is electrically connected to a fourth wiring,
wherein one of a source and a drain of the third transistor is electrically connected to a fifth wiring,
wherein the other of the source and the drain of the third transistor is electrically connected to the fourth wiring,
wherein the other electrode of the first capacitor is electrically connected to a sixth wiring, and
wherein the other electrode of the second capacitor is electrically connected to a seventh wiring.

8. The semiconductor device according to claim 7,
wherein the first memory cell is configured to hold a first potential,
wherein the sixth wiring is configured to supply a second potential to the first memory cell,
wherein the seventh wiring is configured to supply a third potential to the first memory cell,
wherein a first current corresponding to a fourth potential is supplied between the first memory cell and the third wiring,
wherein the fourth potential corresponds to the product of the first potential and the second potential,
wherein a second current corresponding to a fifth potential is supplied between the first memory cell and the fifth wiring, and
wherein the fifth potential corresponds to the product of the first potential and the third potential.

9. The semiconductor device according to claim 8, wherein the first potential, the second potential, and the third potential are each an analog potential.

10. The semiconductor device according to claim 8,
wherein the first memory cell and the second memory cell are electrically connected to the third wiring and the seventh wiring,
wherein the first memory cell and the third memory cell are electrically connected to the fifth wiring and the sixth wiring,
wherein a third current corresponding to the sum of the fourth potential of the first memory cell and the fourth potential of the second memory cell is supplied to the third wiring, and
wherein a fourth current corresponding to the sum of the fifth potential of the first memory cell and the fifth potential of the third memory cell is supplied to the fifth wiring.

11. The semiconductor device according to claim 7, wherein the first transistor comprises an oxide semiconductor in a channel formation region.

12. The semiconductor device according to claim 7, wherein each of the second memory cell and the third memory cell comprises a first transistor, a second transistor, a third transistor, a first capacitor, and a second capacitor.

13. The semiconductor device according to claim 12, wherein the first transistor comprises an oxide semiconductor in a channel formation region.

14. An electronic device comprising:
the semiconductor device according to claim 7; and
at least one of a display portion, an operation key, a speaker, and a microphone.

15. An authentication system comprising:
an identification portion comprising the semiconductor device according to claim 7,
wherein the identification portion is configured to receive a signal corresponding to a character, a figure, a symbol, or voice sensed by a sensor portion of an electronic device and is configured to identify the signal, and
wherein an identification result is transmitted from the identification portion to a control portion configured to control an operation of the electronic device.

* * * * *